(12) United States Patent
Omprakash

(10) Patent No.: US 9,218,782 B2
(45) Date of Patent: Dec. 22, 2015

(54) VIDEO WINDOW DETECTION

(71) Applicant: STMicroelectronics International N.V., Amsterdam (NL)

(72) Inventor: Rajesh Sidana Omprakash, Bangalore (IN)

(73) Assignee: STMicroelectronics International N.V., Amsterdam (NL)

(\*) Notice: Subject to any disclaimer, the term of this patent is extended or adjusted under 35 U.S.C. 154(b) by 67 days.

(21) Appl. No.: 13/998,719

(22) Filed: Nov. 26, 2013

(65) Prior Publication Data

US 2014/0184912 A1    Jul. 3, 2014

Related U.S. Application Data

(63) Continuation-in-part of application No. 13/298,130, filed on Nov. 16, 2011.

(51) Int. Cl.
| | |
|---|---|
| *G09G 5/00* | (2006.01) |
| *H04N 5/445* | (2011.01) |
| *G06K 9/32* | (2006.01) |
| *G06F 3/0481* | (2013.01) |
| *G06T 7/00* | (2006.01) |
| *G09G 5/14* | (2006.01) |
| *H04N 5/14* | (2006.01) |
| *H04N 21/431* | (2011.01) |

(52) U.S. Cl.
CPC ............... *G09G 5/003* (2013.01); *G06K 9/325* (2013.01); *G06F 3/0481* (2013.01); *G06F 2203/04803* (2013.01); *G06T 7/0081* (2013.01); *G06T 2207/10016* (2013.01); *G06T 2207/20104* (2013.01); *G09G 5/14* (2013.01); *G09G 2320/0613* (2013.01); *G09G 2320/0686* (2013.01); *G09G 2320/103* (2013.01); *G09G 2360/16* (2013.01); *H04N 5/144* (2013.01); *H04N 21/4316* (2013.01)

(58) Field of Classification Search
CPC ............ G09G 5/14; G09G 2320/0686; G09G 2340/12; G06F 2203/04803; G06F 3/0481; G06T 2207/10016; G06T 2207/20104; G06T 7/0081
USPC .......... 345/629, 581, 589, 592; 715/781, 788, 715/790, 798, 799, 800
See application file for complete search history.

(56) References Cited

U.S. PATENT DOCUMENTS

| | | | |
|---|---|---|---|
| 5,418,574 A | 5/1995 | Miyabata et al. | |
| 5,557,298 A * | 9/1996 | Yang et al. | .................... 715/781 |
| 6,377,282 B1 * | 4/2002 | Champion | .................... 715/726 |
| 6,600,647 B1 | 7/2003 | Girvin et al. | |
| 6,873,341 B1 * | 3/2005 | Adams et al. | ................. 345/629 |
| 7,406,208 B2 | 7/2008 | Chiang | |
| 7,437,678 B2 * | 10/2008 | Awada et al. | ................. 715/784 |
| 8,073,197 B2 | 12/2011 | Xu et al. | |
| 8,134,596 B2 | 3/2012 | Lei et al. | |
| 8,170,361 B2 | 5/2012 | Neal | |
| 8,532,414 B2 | 9/2013 | Wang et al. | |
| 8,913,076 B1 * | 12/2014 | Aggarwal et al. | ............. 345/593 |
| 2005/0002566 A1 | 1/2005 | Di Federico et al. | |

(Continued)

*Primary Examiner* — Jin-Cheng Wang
(74) *Attorney, Agent, or Firm* — Gardere Wynne Sewell LLP

(57) ABSTRACT

A video window detector includes a region characteristic determiner to generate at least one characteristic value for at least one region of a display output; a characteristic map generator to generate an image map from the at least one characteristic value for at least one region of the display output; and a window detector to detect at least one video window dependent on the image map.

21 Claims, 50 Drawing Sheets

(56) References Cited

U.S. PATENT DOCUMENTS

| | | | |
|---|---|---|---|
| 2006/0294522 A1* | 12/2006 | Havens | 718/103 |
| 2007/0003154 A1* | 1/2007 | Sun et al. | 382/254 |
| 2007/0050729 A1* | 3/2007 | Kawamura et al. | 715/781 |
| 2007/0097266 A1* | 5/2007 | Souchard | 348/571 |
| 2008/0028288 A1* | 1/2008 | Vayssiere et al. | 715/219 |
| 2008/0288876 A1* | 11/2008 | Fleming | 715/761 |
| 2009/0245626 A1 | 10/2009 | Norimatsu et al. | |
| 2012/0274808 A1* | 11/2012 | Chong et al. | 348/234 |
| 2013/0305170 A1* | 11/2013 | de Souza et al. | 715/760 |

* cited by examiner

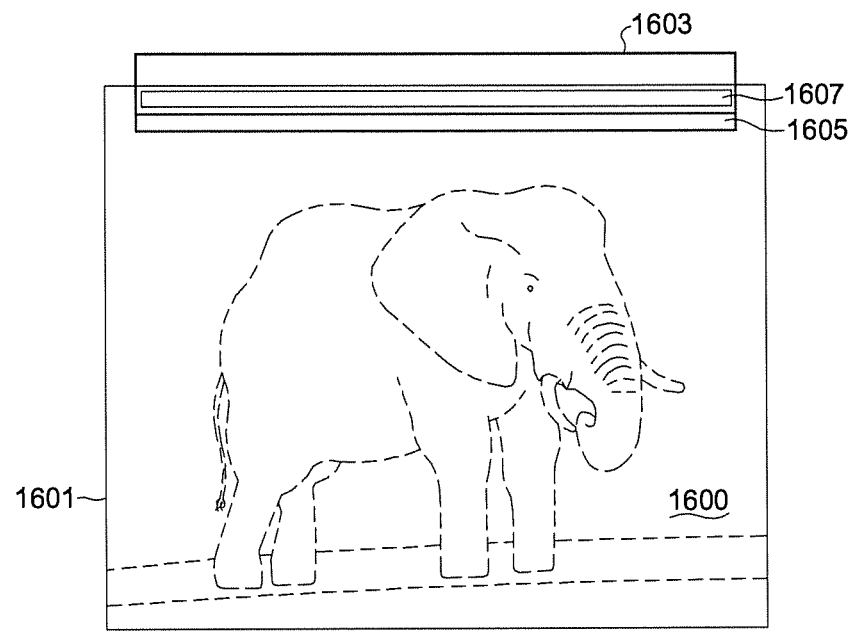
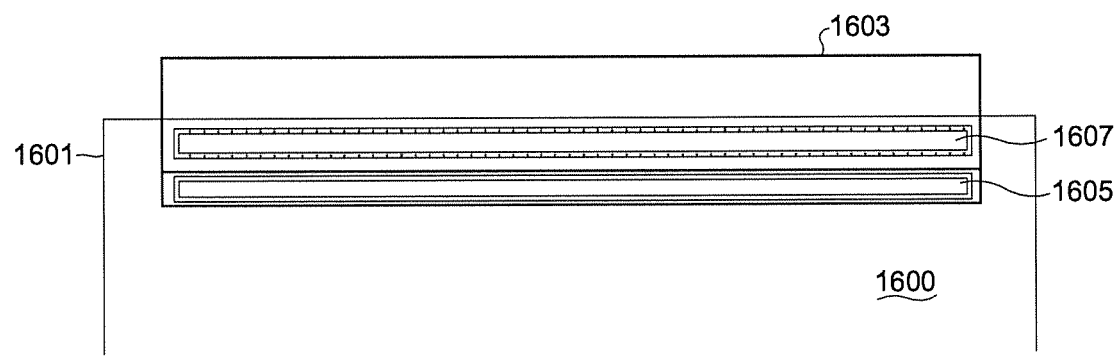
Fig. 16

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 5 | 10 | 15 | 20 | 25 | 30 | 0 |
| 0 | 4 | 8 | 12 | 16 | 20 | 24 | 0 |
| 0 | 3 | 6 | 9 | 12 | 15 | 18 | 0 |
| 0 | 2 | 4 | 6 | 8 | 10 | 12 | 0 |
| 0 | 1 | 2 | 3 | 4 | 5 | 6 | 0 |
| 0 | 0 | 0 | 0 | 0 | 0 | 0 | 0 |

VWA H&V EDGE MAP FOR 32X30 REGIONS

VWA H&V STATIC MAP FOR 32X30 REGIONS

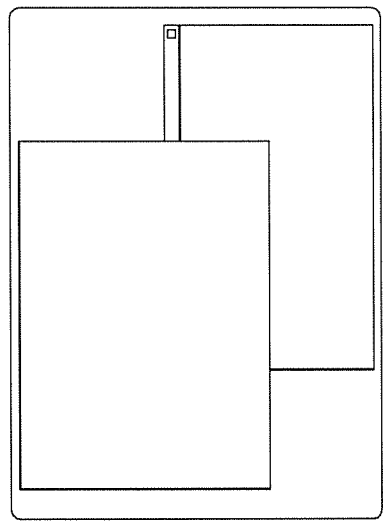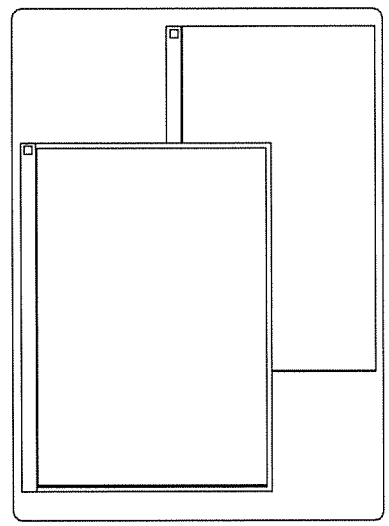
Fig. 35

Example for top/bottom side

Example for top/bottom side

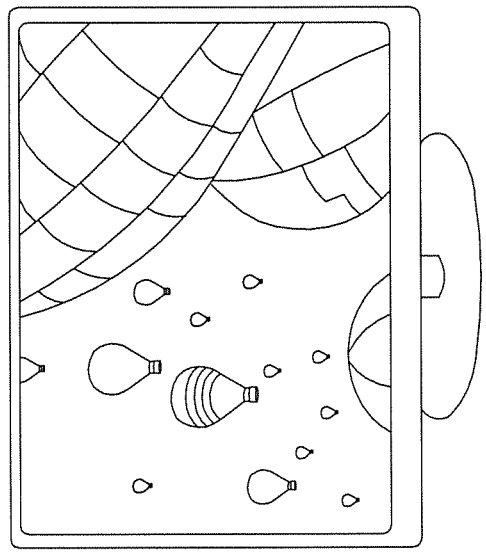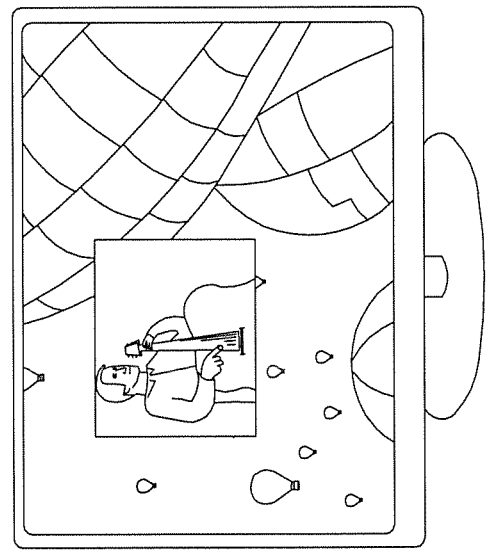
Fig. 39

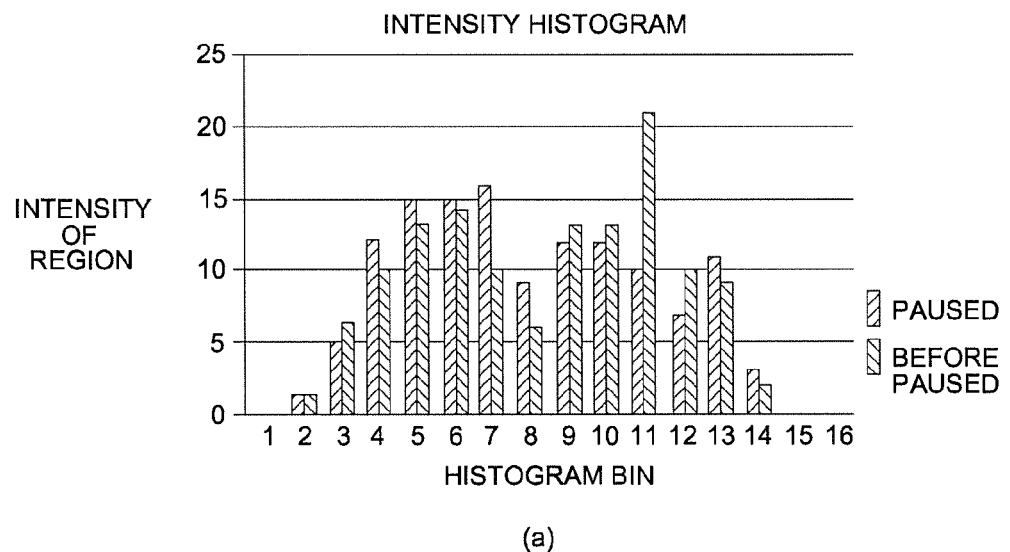
(a)
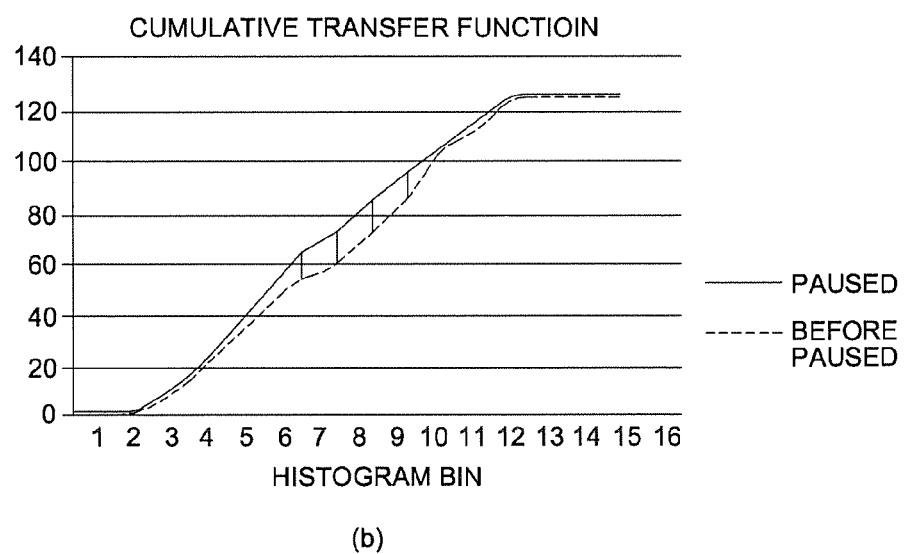
(b)
*Fig. 40*

|   |   |   |   |   |   |   |   |
|---|---|---|---|---|---|---|---|
| o | o | o | o | o | o | o | o |
| o | o | o | o | o | o | o | o |
| o | o | o | o | o | o | o | o |
| o | o | o | o | o | o | o | o |
| o | 5 | 10 | 15 | 20 | 25 | 30 | o |
| o | 4 | 8 | 12 | 16 | 20 | 24 | o |
| o | 3 | 6 | 9 | 12 | 15 | 18 | o |
| o | 2 | 4 | 6 | 8 | 10 | 12 | o |
| o | 1 | 2 | 3 | 4 | 5 | 6 | o |
| o | o | o | o | o | o | o | o |

Fig. 44

VIDEO WINDOW DETECTION

RELATED APPLICATION

The present invention is a continuation-in-part of U.S. patent application Ser. No. 13/298,130 filed Nov. 16, 2011, which is hereby incorporated by reference in its entirety for all purposes as if fully set forth herein.

FIELD OF THE INVENTION

The present application relates to a video window detector. The main application is for a computer monitor, although it is not limited to a computer monitor receiver alone, but can be used for a video window detector operating within a LCD monitor/TV controller.

BACKGROUND OF THE INVENTION

Televisions, computer monitors and other display devices exist in a great multitude of display sizes and aspect ratios. Video Liquid Crystal Display (LCD) monitors and/or television (TV) controllers can be configured to control display devices such that the display can present multiple windows where more than one image is displayed. For example a computer user can open a webpage and display a video (from YouTube) or run a media player program (displaying local video content or from a digital versatile disc (DVD) where the video window is overlaid on a graphics background. Therefore, there can be single video windows or multiple non overlapping video windows open at the same time.

Furthermore, it is known that when displaying personal computer (PC) graphics on monitor displays, the video image can be overlaid on the graphics background and the video image window can be of any rectangle size within the graphics background. The windowed video image can be improved by the operation of image enhancement or processing; however, this enhancement/processing should be applied only to the windowed video region and not to any background or graphics region as the processing could lead to addition of image artifacts or over enhancement to these background or graphics regions.

Therefore, a video display receiver and, particularly a PC monitor display controller, should be able to automatically detect the window area or rectangle, or non-overlapping video window or windows within the display region so that the processing operations can be applied only within the detected region.

SUMMARY OF THE INVENTION

Embodiments of the present application aim to address the above problems.

There is provided, according to the disclosure, a video window detector comprising: a region characteristic determiner configured to generate at least one characteristic value for at least one region of a display output; a characteristic map generator configured to generate an image map from the at least one characteristic value for at least one region of the display output; and a window detector configured to detect at least one video window dependent on the image map.

The video window detector may further comprise a coarse region generator configured to generate a determined number of rows and columns of coarse region parts of the display output, and wherein the region characteristic determiner may comprise a coarse region characteristic determiner configured to generate at least one characteristic value for at least one coarse region part.

The window detector may comprise a coarse video window detector configured to determine at least one video window of coarse region parts dependent on the image map.

The window detector may further comprise a rectangle verifier configured to determine a rectangle type for the at least one window of coarse region parts.

The rectangle type may comprise at least one of: not a rectangle, a perfect rectangle, a cut rectangle, and not a perfect rectangle.

The window detector may comprise a fine video window detector configured to detect at least one of: a fine video window border, and a fine window edge, for at least one side/edge of the at least one video window of coarse region parts dependent on a fine part image map.

The characteristic map generator may be configured to generate a fine part image map from at least one characteristic value for at least one fine region part of the display output.

The region characteristic determiner may be configured to generate at least one characteristic value for at least one fine region of the display output.

The video window detector may further comprise a fine region generator configured to define at least one row and at least one column of fine regions surrounding at least one side/edge of the at least one video window of coarse region parts.

The video window detector may further comprise a border verifier configured to monitor the at least one video window over at least two iterations of the display output.

The region characteristic determiner may comprise at least one of: an edge value determiner, a black level value determiner, a realness value determiner, a motion value determiner, and a luma intensity value determiner.

The coarse region characteristic determiner may comprise: the motion value determiner configured to determine a map of motion values for at least one coarse region; the realness value determiner configured to determine a map of realness values for at least one coarse region; the black level value determiner configured to determine a map of blackness values for at least one coarse region; the luma intensity value determiner configured to determine a map of luma values for at least one coarse region; and the edge value determiner configured to determine a map of edge values for at least one coarse region, wherein the coarse region characteristic determiner may be configured to determine the characteristic value for at least one coarse region part based on the maps of motion values, realness values and blackness values gated by the edge and luma intensity values.

The coarse region characteristic determiner may be configured to store the map of motion values for at least one coarse region, the map of realness values for at least one coarse region and the map of blackness values.

The coarse region characteristic determiner may be configured to store the map of motion values for at least one coarse region, the map of realness values for at least one coarse region and the map of blackness values so to enable a persistence effect of the values.

The coarse region characteristic determiner may be configured to clear the map of motion values for at least one coarse region, the map of realness values for at least one coarse region and the map of blackness values periodically.

The final motion map value determiner may be configured to determine a map of motion values for at least one coarse region based on the ratio of the characteristic value for at least one coarse region and the map of motion values for at least one coarse region.

The characteristic map generator may comprise: a first map generator configured to generate a first image map dependent on at least a first characteristic value; a second map generator configured to generate a second image map dependent on at least a second characteristic value; and a map selector configured to select one of the first and second image maps as the image map.

The characteristic map generator may be configured to generate an image map dependent on a first characteristic value gated by a second characteristic value.

The window detector may be configured to detect at least one of: a window border, and a video border.

The video window detector may further comprise a border verifier configured to verify at least one border of the at least one video window.

The border verifier may be configured to compare at least one border region of the at least one video window first iteration characteristic value against a second iteration characteristic value.

The border verifier may be configured to indicate a border fail when the number of border regions of the at least one video window first iteration characteristic value differ from the second iteration characteristic value is greater than a determined border line value.

The border verifier may be configured to compare the characteristic value for regions within the at least one video window for a first iteration and a second iteration.

The border verifier may be configured to compare the characteristic value for regions within the at least one video window for a first iteration and a second iteration when the border verifier determines a border fail.

The border verifier may be configured to indicate an inside border fail when the characteristic value for regions within the at least one video window for a first iteration and a second iteration differ by a determined inside border value.

The present invention may include a television receiver comprising the video window detector as discussed herein.

The present invention may include a computer monitor comprising the video window detector as discussed herein.

The present invention may include an integrated circuit comprising the video window detector as discussed herein.

According to a second aspect there is provided a method for detecting video windows comprising: generating at least one characteristic value for at least one region of a display output; generating an image map from the at least one characteristic value for at least one region of the display output; and detecting at least one video window dependent on the image map.

The method may further comprise generating a determined number of rows and columns of coarse region parts of the display output, wherein generating at least one characteristic value for at least one region of a display output may comprise generating the at least one characteristic value for at least one coarse region part.

Detecting the at least one video window dependent on the image map may comprise determining at least one video window of coarse region parts dependent on the image map.

Detecting the at least one video window dependent on the image map may further comprise determining a rectangle type for the at least one window of coarse region parts.

The rectangle type may comprise at least one of: not a rectangle, a perfect rectangle, a cut rectangle, and not a perfect rectangle.

Detecting the at least one video window dependent on the image map may further comprise detecting at least one of: a fine video window border; and a fine window edge, for at least one side/edge of the at least one video window of coarse region parts dependent on a fine part image map.

Generating an image map from the at least one characteristic value for at least one region of the display output may comprise generating a fine part image map from at least one characteristic value for at least one fine region part of the display output.

Generating at least one characteristic value for at least one region of a display output may further comprise generating at least one characteristic value for at least one fine region of the display output.

The method may further comprise defining at least one row and at least one column of fine regions surrounding at least one side/edge of the at least one video window of coarse region parts.

The method may further comprise monitoring the at least one video window over at least two iterations of the display output.

The region characteristic may comprise at least one of: an edge value, a black level value, a realness value, a motion value, and a luma intensity value.

Generating the at least one characteristic value for at least one coarse region part may comprise: determining a map of motion values for at least one coarse region; determining a map of realness values for at least one coarse region; determining a map of blackness values for at least one coarse region; determining a map of luma values for at least one coarse region; determining a map of edge values for at least one coarse region; and determining the characteristic value for at least one coarse region part based on the maps of motion values, realness values and blackness values gated by the edge and luma intensity values.

Generating the at least one characteristic value for at least one coarse region part may further comprise storing the map of motion values for at least one coarse region, the map of realness values for at least one coarse region and the map of blackness values.

Generating the at least one characteristic value for at least one coarse region part may comprise periodically clearing the map of motion values for at least one coarse region, the map of realness values for at least one coarse region and the map of blackness values for at least one course region.

Determining a final map of motion values for at least one coarse region may comprise determining a final map of motion values for at least one coarse region based on the ratio of the characteristic value for at least one coarse region and the map of motion values for at least one coarse region.

Generating an image map from the at least one characteristic value for at least one region of the display output may comprise: generating a first image map dependent on at least a first characteristic value; generating a second image map dependent on at least a second characteristic value; and selecting one of the first and second image maps as the image map.

Generating an image map from the at least one characteristic value for at least one region of the display output may comprise generating an image map dependent on a first characteristic value gated by a second characteristic value.

Detecting at least one video window dependent on the image map may comprise detecting at least one of: a window border, and a video border.

The method may further comprise verifying at least one border of the at least one video window.

Verifying at least one border may comprise comparing at least one border region of the at least one video window first iteration characteristic value against a second iteration characteristic value.

Verifying at least one border may comprise indicating a border fail when the number of border regions of the at least one video window first iteration characteristic value differ from the second iteration characteristic value is greater than a determined border line value.

Verifying at least one border may comprise comparing the characteristic value for regions within the at least one video window for a first iteration and a second iteration.

Verifying at least one border may comprise comparing the characteristic value for regions within the at least one video window for a first iteration and a second iteration when the border verifier determines a border fail.

Verifying at least one border may comprise indicating an inside border fail when the characteristic value for regions within the at least one video window for a first iteration and a second iteration differ by a determined inside border value.

A processor-readable medium encoded with instructions that, when executed by a processor, perform a method as discussed herein.

An apparatus comprising at least one processor and at least one memory including computer code for one or more programs, the at least one memory and the computer code configured to with the at least one processor cause the apparatus to at least perform a method as discussed herein.

According to a third aspect there is provided a video window detector comprising: means for generating at least one characteristic value for at least one region of a display output; means for generating an image map from the at least one characteristic value for at least one region of the display output; and means for detecting at least one video window dependent on the image map.

The video window detector may further comprise means for generating a determined number of rows and columns of coarse region parts of the display output, wherein the means for generating at least one characteristic value for at least one region of a display output may comprise means for generating the at least one characteristic value for at least one coarse region part.

The means for detecting the at least one video window dependent on the image map may comprise means for determining at least one video window of coarse region parts dependent on the image map.

The means for detecting the at least one video window dependent on the image map may further comprise means for determining a rectangle type for the at least one window of coarse region parts.

The rectangle type may comprise at least one of: not a rectangle, a perfect rectangle, a cut rectangle, and not a perfect rectangle.

The means for detecting the at least one video window dependent on the image map may further comprise means for detecting at least one of: a fine video window border; and a fine window edge, for at least one side/edge of the at least one video window of coarse region parts dependent on a fine part image map.

The means for generating an image map from the at least one characteristic value for at least one region of the display output may comprise means for generating a fine part image map from at least one characteristic value for at least one fine region part of the display output.

The means for generating at least one characteristic value for at least one region of a display output may further comprise means for generating at least one characteristic value for at least one fine region of the display output.

The video window detector may further comprise means for defining at least one row and at least one column of fine regions surrounding at least one side/edge of the at least one video window of coarse region parts.

The video window detector may further comprise means for monitoring the at least one video window over at least two iterations of the display output.

The means for generating the region characteristic may comprise at least one of: means for generating an edge value, means for generating a black level value, means for generating a realness value, means for generating a motion value, and means for generating a luma intensity value.

The means for generating the at least one characteristic value for at least one coarse region part may comprise: means for determining a map of motion values for at least one coarse region; means for determining a map of realness values for at least one coarse region; means for determining a map of blackness values for at least one coarse region; means for determining a map of luma values for at least one coarse region; means for determining a map of edge values for at least one coarse region; and means for determining the characteristic value for at least one coarse region part based on the maps of motion values, realness values and blackness values gated by the edge and luma intensity values.

The means for generating the at least one characteristic value for at least one coarse region part may further comprise means for storing the map of motion values for at least one coarse region, the map of realness values for at least one coarse region and the map of blackness for at least one course region.

The means for generating the at least one characteristic value for at least one coarse region part may comprise means for periodically clearing the map of motion values for at least one coarse region, the map of realness values for at least one coarse region and the map of blackness values.

The means for determining a final map of motion values for at least one coarse region may comprise means for determining a final map of motion values for at least one coarse region based on the ratio of the characteristic value for at least one coarse region and the map of motion values for at least one coarse region.

The means for generating an image map from the at least one characteristic value for at least one region of the display output may comprise: means for generating a first image map dependent on at least a first characteristic value; means for generating a second image map dependent on at least a second characteristic value; and means for selecting one of the first and second image maps as the image map.

The means for generating an image map from the at least one characteristic value for at least one region of the display output may comprise means for generating an image map dependent on a first characteristic value gated by a second characteristic value.

The means for detecting at least one video window dependent on the image map may comprise means for detecting at least one of: a window border, and a video border.

The video window detector may further comprise means for verifying at least one border of the at least one video window.

The means for verifying at least one border may comprise means for comparing at least one border region of the at least one video window first iteration characteristic value against a second iteration characteristic value.

The means for verifying at least one border may comprise means for indicating a border fail when the number of border regions of the at least one video window first iteration characteristic value differ from the second iteration characteristic value is greater than a determined border line value.

The means for verifying at least one border may comprise means for comparing the characteristic value for regions within the at least one video window for a first iteration and a second iteration.

The means for verifying at least one border may comprise the means for comparing the characteristic value for regions within the at least one video window for a first iteration and a second iteration when the means for verifying at least one border determines a border fail.

The means for verifying at least one border may comprise means for indicating an inside border fail when the characteristic value for regions within the at least one video window for a first iteration and a second iteration differ by a determined inside border value.

BRIEF DESCRIPTION OF THE FIGURES

For better understanding of the present application, reference will now be made by way of example to the accompanying drawings in which:

FIG. 16 shows the fine video window search area for one coarse video window border according to some embodiments of the application;

FIG. 18 shows an example of a table scoring diagram generated score map which can be used by the rectangle verifier;

FIG. 19 shows a further example of a table scoring diagram generated score map which identifies cut rectangles;

FIG. 35 shows the two examples of the final detection after coarse and fine detection is completed;

FIG. 39 shows the case with a video window paused and without a video window according to some embodiments of the invention;

FIGS. 40A and 40B show the inside border difference in a histogram and cumulative transfer just before pause, and when paused according to some embodiments of the invention;

FIG. 44 shows an example of static map generation used for Full screen detection according to an embodiment of the present invention.

DETAILED DESCRIPTION OF THE PREFERRED EMBODIMENTS

The following describes in further detail suitable apparatus and possible mechanisms for the provision of video decoding.

Figure 1:
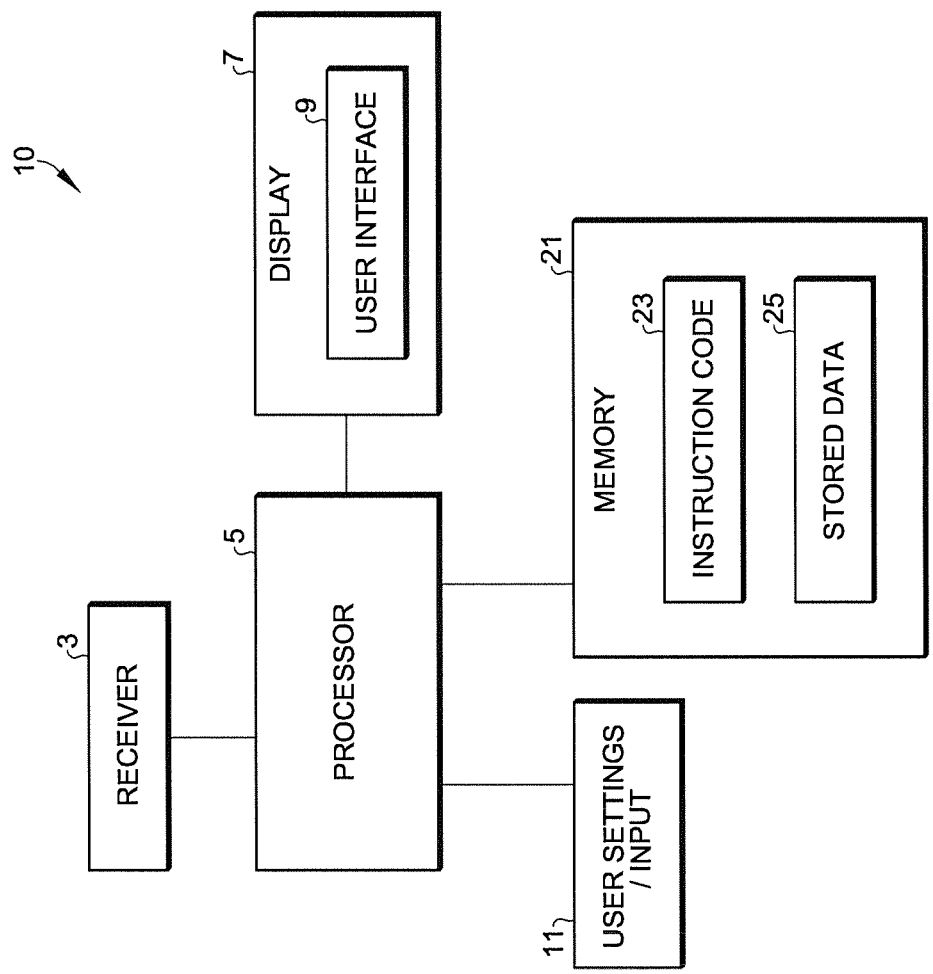
FIG. 1 shows schematically a system suitable for employing a LCD monitor/TV controller according to some embodiments of the application.

With respect to FIG. 1 an example system employing an electronic device or apparatus 10 is shown within which embodiments of the application can be implemented.

The apparatus 10 in some embodiments comprises a receiver 3 configured to receive a PC RGB (Red-Green-Blue) signal through a digital cable. The cable can for example be a DVI (Digital Video Interface), HDMI (High Definition Multimedia Interface), or a DP (DisplayPort) cable. However any suitable cable and video encoding format can be used to receive the signal. In some embodiments the receiver 3 can be controlled by the processor 5 to select the channel to be received.

The apparatus 10 in some embodiments comprises a processor 5 which can be configured to execute various program codes. The implemented program codes can comprise a LCD monitor/TV controller/Display controller for receiving the received video data and decoding and outputting the data to the display 7. The implemented program codes can be stored within a suitable memory.

In some embodiments the processor 5 can be coupled to memory 21. The memory 21 can further comprise an instruction code section 23 suitable for storing program codes implementable upon the processor 5. Furthermore in some embodiments the memory 21 can comprise a stored data section 25 for storing data, for example video data. The memory 21 can be any suitable storage means. In some embodiments the memory 21 can be implemented as part of the processors in a system-on-chip configuration.

The apparatus 10 can further comprise a display 7. The display can be any suitable display means featuring technology for example a cathode ray tube (CRT), light emitting diode (LED), variably backlight liquid crystal display (LCD) for example LED lit LCD, organic light emitting diode (OLED), and plasma display. The display 7 can furthermore be considered to provide a graphical user interface (GUI) providing a dialog window in which a user can implement and input how the apparatus 10 displays the video. In some embodiments the apparatus can be configured to communicate with a display remote from the physical apparatus by a suitable display interface, for example a High Definition Multimedia Interface (HDMI) or a Digital Video Interface (DVI) or be remodulated and transmitted to the display.

The apparatus 10 further can comprise a user input or user settings input apparatus 11. The user settings/input can in some embodiments be a series of buttons, switches or adjustable elements providing an input to the processor 5. In some embodiments the user input 11 and display 7 can be combined as a touch sensitive surface on the display, also known as a touch screen or touch display apparatus.

Figure 2:
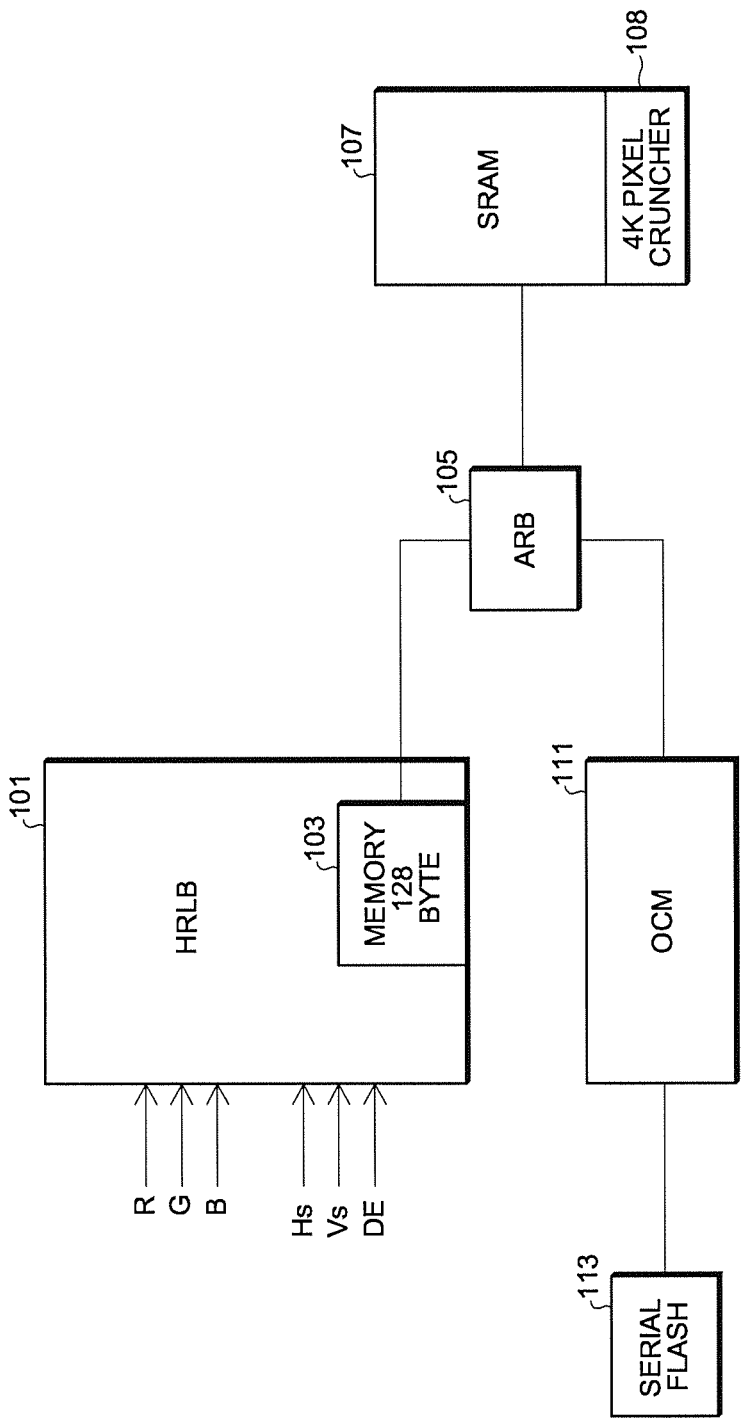
FIG. 2 shows schematically a hardware reconfigurable logic block system suitable for employing video processing for video window detection according to some embodiments of the application.

With respect to FIG. 2, an example processor and memory configuration is shown, on which can be implemented embodiments of the application. In some embodiments the processor can comprise a hardware reconfigurable logic block 101. The hardware reconfigurable logic block (HRLB) can be considered to be a digital signal processor configured to receive the video or graphics signal inputs such as shown as the R (red), G (green), B (blue) display signal format inputs and horizontal and vertical synchronization inputs Hs and Vs. Furthermore in some embodiments the hardware reconfigurable logic block 101 can be configured to receive a data enable input DE configured to indicate when video or graphics images are valid or active.

In some embodiments the R, G, B, Hs, Vs, and DE inputs can be generated by the receiver 3 of FIG. 1 or from a separate device (or processor) and passed to the hardware reconfigurable logic block. It would be understood that the concept of the application can be extended to any suitable video encoding can be employed, for example the input can be a composite input or composite components Y, C (U, V), Hs, Vs, and DE.

The hardware reconfigurable logic block 101 can in some embodiments comprise internal memory 103 integrated with the hardware reconfigurable logic block. For example as shown in FIG. 2 the hardware reconfigurable logic block 101 comprises a 128 byte memory. In some embodiments the internal memory 103 can be configured to operate as a cache memory storing pixel and pixel block data which is required often and so does not require the hardware reconfigurable logic block to make frequent memory requests to any external memory.

In some embodiments the hardware reconfigurable logic block 101 (via the memory 103) can access an arbiter 105. The arbiter 105 in some embodiments is configured to control the flow of data to and from the hardware reconfigurable logic block. For example in some embodiments the arbiter 105 can be further configured to be coupled to a memory such as a static random access memory 107. The SRAM 107 furthermore can in some embodiments comprise a designated hardware reconfigurable logic blocksection of memory 108. The hardware reconfigurable logic blocksection of memory 108 can for example in some embodiments store instructions or code to be performed on the hardware reconfigurable logic block and/or data used in processing the input signals (such as output data or results of processed input video/graphics signals).

In some embodiments the arbiter 105 can further be configured to couple to an on chip (or off chip) microcontroller/processor (OCM), which is responsible for the software part of the algorithm. The OCM 111 can further be configured to be coupled to further memory devices. For example as shown in FIG. 2 the arbiter can be further coupled to a serial flash memory device 113. It would be understood that any suitable memory can be used in addition to or to replace the serial flash device.

Figure 3:
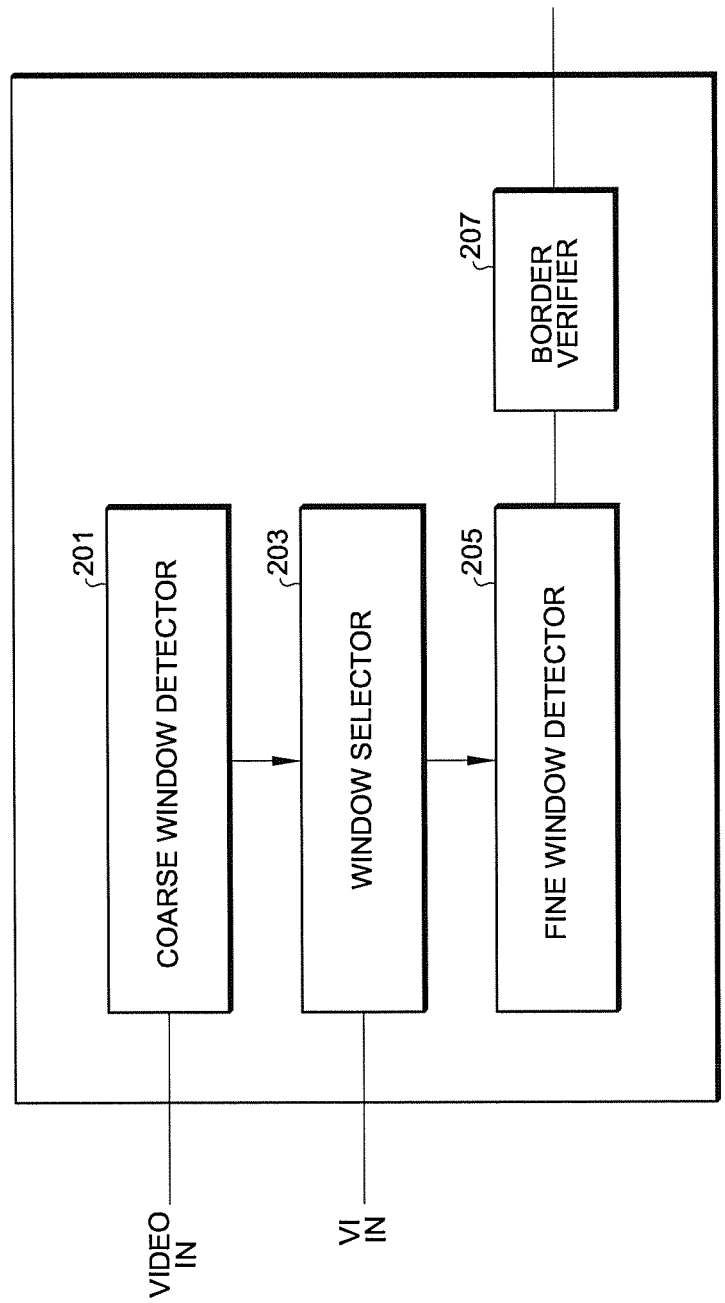
FIG. 3 shows schematically a video window detector according to some embodiments of the application.
Figure 4:
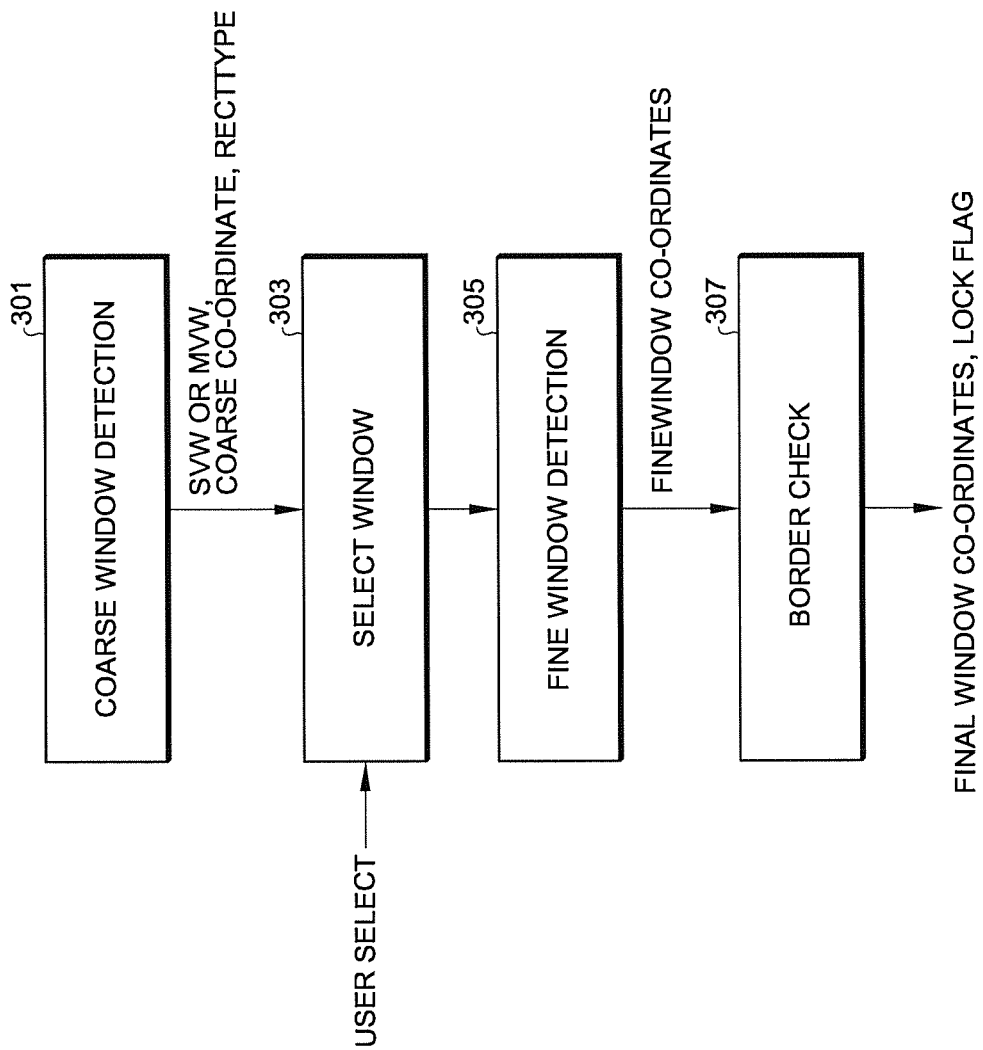
FIG. 4 shows a flow diagram of the video window detector in operation according to some embodiments of the application.

With respect to FIG. 3, a schematic view of the video window detector is shown, and with respect to FIG. 4, the operation of the video window detector as shown in FIG. 3 is shown.

In some embodiments the video window detector can comprise a coarse video window detector 201. The coarse window detector can be configured to receive the video signal input and output information indicating where a detected rectangle video window or more than one video window is located as a coarse video window detection operation. The information about any windows detected via the coarse window detector 201 can then be passed to a window selector 203. In some embodiments the information passed to the window selector comprises at least one of SVW (single video window) or MVW (multiple video window) and further information such as coarse window co-ordinates, defining the location and size of the coarse window and furthermore the rectangle type. In some embodiments the rectangle type can be an indicator representing the rectangle being one of: not a Rectangle; a perfect Rectangle; a cut Rectangle; and not a Perfect Rectangle.

The operation of detecting a coarse video window is shown in FIG. 4 by step 301.

In some embodiments the video window detector further comprises a video window selector 203. The video window selector 203 in some embodiments can, for example, be configured to receive the coarse video window detection outputs and furthermore a user interface input and output a suitably selected video window to the fine window detector 205. In some embodiments the video window selector can therefore receive a user interface input indicating detected video windows and select from the coarse video window indicators which match the user input selection. In other words the user selection employed in some embodiments is based on the result of the coarse video window detector. Where two or more windows are detected then user selection is employed to select one of these detected windows, for example either a bigger or smaller video window. The user can in some embodiments select the video window through a menu and/or buttons or any other suitable selection apparatus. In some embodiments the user selection can be based on a predefined preference such as bigger or smaller window.

The operation of selecting the window is shown in FIG. 4 by step 303.

In some embodiments the video window detector further comprises a fine video window detector 205. The fine video window detector can be configured to receive the selected video window indication such as coarse video window co-ordinates and rectangle type and determine the border (or fine edge) of the video window by 'zooming' near each side of the coarse video window rectangle.

The output of the fine window co-ordinates by the fine video window detector 205 is shown in FIG. 4 by the step 305.

In some embodiments the video window detector 205 further comprises a border verifier 207. The border verifier 207 can be configured to receive the fine video window co-ordinates and perform a check for the border content on all of the sides of the detected video window in order to determine that the video window defined by the border is still there and has not been moved, minimized or closed.

The operation of checking the border to output a final video window co-ordinate and a lock flag indicating that the video window is stable is shown in FIG. 3.

It would be understood that in some embodiments the output of the final video window co-ordinates can be passed to an image processor for improving the video image being output by the display for that particular video window.

Figure 5:
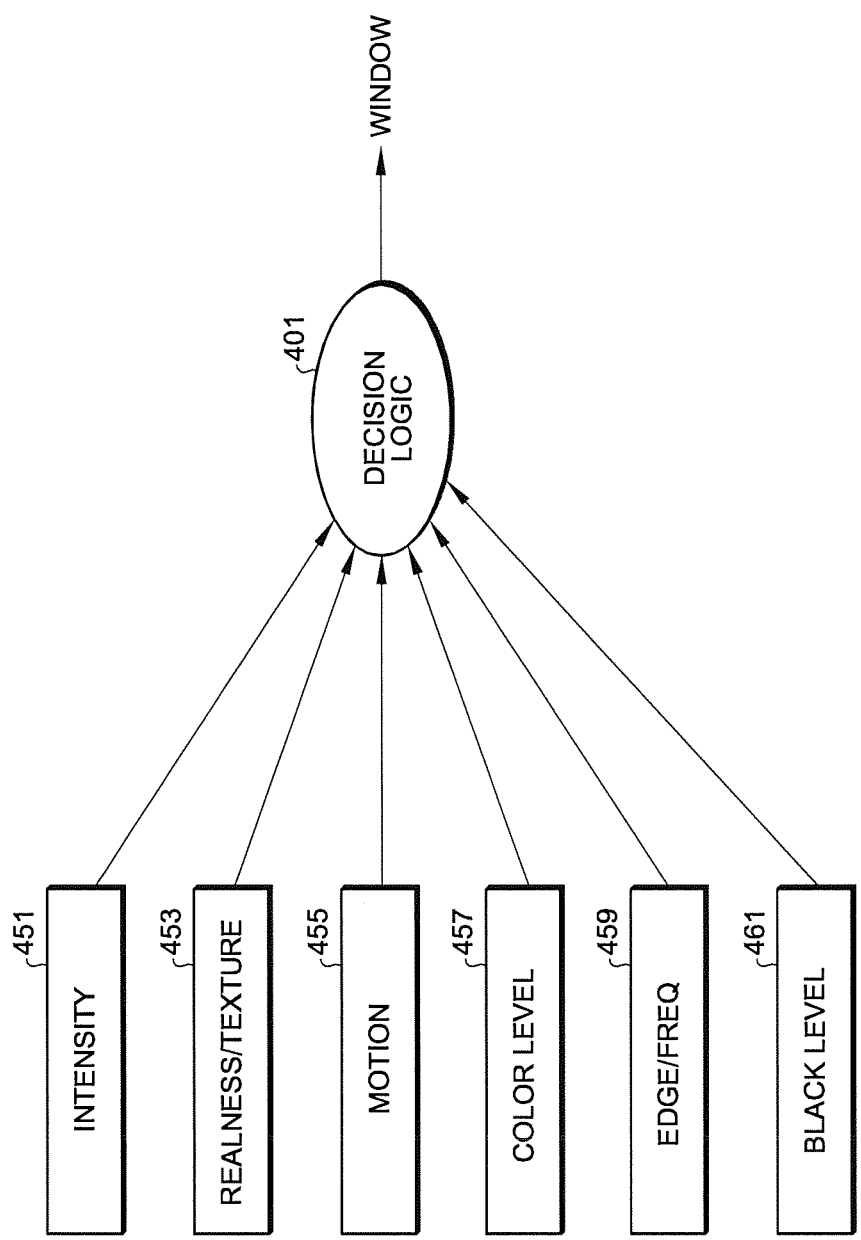
FIG. 5 shows schematically a video window detector concept according to some embodiments of the application.

With respect to FIG. 5 the concept behind each of the multistage video window detection operations is shown schematically. In each of the stages described herein, for example coarse video window detection, fine video window detection, border verification, etc. values can be determined from the PC graphics input signal and passed to a decision logic 401 wherein a weighted input calculation can be determined to decide where the video window position is. For example as shown in FIG. 5 the inputs to the decision logic can be any of: image/pixel intensity, such as determined by an intensity determiner 451; realness/texture values as determined by a realness/texture determiner 453 (used to differentiate graphic and video picture content); motion values such as determined by a motion detector 455 (used to differentiate moving and still content); color level values such as determined by the color level determiner 457; edge/frequency values such as determined by an edge/frequency determiner 459 (used to differentiate graphic and video picture content); and black level values such as determined by a black level determiner 461.

Each of these values can be passed to the decision logic 401, and these input values can be processed by the decision logic 401 to determine any windows and furthermore the co-ordinates and shapes describing the detected video windows.

Figure 6:
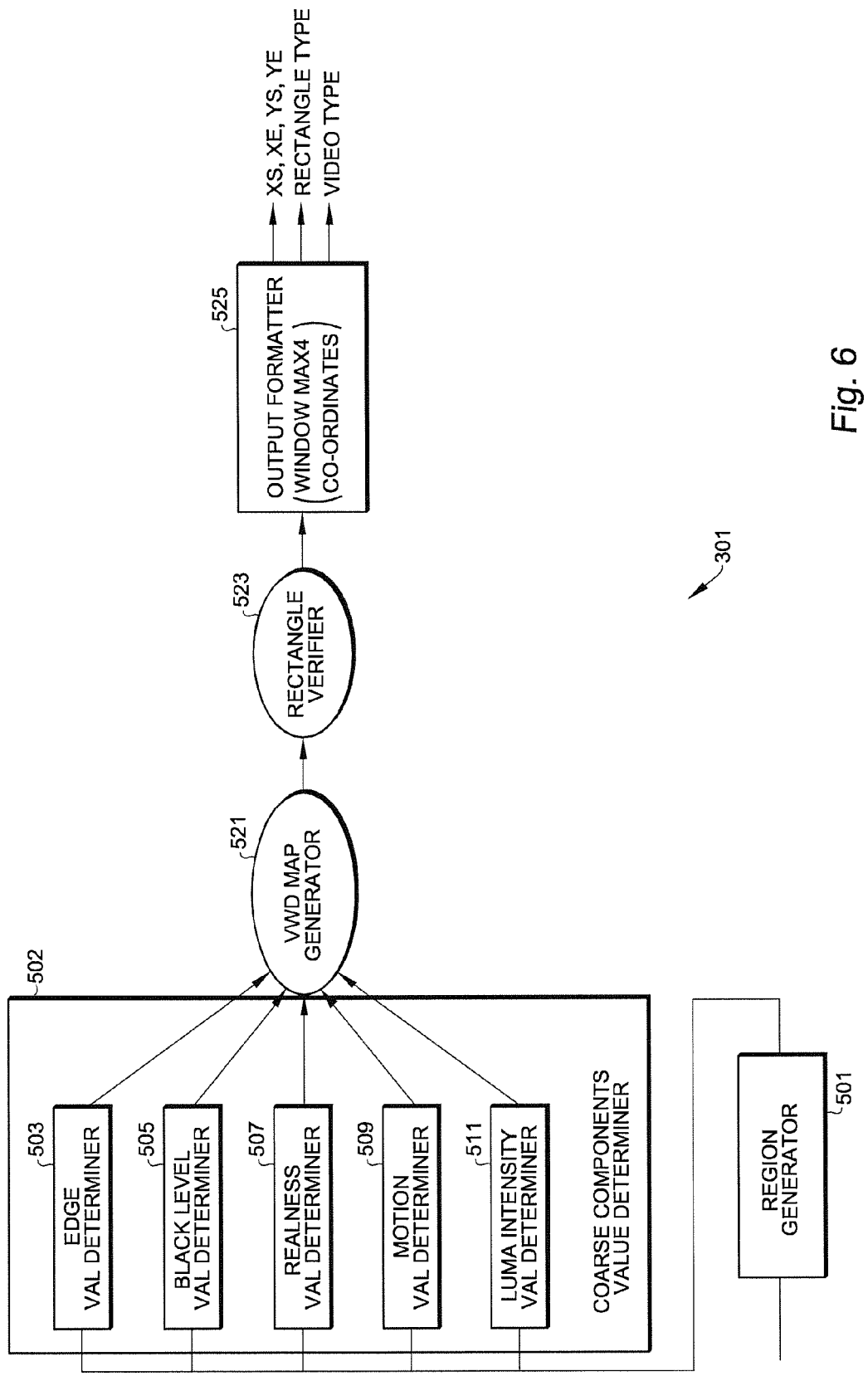
FIG. 6 shows a coarse video window detector as shown in FIG. 3 according to some embodiments of the application.

For example with respect to FIG. 6 a coarse video window detector according to some embodiments of the application is shown. Furthermore with respect to FIGS. 7A and 7B, the operation of the coarse video window detector is described in flow diagram form.

In some embodiments the coarse video window detector 301 can comprise a region generator 501. The region generator 501 can be configured to divide each input frame into a number of regions or image blocks. In the following description, each of the image blocks are of an equal size in physical dimension, however it would be understood that non-equal sized blocks can be used in some embodiments. The regions or image blocks can be organized into rows and columns, for example N rows and M columns. In some embodiments the region generator 501 can be configured to divide the input frame into 32 columns and 30 rows of image blocks (producing 960 rectangular image blocks per frame). In some embodiments the image blocks need not be square nor need not be an equal size, for example in some implementations the center of the display or where the real image is expected can have smaller blocks.

The coarse video window detector in some embodiments can comprise a coarse components value determiner 502. The coarse components value determiner can comprise any suitable component or characteristic determiner. For example, as shown in FIG. 6, the coarse components value determiner 502 can comprise an edge value determiner 503 configured to receive the image block data and detect whether an edge (or high frequency component) within the image block. For example in some embodiments the image block can be time to frequency domain converted and high frequency components detected within the edge value determiner.

Furthermore as shown in FIG. 6, the coarse components value determiner 502 can comprise a black level value determiner 505. The black level is defined typically as the level of brightness at the darkest (black) part of the image block.

In some embodiments the coarse components value determiner 502 can comprise a realness value determiner 507 configured to receive the image block and other data from other value determiners to output a value of whether or not the image block is "real" or "synthetic", in other words whether or not the block appears to a part of a video image or a graphic display.

In some embodiments the coarse components value determiner 502 comprises a motion value determiner 509. The motion value determiner 509 can be configured to receive the image data and other data from other determiners and determine whether or not the image block is constant or has a component of motion from frame to frame.

The coarse components value determiner 502 can further comprise a luma intensity value determiner 511 configured to determine the luma (L) value of the image input. It will be understood that any RGB signal comprising the color portions red (R), green (G) and blue (B) can be transformed into a YUV signal comprising the luminance portion Y and two chroma portions U and V. For example converting the RGB color space into a corresponding YUV color space enables the image block luminance portion Y to be determined.

The coarse video window detector can further comprise a variable video window detector VWD map generator 521 configured to receive the outputs from the coarse components determiner components and generate a window mapping.

The coarse video window detector can then using the generated map to determine suitable window rectangles and pass these values to the rectangle verifier 523 and output formatter 525.

Figure 7A:
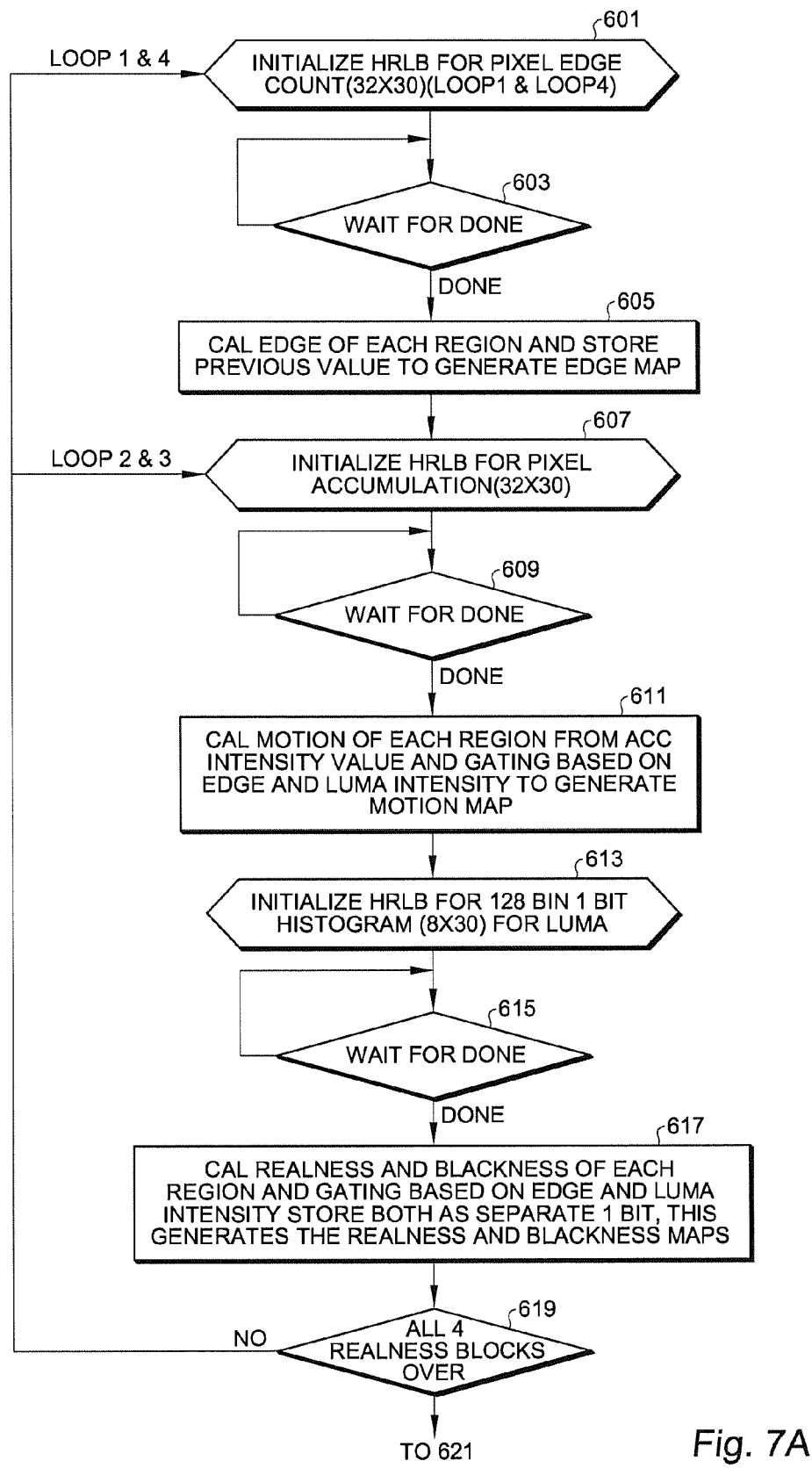
FIGS. 7A and 7B show a flow diagram of the coarse window detector in operation according to some embodiments of the application.

As shown in FIG. 7A in some embodiments the first operations of the coarse video window detector 201 can be considered to be the initial determination of component values for the coarse image blocks.

The operation of generating or initializing a hardware reconfigurable logic block (HRLB) for pixel edge counting is shown in FIG. 7A by step 601. Furthermore the operation of waiting until the initialization of the reconfigurable logic block has been completed follows the initialization counter step as shown in FIG. 7A by step 603. The waiting operation can be due to several reasons such as the hardware reconfigurable logic block in order to determine the different image parameter values (such as the Edge, Realness values etc) and is required to be configured differently for each parameter, and furthermore needs the region and size definition of each image block. Also, once configured, the hardware reconfigurable logic block then for the start of a frame captures the required information. Furthermore once the complete frame parameter is determined the hardware reconfigurable logic block indicates to the processor that the hardware reconfigurable logic block has finished the required capture/operation for that frame.

Once the hardware reconfigurable logic block has been initialized, the edge value determiner 503 can be configured to determine the edge value for each region and store the previous block value to generate an edge map. In some embodiments the edge value is the count of horizontal edges above a certain threshold.

The operation of calculating the edge value for each region and storing the previous values to generate an edge map is shown in FIG. 7A by step 605.

Furthermore in some embodiments the hardware reconfigurable logic block or a further hardware reconfigurable logic block can be initialized.

The operation of initializing the hardware reconfigurable logic block or a further hardware reconfigurable logic block for pixel accumulation for each image block or region is shown in FIG. 7A by step 607.

A similar waiting for the initialization process to complete is shown in FIG. 7A by step 609.

Once the pixel accumulation value initialization operation is completed then the motion value determiner 509 can be configured to calculate a motion component value for each region/image block 611. The motion detection value can be determined for example from the absolute difference of current and previous accumulated intensity values. The absolute difference is gated by edge and luma intensity to generate the motion map. The motion map is written in such a way that the map has a persistence effect. So, the map is a persistent map.

In some embodiments for each of the image blocks, a luminance histogram can for example be determined wherein for each block where there is at least one pixel with a pixel intensity value range the histogram has a binary active '1' value and where there are no pixels with that intensity value range the histogram has a binary non-active '0' value. In other words each of the luminance histogram values can be represented by a single bit indicating whether or not a particular range of luminance values is represented in the region or image block.

The operation of initializing or calculating the values for the 128 bin 1 bit histogram for the luma is shown in FIG. 7A by step 613.

The wait operation for the calculation for each image block is shown in FIG. 7A by step 615.

Once the histogram for each region has been determined, the realness value determiner 507 and the black level value determiner 505 can determine the realness and black level values gated with the edge and luma intensity values. The gating is done for distinguishing video from graphics. The gated realness and black level values are stored as separate 1 bit values. These values can then be used to generate the realness and blackness maps. The realness and blackness maps are written in such a way that the maps also have persistence effect.

The operation of calculating the realness and blackness of each region and gating based on the edge and luma intensity store is shown in FIG. 7A by step 617.

In some embodiments the density of represented luminance values in the image frame can be used to determine the likelihood of the image being real. In some other embodiments the pattern of represented bins can be used to determine the realness. In some further embodiments the range of luminance values in the image block can be used to determine the realness.

In some embodiments a combination of one or more of the described realness determinations can be used to generate the realness value on a scale from 0 to 10 where 0 indicates an entirely synthetic image block and 10 indicates an entirely real image block.

In some embodiments the VWD window determiner detects whether or not all four realness blocks are determined. For realness determinations a histogram is used. To capture the histogram values a quarter of the complete map is used, so all four loops are required to generate a complete map. This checking of all four realness blocks is therefore a check for four complete loops. These four captures of histogram values are not performed one after another but other components such as edge and accumulation can be added in sequence. This can therefore in some embodiments be done in any order.

The operation of checking if all four realness loops are determined is shown in FIG. 7A by step 619. Where all four realness loops have been determined the VWD map generator 521 can determine a complete video map; however, where all four realness loops have not been determined the coarse components value determiner 502 can perform further loops of the operations described herein.

For example for the second and third loops the coarse components value determiner 502 can start at the operation of initializing the hardware reconfigurable logic block for pixel accumulation (step 607) whereas for the first and fourth loops can start at the operation of initializing the hardware reconfigurable logic block for pixel edge determination (step 601).

The VWD map generator 521 can then be configured to determine a final video map based on motion and realness or black values gated by the edge and luma intensity values.

Figure 7B:
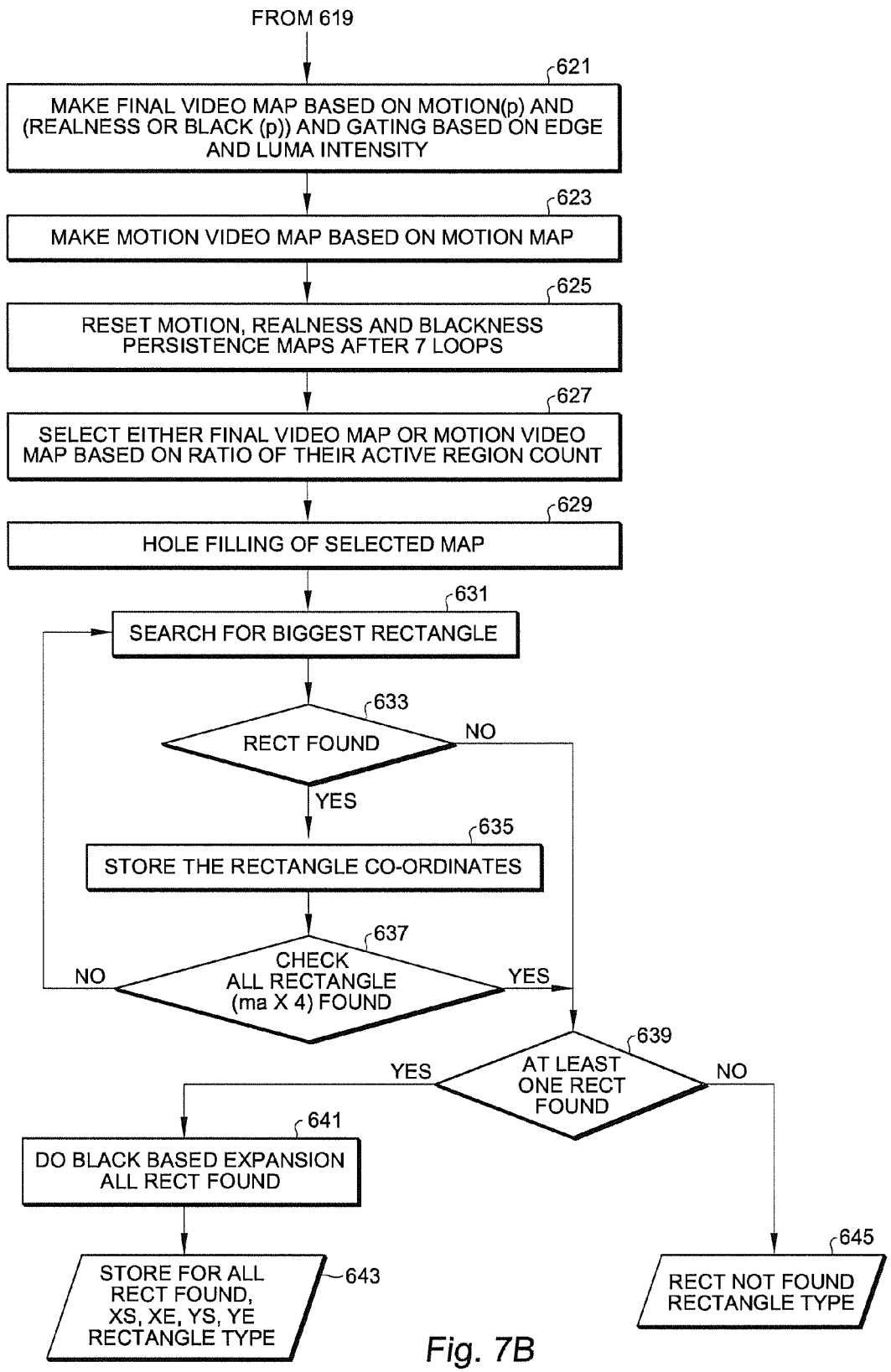

The generation of the final video map generation can be seen in FIG. 7B by step 621.

Furthermore the VWD map generator 521 can then generate the motion video map based on the motion map.

The operation of generating the motion video map is shown in FIG. 7B by step 623.

The motion, realness and blackness persistence maps can be reset after a number of loops. For example in some embodiments the maps can be reset after seven loops.

The resetting of the motion, realness and blackness persistence maps is shown in FIG. 7B in operation step 625.

Furthermore in some embodiments the VWD map generator 521 can be configured to select either the final video map or motion video map based on the ratio of their active region count.

Figure 17:
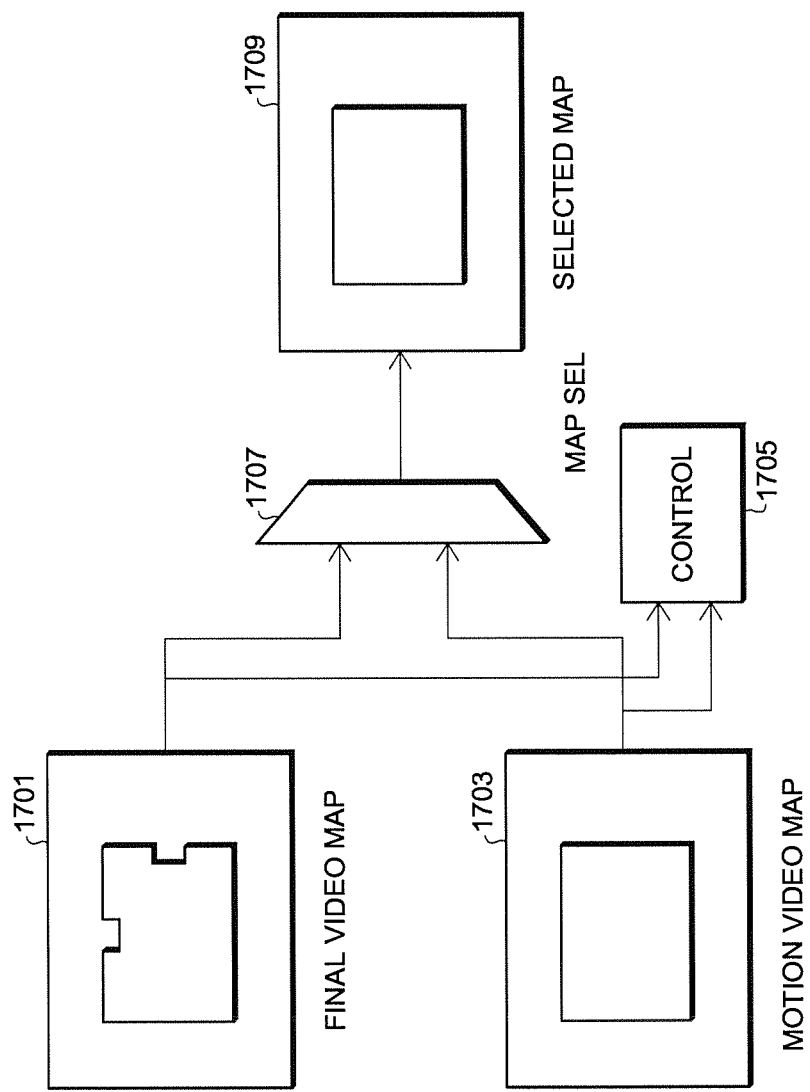
FIG. 17 shows an example video window map selection according to some embodiments of the application.

For example as shown in FIG. 17 there can be a final video map 1601 and a motion video map 1603. The VWD map generator 521 can furthermore determine as shown in FIG. 17 in a controller the ratio value. For example the ratio can be defined by the following mathematical expression:

$$\text{Ratio} = \frac{CountFinal * 255}{CountMotion},$$

where CountFinal is defined as the number of regions filled in a 32×30 array of gated Final VideoMap and CountMotion is defined as the number of regions filled in a 32×30 array of gated Motion Video Map. The control 165 can furthermore make the decision to select either of the maps according to the following rule: Map Sel=(Ratio>Some Threshold value {e.g. 150}) && (CountMotion>CountFinal), and control the multiplexer 1607 to select the map according the MapSel signal and thus output a selected map 1609.

The selection of either the final video map or motion video map is shown in FIG. 7B by step 627.

Furthermore the VWD map generator 521 in some embodiments can fill holes due to missing image blocks from the selected map. The VWD map generator 521 can be configured to use any suitable hole filling method, for example linear interpolation, or non-linear interpolation.

The operation of a hole filling any missing image block values from the selected map is shown in FIG. 7B by step 629.

The rectangle verifier 523 can then receive the selected map and search for the largest or biggest rectangle of values started.

The operation of starting searching for the biggest rectangle is shown in FIG. 7B by step 631.

The rectangle verifier 523 can then in some embodiments search the map to determine whether or not a 'rectangle' has been found.

The operation of checking the map for a rectangle is shown in FIG. 7B by step 633.

Where a rectangle has been found, the rectangle verifier 523 can be configured to store the rectangle co-ordinates.

The operation of storing the rectangle co-ordinates is shown in FIG. 7B by step 635.

Furthermore in some embodiments the rectangle verifier 523 can perform a further check operation to determine whether the map has been completely searched for rectangles. Furthermore in some embodiments the rectangle verifier 523 can be configured to limit the number of rectangles stored. For example the rectangle verifier 523 can be configured to store the largest four rectangles.

The operation of checking that all rectangles have been detected is shown in FIG. 7B by step 637.

Where there are possibly further rectangles to be found, the operation passes back to the search for further rectangles, in other words returns to the operation shown by step 631.

Where all rectangle candidates have been found such as following the positive output of checking that all rectangles have been found (step 637) or no rectangles have been found such as following the negative output of the found rectangle check (step 633), the rectangle verifier 523 can be configured to perform a further check operation to determine whether at least one rectangle has been found.

The operation of checking that at least one rectangle has been found is shown in FIG. 7B by step 639.

Where the rectangle verifier 523 determines that no rectangles have been found the rectangle verifier 523 can output an indicator that no rectangles have been found in terms of a rectangle type message with a "Rect not found" value. In such examples the operation to determine any video windows can remain in the coarse window detection cycle.

The operation of outputting a rectangle not found indicator is shown in FIG. 7B by step 645.

Where the rectangle verifier 523 determines that at least one rectangle has been found, the rectangle verifier 523 can then perform black based expansion can be found on all the rectangles stored and found. The content inside the video window can for example be letterbox (black regions on top & bottom) or pillarbox (black regions on left or right) or otherwise based on video content or the position of the video window or other non-video window over video window. The black based expansion thus enables the detection of the border of the video window and not the actual active video border The operation of performing black based expansion on all of the found rectangles is shown in FIG. 7B by step 641.

The output of the rectangle verifier 523 can then be passed to the output formatter 525 which can be configured to format the information on the rectangle candidates. For example the output formatter 525 can be configured to output the start and end co-ordinates for the rectangle in the form of co-ordinates XS (x-co-ordinate start), XE (x-co-ordinate end), YS (y-co-ordinate start) and YE (y-co-ordinate end). Furthermore in some embodiments the output formatter 525 can be configured to output the rectangle type and also the video type.

This operation of outputting the coarse window rectangle candidate co-ordinates is shown in FIG. 7B by step 643.

Figure 8:
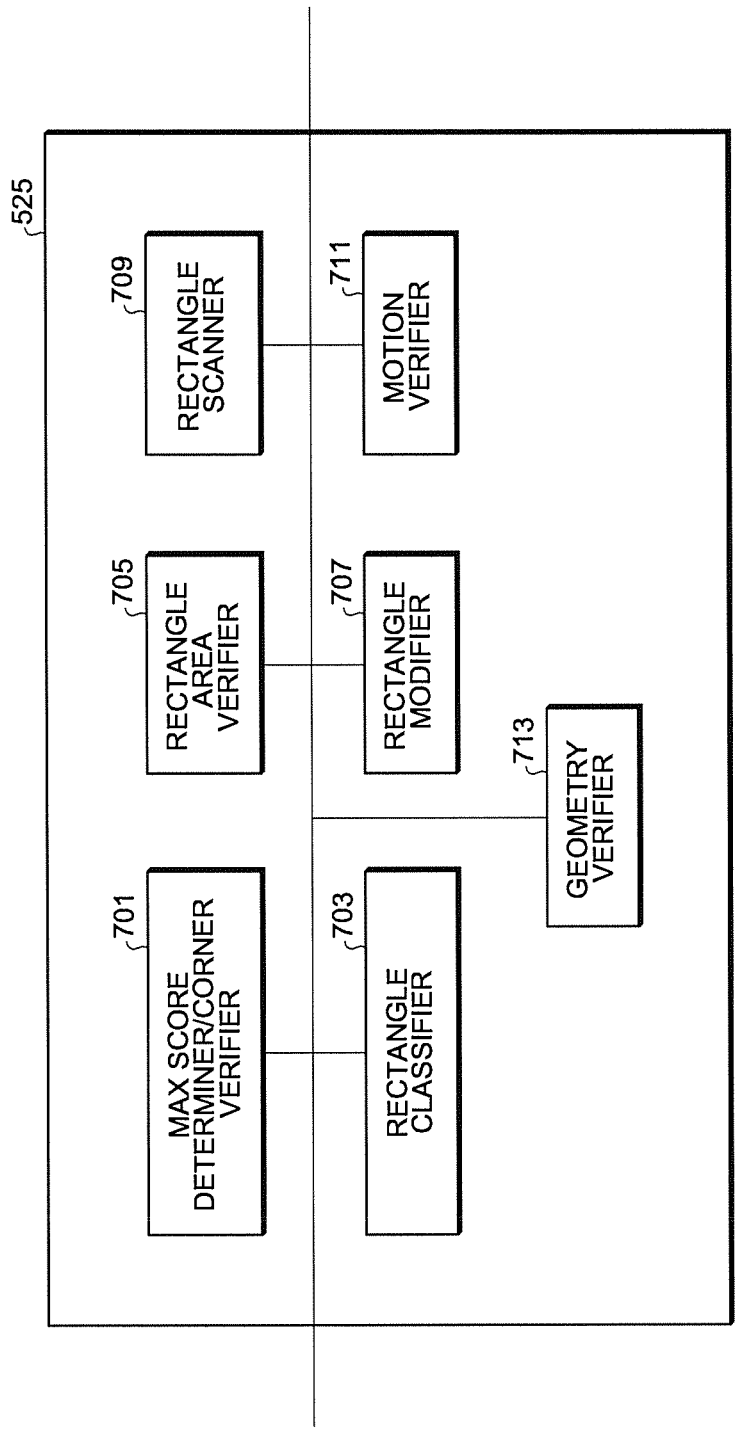
FIG. 8 shows schematically the rectangle verifier shown in FIG. 6 according to some embodiments of the application.

With respect to FIG. 8 the rectangle verifier 523 is shown in further detail. Furthermore with respect to FIGS. 9A and 9B the operation of the rectangle verifier 523 in detecting rectangles is shown in further detail.

In some embodiments the rectangle verifier 523 can comprise a max score determiner/corner verifier 701. The max score determiner/corner verifier 701 can be configured to receive the selected map and generate a score map of the selected map. The scoring can for example be performed in such way that the top left corner of the rectangle has a value of 1 and bottom right corner of the rectangle will have the max value based on the size of the rectangle. FIG. 18 for example shows a table scoring diagram where the outlined region 1701 is the generated score map for the rectangle.

Figure 9A:
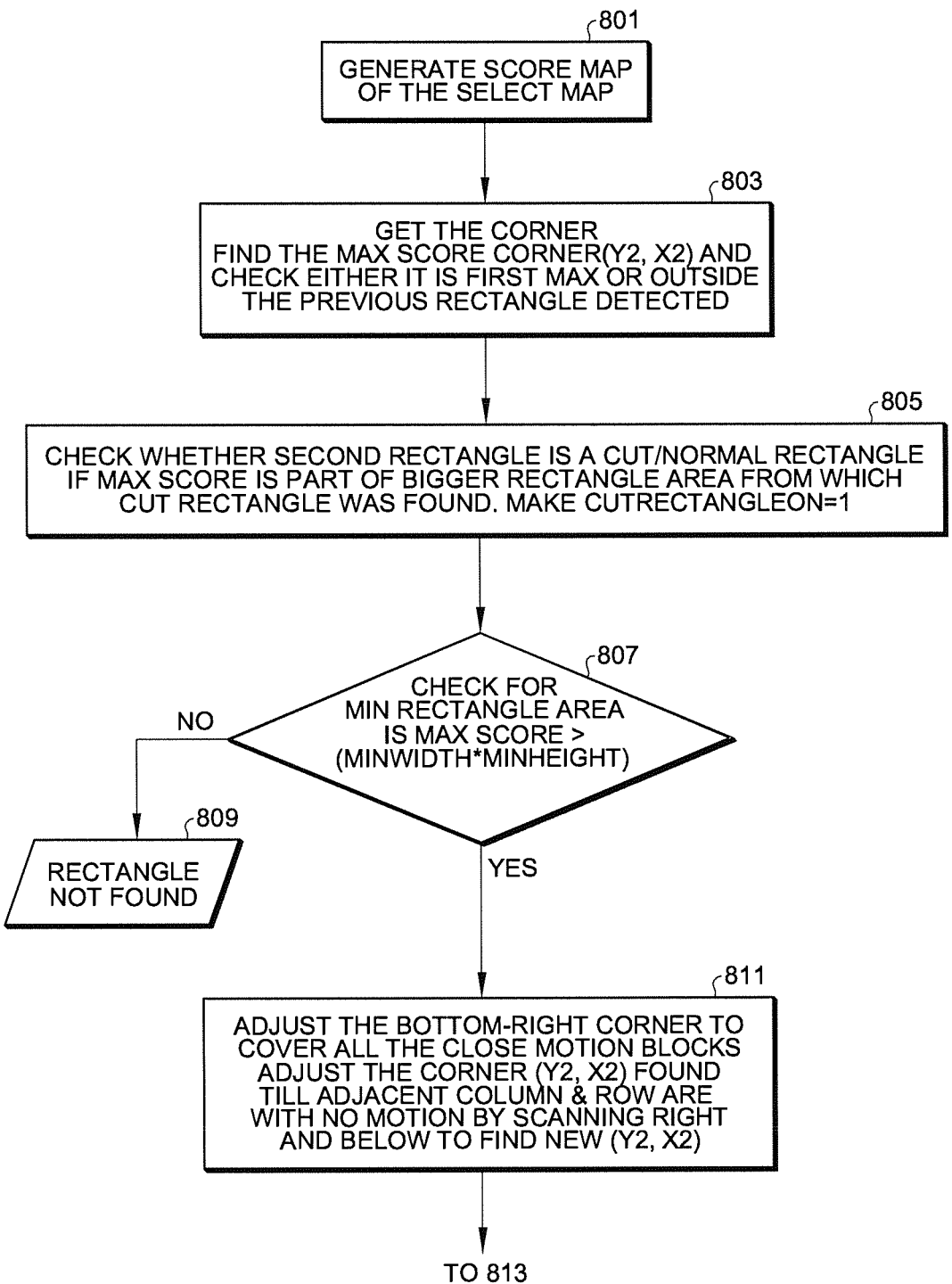
FIGS. 9A and 9B show the operation of the rectangle verifier in operation according to some embodiments of the application.

The operation of generating the score mapping from the selected map is shown in FIG. 9A by step 801.

The max score determiner/corner verifier 701 can furthermore be configured to determine a 'max score corner', in other words the max score determiner/corner verifier 701 determines a corner position in the score map with a maximum score (and assigns co-ordinates of Y2, X2). Furthermore the max score determiner/corner verifier 701 can determine whether the detected 'max score corner' is a first maximum or outside a previously detected rectangle. Where the 'max score corner' is neither one of a first maximum or outside a previously detected rectangle the max score determiner/corner verifier 701 ignores this candidate and returns to finding further corner candidates.

The operation of getting the corner (or finding the max score corner and determining that it is outside any previously determined rectangle or a first max score) is shown in FIG. 9A by step 803.

The rectangle verifier 523 can further in some embodiments comprise a rectangle classifier 703. The rectangle classifier 703 can determine whether or not the candidate rectangle is a cut or a normal rectangle. A cut rectangle is where either a small video window is playing adjacent to a bigger video window (for example a webpage with flash advertisements playing next to a video window) or some other non-video window is kept over the video window forming an incomplete rectangle video window. The cut rectangle, wherein the motion map forms a non-rectangle, would in some embodiments be validated and then cut to form a rectangle.

The rectangle classifier 703 can thus in some embodiments determine whether the 'max score' region is part of a bigger rectangle area from which the cut rectangle was found. In some embodiments the rectangle classifier 703 can assign a CutRectangleON flag a value of 1 when the 'max score' is part of the bigger rectangle area.

In some embodiments the rectangle verifier 523 can further comprise a rectangle area verifier 705. The rectangle area verifier 705 can be configured to check the 'max score' candidate rectangle for a minimum rectangle area threshold. In other words where the candidate rectangle is smaller than a product of minimum width (MinWIDTH) and minimum height (MinHEIGHT) then the rectangle area verifier can determine that no rectangle has been found.

The operation of area verification of the candidate rectangle is shown in FIG. 9A by step 807.

Furthermore the operation following a failing area minimum verification and outputting that no rectangle is found from this candidate is shown in FIG. 9A by step 809.

Furthermore in some embodiments the rectangle verifier 523 can comprise a rectangle modifier 707. The rectangle modifier 707 can be configured to adjust the candidate rectangle, in other words to modify the size of the rectangle in question.

Thus in some embodiments the rectangle modifier 707 can be configured to modify or adjust the corner value (Y2, X2) scanning right along rows and down along columns of the motion map until the column and row are found with no motion values. These no motion values can then be used by the rectangle modifier 707 to define new co-ordinates defining the new Y2 and X2 co-ordinates.

The operation of adjusting the bottom-right corner of the candidate rectangle to cover the close motion blocks is shown in FIG. 9A by step 811.

In some embodiments the rectangle verifier can comprise a rectangle scanner 709. The rectangle scanner can from the X2 and Y2 values scan left and up respectively until a region with no motion is found.

The rectangle scanner 709 can therefore scan left from the X2 value to determine the X1 co-ordinate. Furthermore the rectangle scanner can furthermore store the values of X1 as RectColStart[ ], X2 as RectColEnd[ ] and X2−X1 as number of regions RectCol[ ].

Figure 9B:
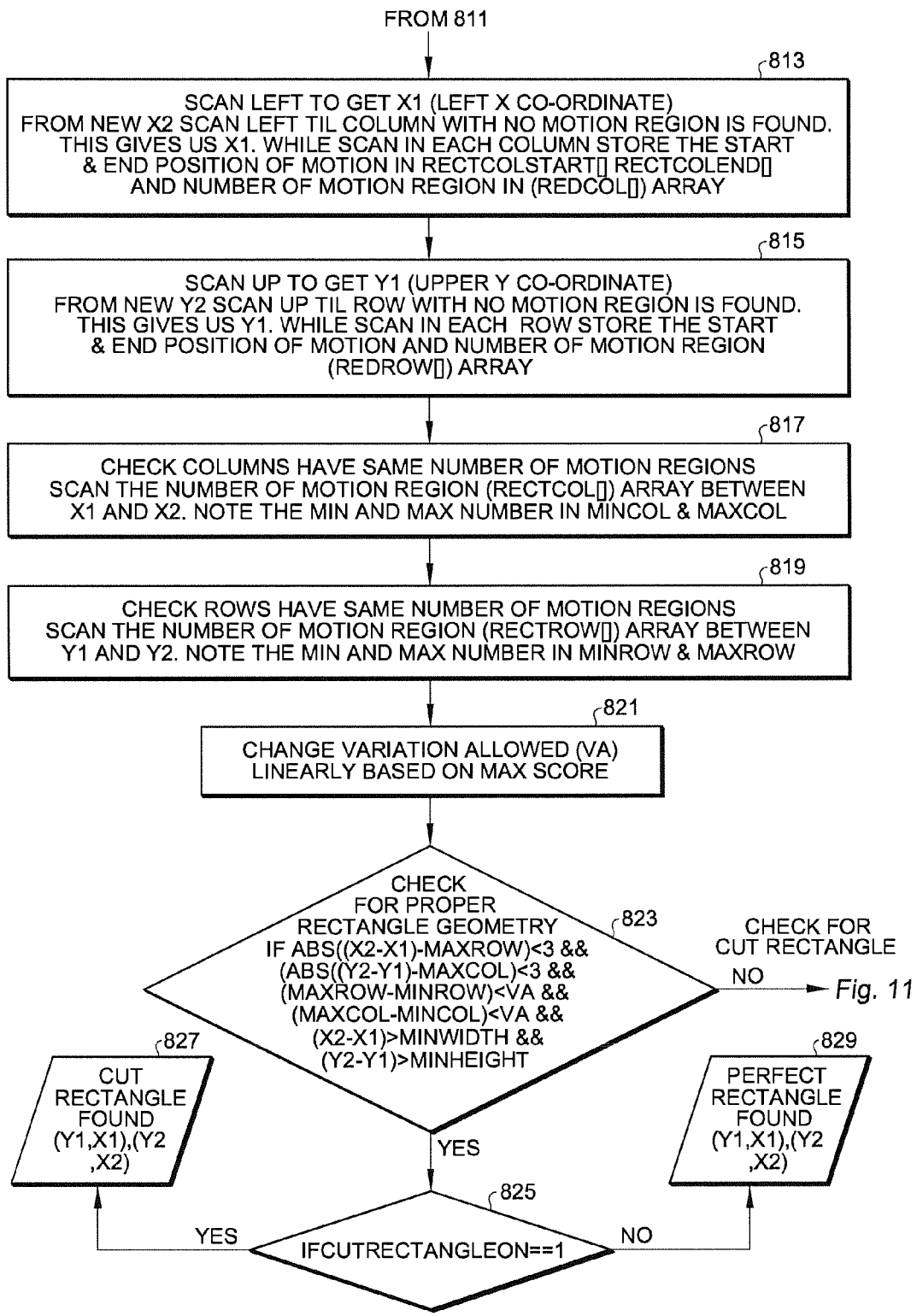

The operation of scanning from the X2 variable to the column with no motion region is found is shown in FIG. 9B by step 813.

The rectangle scanner 709 can therefore scan up from the Y2 value to determine the Y1 co-ordinate. Furthermore the rectangle scanner can furthermore store the values of Y1 as RectRowStart[ ], Y2 as RectRowEnd[ ] and Y2−Y1 as number of regions RectRow[ ].

The operation of scanning from the X2 variable to the row with no motion region is found is shown in FIG. 9B by step 813.

In some embodiments the rectangle verifier comprises a motion verifier 711. The motion verifier 711 can be configured to scan the number of motion regions such as RectCol[ ] between X1 and X2 and store the minimum and maximum numbers in the variables mincol and maxcol.

The checking of columns having the same number of motion region operations is shown in FIG. 9B by step 817.

The motion verifier 711 can be configured to scan the number of motion regions such as RectRow[ ] between Y1 and Y2 and store the minimum and maximum numbers in the variables minrow and maxrow.

The checking of rows having the same number of motion regions is shown in FIG. 9B by step 819. This therefore checks where the rectangle is almost filled, based on the threshold VA to classify it as perfect rectangle. The VA (variation allowed within a perfect rectangle) can vary based on the rectangle size.

In some embodiments the rectangle verifier comprises a geometry verifier 713. The geometry verifier 713 is configured to determine a change variation parameter which is configured to define an error value against which the rectangle geometry can be tested. In some embodiments the geometry verifier 713 can be configured to determine the change variation allowed (VA) based on a linear factor and the maximum score value of the candidate rectangle.

The operation of defining the variation allowed value is shown in FIG. 9B by step 821.

The geometry verifier 713 can then furthermore be configured to determine whether the rectangle geometry is correct. For example the geometry verifier 713 can determine whether the candidate rectangle is proper when the following expression is correct:

$Rect\text{Correct}=abs((X2-X1)-\text{maxrow})<3\&\&(abs((Y2-Y1)-\text{max}col)<3\&\&(\text{maxrow}-\text{minrow})<VA\&\&(\text{max}col-\text{min}col)<VA\&\&(X2-X1)>\text{MinWIDTH}\&\&(Y2-Y1)<\text{MinHEIGHT}$ Where the geometry verifier 713 determines the rectangle is not proper, for example RectCorrect==0, then the geometry verifier 713 can furthermore be configured to perform a cut rectangle check operation.

Where the geometry verifier 713 determines the rectangle is proper, for example RectCorrect==1 is the case of perfect rectangle and where RectCorrect==0 then the geometry verifier 713 can furthermore be configured to perform an examination of the cut rectangle flag.

The operation of checking the cut rectangle flag is shown in FIG. 9B by step 825.

Where the geometry verifier 713 determines that the cut rectangle flag CUTRECTANGLEON==1 (is true) then the rectangle verifier outputs an indication that a cut rectangle has been found.

The operation of indicating a cut rectangle with the co-ordinates defined by (Y1,X1) and (Y2,X2) is shown in FIG. 9B by step 827.

Where the geometry verifier 713 determines that the cut rectangle flag CUTRECTANGLEON==0 (is false) then the rectangle verifier outputs an indication that a perfect rectangle has been found with the co-ordinates defined by (Y1, X1) and (Y2,X2).

The operation of indicating a perfect rectangle with the co-ordinates defined by (Y1,X1) and (Y2,X2) is shown in FIG. 9B by step 829.

Figure 10:
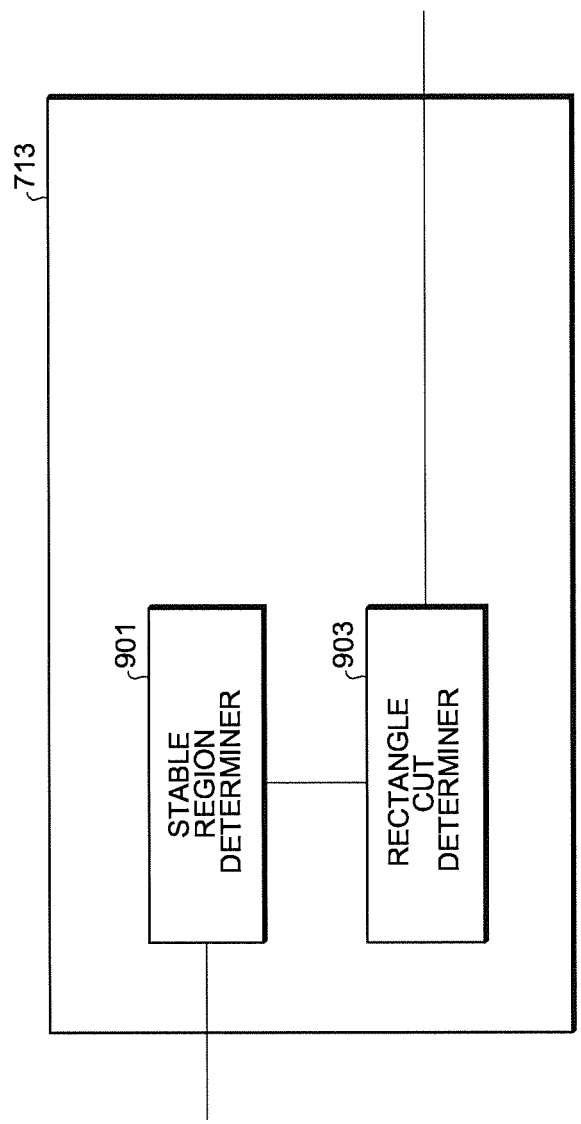
FIG. 10 shows schematically the rectangle geometry verifier according to some embodiments of the application.

With respect to FIG. 10 the geometry verifier 713 (with respect to detecting or checking for a cut rectangle) is shown in further detail. Furthermore the operation of the geometry verifier as a cut rectangle detector is shown in further detail in FIGS. 11A, 11B, and 11C.

The geometry detector 713 in some embodiments can comprise a stable region determiner 901 and a rectangle cut determiner 903.

The stable region determiner 901 can be configured to follow the rectangle being identified either through cut or normal to extract secondary rectangles when a non-perfect rectangle window is detected. For example a webpage with a small video adjacent to a big video will detect the big rectangle first, then the small rectangle can be checked for validating.

Figure 11A:
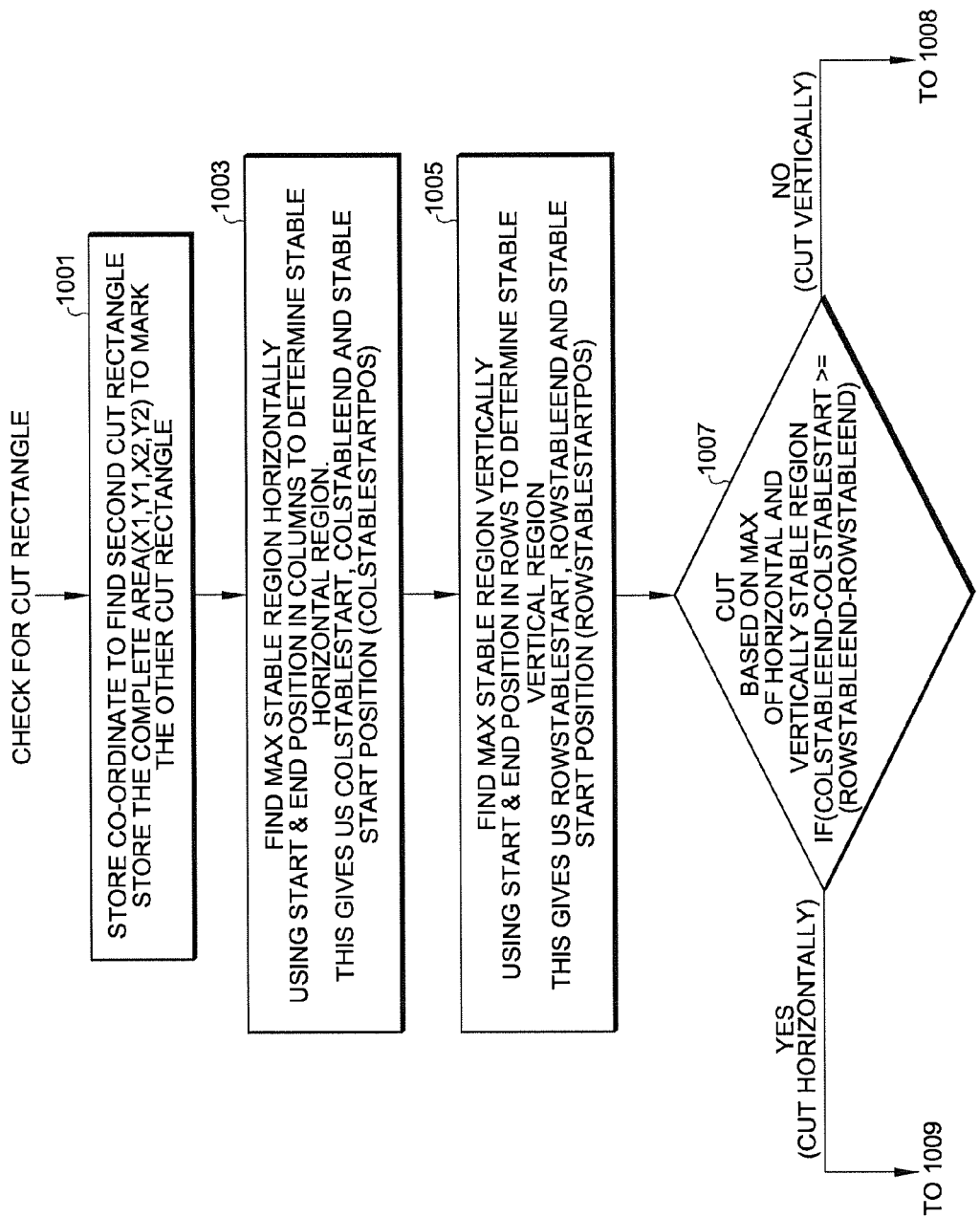
FIGS. 11A, 11B, and 11C show a flow diagram of the operation of the rectangle geometry verifier according to some embodiments of the application.

The operation of storing the co-ordinates of the main rectangle (X1, Y1, X2, Y2) is shown in FIG. 11A by step 1001.

Figure 19:
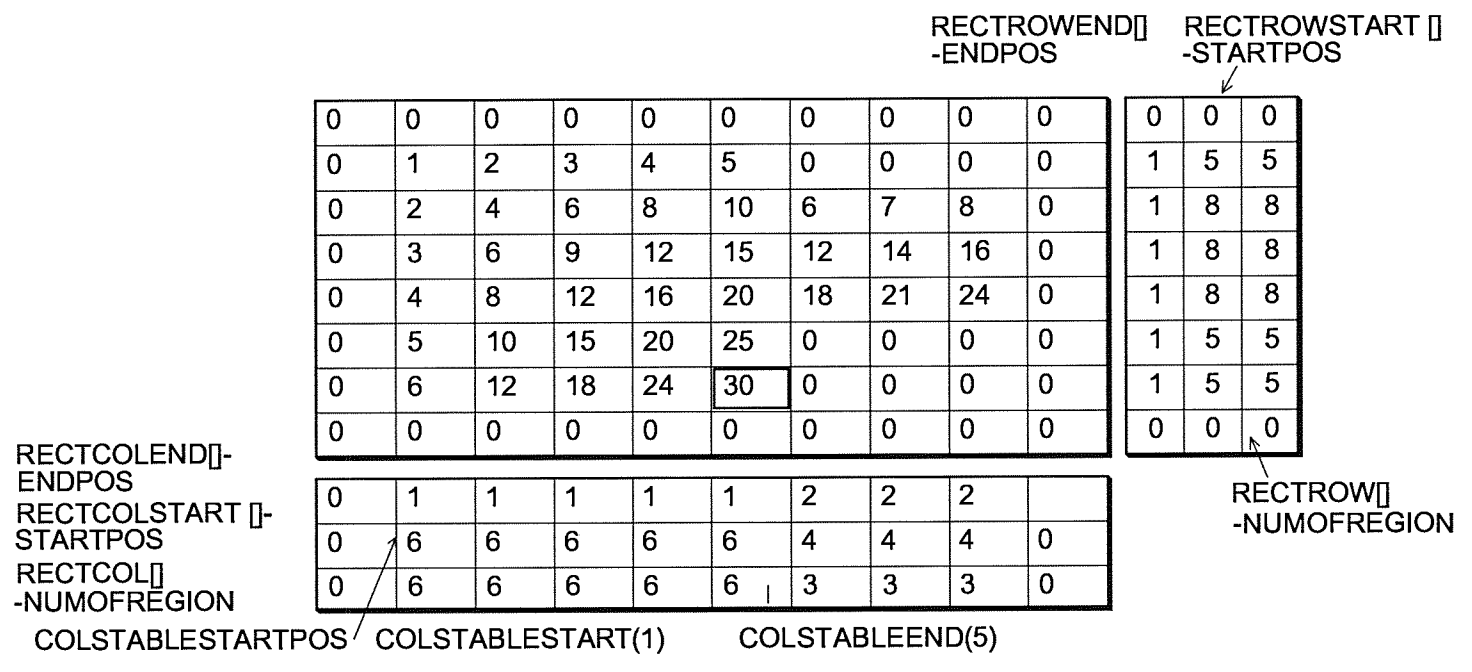

The stable region determiner 901 can then in some embodiments be configured to attempt to find the maximum stable region horizontally for the 'cut' rectangle by analyzing from the start and end position columns to determine the 'stable' horizontal region. In other words the horizontal region within the rectangle where there is almost same number of rows within column having motion. The stable region determiner 901 can thus in some embodiments store the stable region indication as variables ColStableStart and ColStableEnd and ColStableStartPos. With respect to FIG. 19 an example table showing the scoring of a cut rectangle is shown. This can thus show how to cut the rectangle, horizontally or vertically.

The operation of finding the maximum stable region horizontally is shown in FIG. 11A by step 1003.

Furthermore the stable region determiner 901 can be configured to determine a maximum stable region vertically for the 'cut' rectangle by analyzing from the start and end position rows to determine the 'stable' vertical region. The stable region determiner 901 can thus in some embodiments store the stable region indication as variables RowStableStart and RowStableEnd and RowStableStartPos.

The operation of finding the maximum stable region vertically is shown in FIG. 11A by step 1005.

Figure 11B:
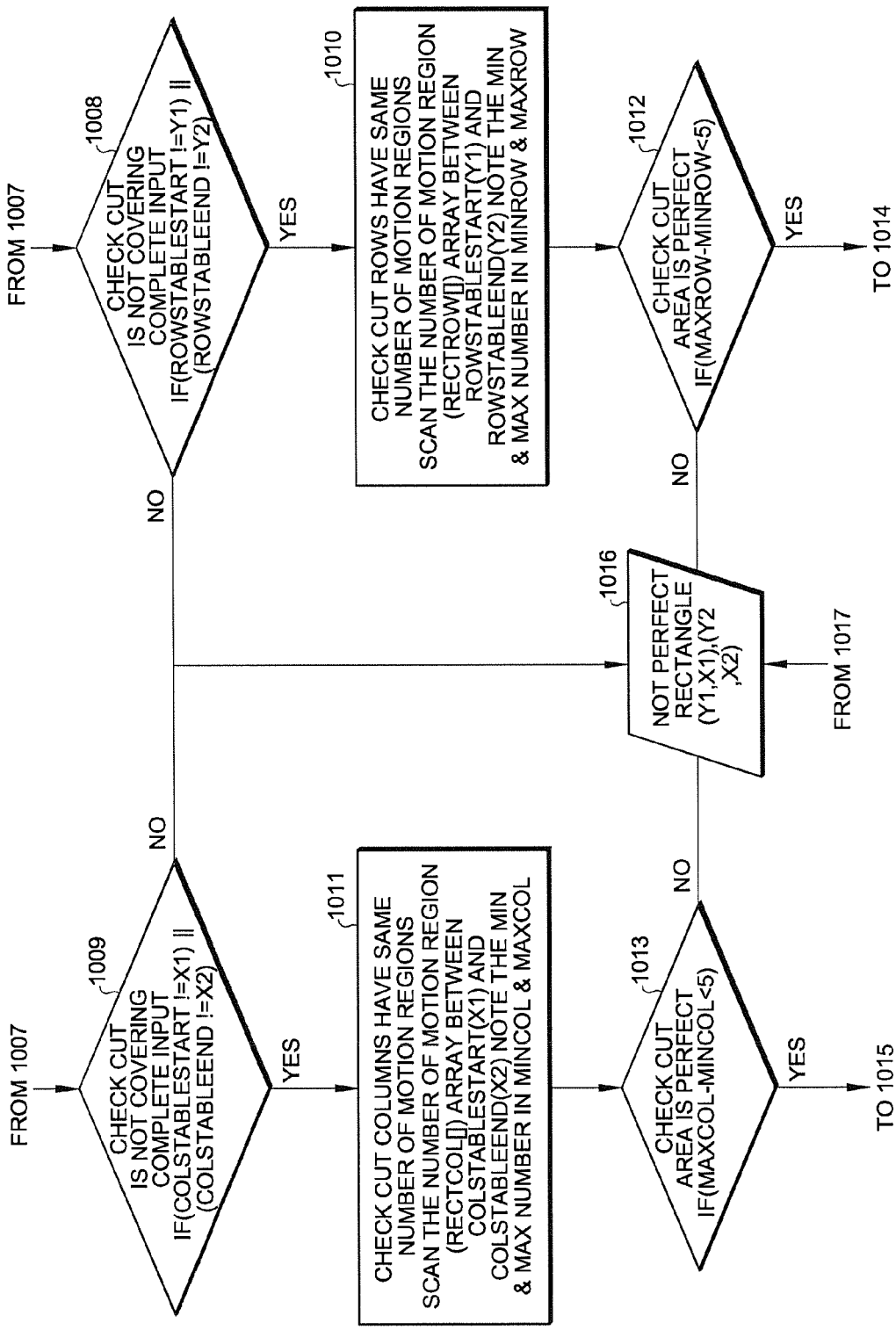

The rectangle cut determiner 903 then determines whether or not the row or column stable regions are greater. For example, the following expression can be evaluated:

$ColGtrEqu = \text{If}(Col\text{StableEnd} - Col\text{StableStart}) >= (\text{RowStableEnd} - \text{RowStableStart})$ The cut greatest determination step is shown in FIG. 11A by step 1007.

Where the number of columns is greater than or equal to the number of rows (ColGtrEqu==1) then the cut is determined to be horizontal.

Where the cut is determined to be horizontal the rectangle cut determiner 903 can be configured to determine whether the cut is not covering completely the width of the original rectangle. For example the rectangle cut determiner 903 can be configured to perform the following expression:

$H\text{Cover} = \text{If}(Col\text{StableStart}!=X1) \| (Col\text{StableEnd}!=X2)$ The operation of checking whether the cut is not covering completely the width of the original rectangle is shown in FIG. 11B by step 1009.

Where the cut is completely covering the width of the original rectangle (HCover==1 or 'true') then the original rectangle is determined to be not a perfect rectangle and an output indicator is generated indicating the type of rectangle=not perfect and the co-ordinates of the rectangle (X1, Y1, X2, Y2).

The operation of generating a not perfect rectangle type and co-ordinates for the original rectangle is shown in FIG. 11B by step 1016.

Where the cut is not completely covering the width of the original rectangle (HCover==0 or 'false') then the rectangle cut determiner 903 can be configured to determine the number of stable motion regions for each column between ColStableStart(X1) and ColStableEnd(X2). The maximum and minimum values can then be saved as mincol and maxcol variables.

The operation of determining the maximum stable motion region and minimum motion region values is shown in FIG. 11B by step 1011.

The rectangle cut determiner 903 can further be configured to check that the number of cut columns are relatively consistent, in other words that the cut area is perfect. For example the rectangle cut determiner 903 can be configured to determine the following expression:

$\text{CutPerfect} = \text{If}(\max col - \min col < 5)$, where the value of 5 is an example of the variation threshold.

The operation of determining whether the cut is perfect is shown in FIG. 11B by step 1013.

Where the cut is not perfect (CutPerfect==0 or 'false') then the original rectangle is determined to be not a perfect rectangle and an output indicator is generated indicating the type of rectangle=not perfect and the co-ordinates of the rectangle (X1, Y1, X2, Y2).

The operation of generating a not perfect rectangle type and co-ordinates for the original rectangle is shown in FIG. 11B by step 1016.

Where the cut is perfect (CutPerfect==1 or 'true') then the rectangle cut determiner 903 can be configured to determine the modified candidate rectangle based on the cut provided by the 'cut rectangle'. For example in some embodiments the rectangle cut determiner 903 can be configured to determine the modified rectangle according to the following expressions:

$X1 = Col\text{StableStart}$, $X2 = Col\text{StableEnd}$, $Y2 = Col\text{StableStartPos}$ and $Y1 = Col\text{StableStart}Pos - \max col$.

The operation of defining the modified candidate rectangle is shown in FIG. 11O by step 1015.

A similar series of operations can furthermore be performed on determining a modified rectangle following the determination that the cut is vertical. Where the number of rows is greater than the number of columns (ColGtrEqu==0) then the cut is determined to be vertical.

Where the cut is determined to be vertical the rectangle cut determiner 903 can be configured to determine whether the cut is not completely covering the height of the original rectangle. For example the rectangle cut determiner 903 can be configured to perform the following expression:

$V\text{Cover} = \text{If}(\text{RowStableStart}!=Y1) \| (\text{RowStableEnd}!=Y2)$ The operation of checking whether the cut is not covering completely the height of the original rectangle is shown in FIG. 11B by step 1008.

Where the cut is completely covering the height of the original rectangle (VCover==1 or 'true') then the original rectangle is determined to be not a perfect rectangle and an output indicator is generated indicating the type of rectangle=not perfect and the co-ordinates of the rectangle (X1, Y1, X2, Y2). The operation of generating a not perfect rectangle type and co-ordinates for the original rectangle is shown in FIG. 11B by step 1016.

Where the cut is not completely covering the height of the original rectangle (VCover==0 or 'false') then the rectangle cut determiner 903 can be configured to determine the number of stable motion regions for each row between RowStableStart(Y1) and RowStableEnd(Y2). The maximum and minimum values can then be saved as minrow and maxrow variables.

The operation of determining the maximum stable motion region and minimum motion region values is shown in FIG. 11B by step 1010.

The rectangle cut determiner 903 can further be configured to check that the number of cut rows are relatively consistent, in other words that the cut area is perfect. For example the rectangle cut determiner 903 can be configured to determine the following expression:

CutPerfect=If(maxrow−minrow<5), where the value of 5 is an example of the variation threshold.

The operation of determining whether the cut is perfect is shown in FIG. 11B by step 1012.

Where the cut is not perfect (CutPerfect==0 or 'false') then the original rectangle is determined to be not a perfect rectangle and an output indicator is generated indicating the type of rectangle=not perfect and the co-ordinates of the rectangle (X1, Y1, X2, Y2).

The operation of generating a not perfect rectangle type and co-ordinates for the original rectangle is shown in FIG. 11B by step 1016.

Where the cut is perfect (CutPerfect==1 or 'true') then the rectangle cut determiner 903 can be configured to determine the modified candidate rectangle based on the cut provided by the 'cut rectangle'. For example in some embodiments the rectangle cut determiner 903 can be configured to determine the modified rectangle according to the following expressions:

Y1=RowStableStart;

Y2=RowStableEnd;

X2=RowStableStartPos; and

X1=RowStableStart*Pos*−rowstable value.

Figure 11C:
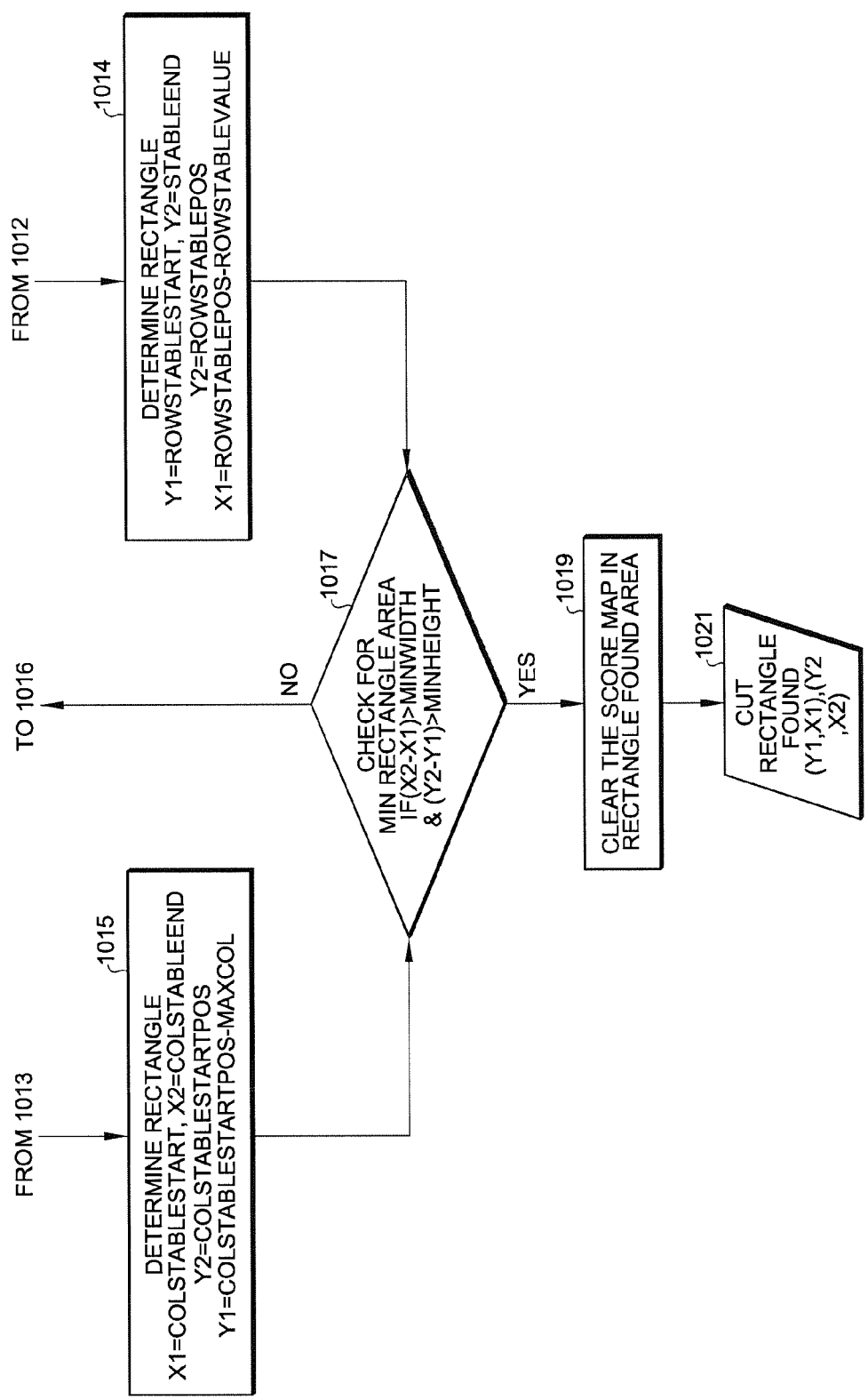

The operation of defining the modified candidate rectangle is shown in FIG. 11C by step 1014.

Following the operation of defining the modified candidate rectangle, the rectangle cut determiner 903 can then further check whether or not the modified rectangle is greater than the minimum rectangle area. For example the rectangle cut determiner 903 could in some embodiments evaluate the following expression:

AreaCheck=If((X2−X1)>MinWidth)&((Y2−Y1)>MinHeight).

The operation of checking the modified rectangle area is shown in FIG. 11C by step 1017.

Where the area of the modified rectangle is less than the minimum allowed (AreaCheck==0 or 'false') then the original rectangle is determined to be not a perfect rectangle and an output indicator is generated indicating the type of rectangle=not perfect and the co-ordinates of the rectangle (X1, Y1, X2, Y2).

The operation of generating a not perfect rectangle type and co-ordinates for the original rectangle is shown in FIG. 11B by step 1016.

Where the area of the modified rectangle is greater than the minimum allowed (AreaCheck==1 or 'true') then the rectangle cut determiner 903 can be configured to clear the score map in the rectangle found area.

The operation of clearing the score map in the rectangle found area is shown in FIG. 11O by step 1019.

Furthermore the rectangle cut determiner is configured to generate an output indicator indicating the type of rectangle=cut and the co-ordinates of the rectangle (X1, Y1, X2, Y2).

This operation of generating a cut rectangle type and co-ordinates for the original rectangle is shown in FIG. 11 by step 1021.

Furthermore in some embodiments a coarse stability check can be performed where the rectangles which have been found are checked for consistency. For example in some embodiments all the rectangle co-ordinates (normal or cut) are checked over a series of coarse window iterations. In such embodiments where the coarse window iterations determine over, for example, two runs of coarse detection, the same co-ordinate values then the coarse window rectangles can be determined as being stable. The stable window rectangle values having been determined as being stable can be passed to the Select Window state.

Figure 12:
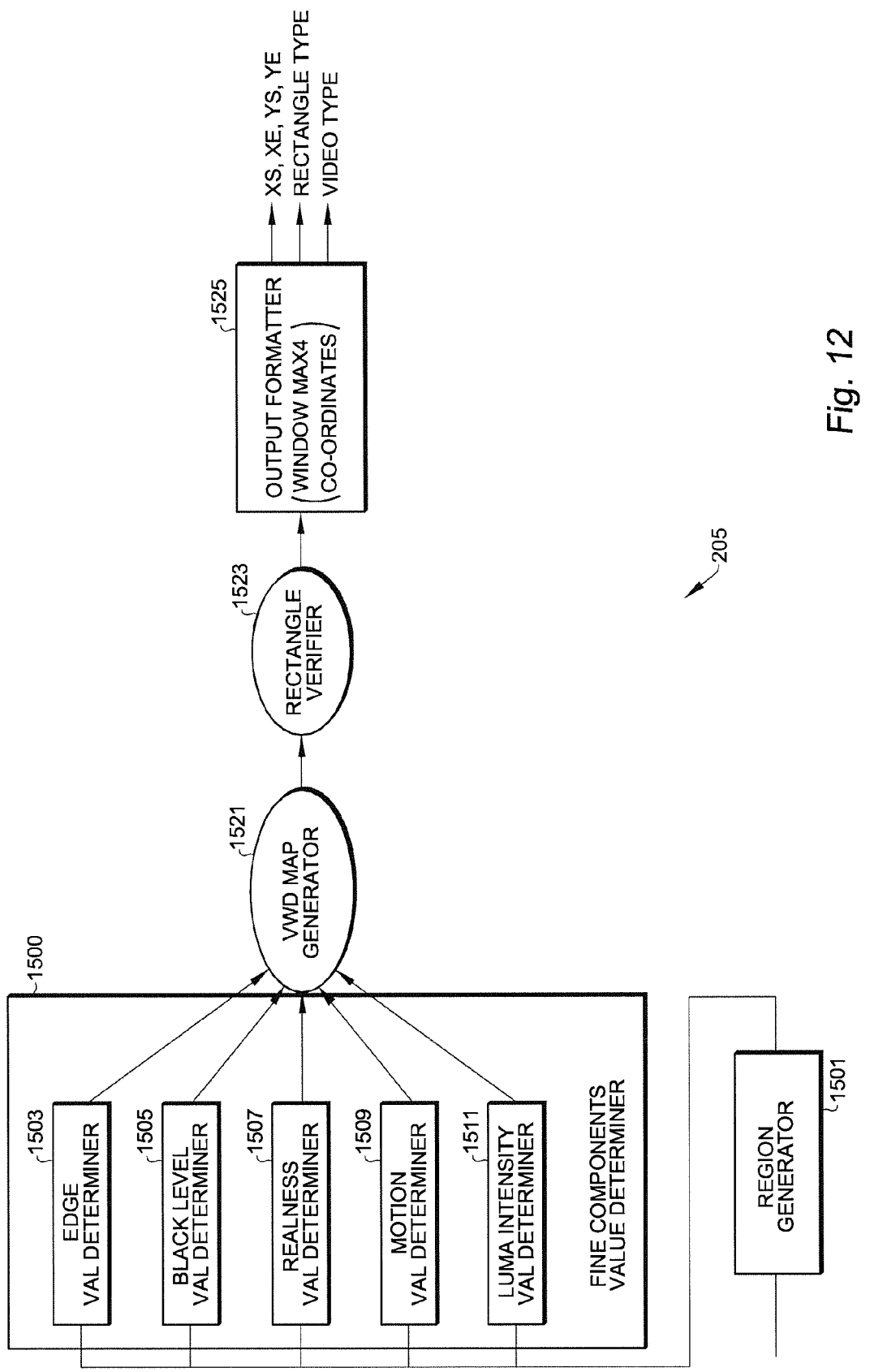
FIG. 12 shows the fine video window detector according to some embodiments of the application.
Figure 13A:
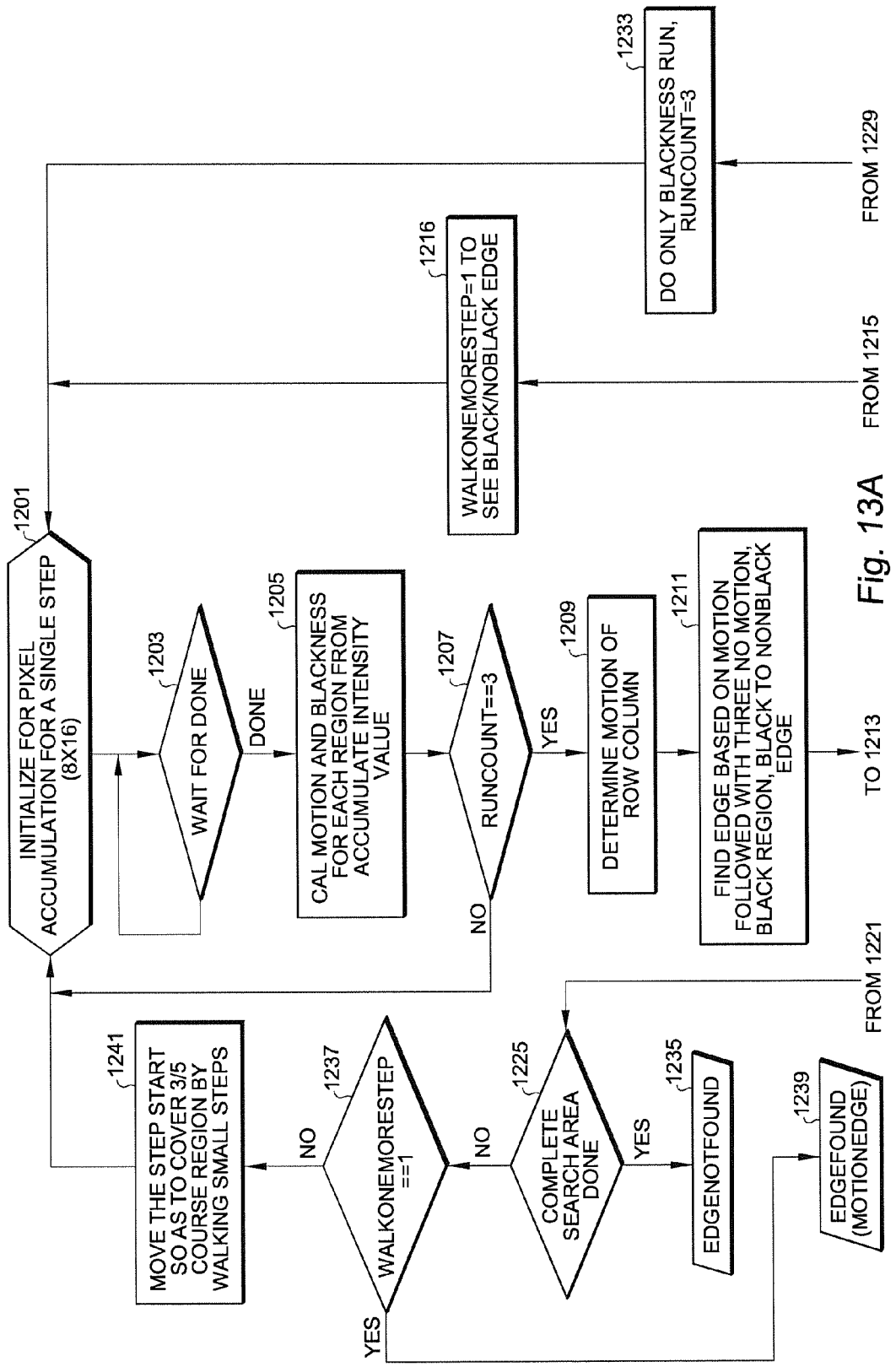
FIGS. 13A and 13B show the operation of the fine video window detector according to some embodiments of the application.
Figure 13B:
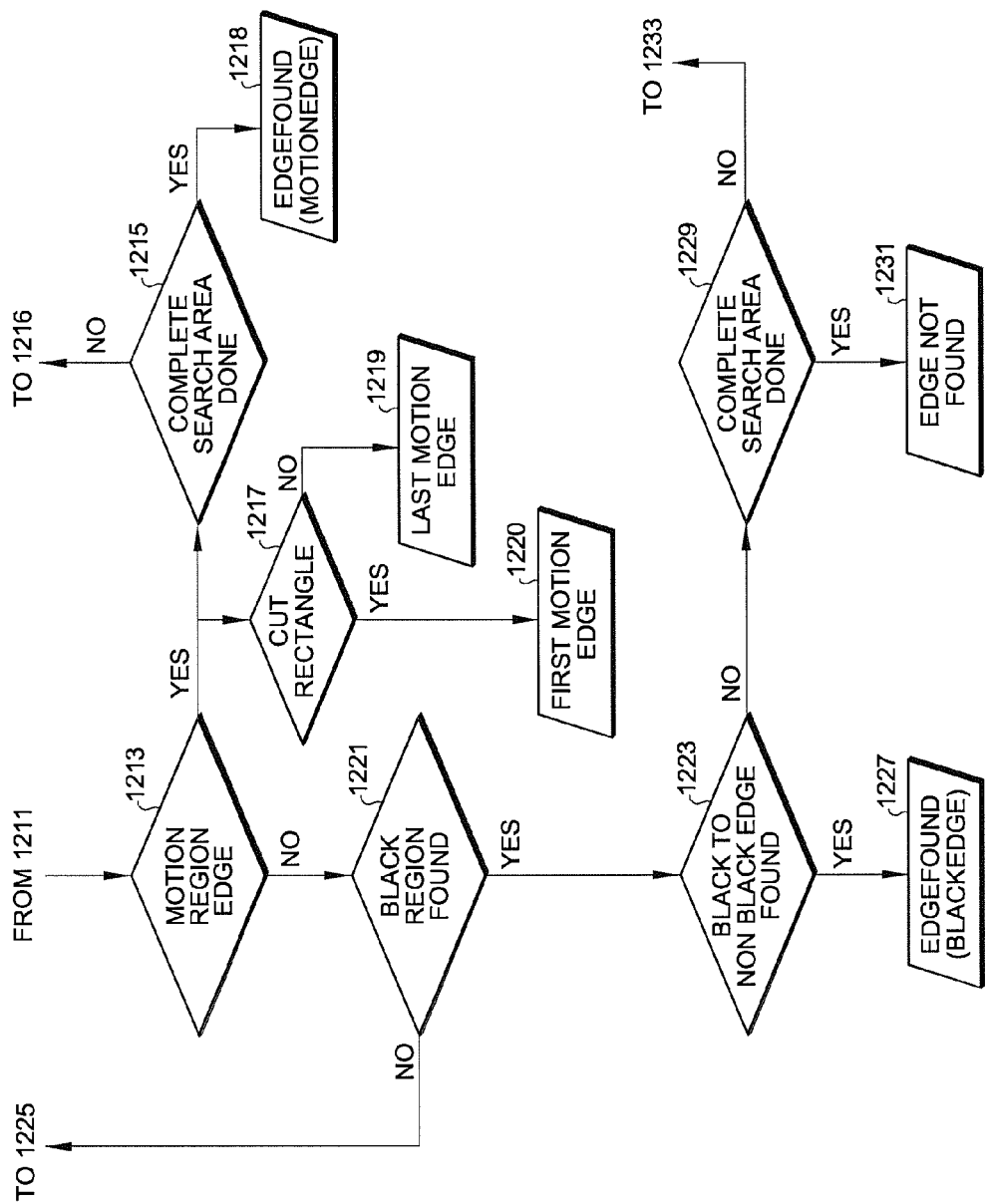

With respect to FIG. 12 the fine video window detector 205 is shown in further detail and FIGS. 13A and 13B show the operation of the fine video window detector 205 according to some embodiments.

The fine video window detector 205 is configured to analyze coarse video window candidate or candidates by analyzing a 'zoomed window' around the top and bottom coarse edges. In such analysis the fine video window detector 205 can comprise a fine region generator 1501 configured to define the search window for the fine video window as a region either side of the coarse video window border and can be ×3 (or ×5) the number of coarse rows. For example the search window can be ×1.5 coarse rows either side of the coarse window border or edge for a perfect rectangle or ×2.5 coarse rows either side of coarse edges for cut rectangles (since the edge can be away by two coarse regions in some cases due to the cut).

Furthermore in some examples the fine region generator 1501 is configured to define a search window width defined by the coarse window detected width narrowed by 2 coarse column image block or regions, in other words one region shorter for either side.

The fine video window detector 205 and fine region generator 1501 can be configured to divide these search areas into small walking steps. The fine window detector fine region generator 1501 can be configured to define the step area as 8 columns and 16 row regions. Furthermore in some embodiments the fine window detector can be configured to define each step row size as two lines separated, and separate each row by a gap line (one line). In other words the step height can be defined by the equation:

StepRowSize=2 lines,GapLine=1,

StepHeight=(StepRowSize+GapLine)×16

Furthermore in some embodiments the step window width is defined by the search window width.

With respect to FIGS. 16 and 17 the step windows for the upper 'zoomed' coarse edge step search areas are shown. FIGS. 16 and 17 shows the video image 1600, the determined coarse rectangle 1601 which approximates the edge of the video image, the upper search area 1603 which is shorter than the determined coarse rectangle by a coarse image block/region column either side, and two steps 1605 and 1607 within the step search window.

The fine video window determiner can further comprise a fine component value determiner 1500. The fine component value determiner 1500 can in a manner similar to the coarse components value determiner comprise various value determiners such as an edge value determiner 1503, black level value determiner 1505, realness value determiner 1507, motion value determiner 1509, luma intensity value determiner 1511 which having received the steps from the fine region generator 1501 passes this information to a map generator 1521.

The map generator 1521 can for example generate a motion map in the similar manner to that used in the coarse map generation, however in some embodiments an impulse filtering of the motion is not present and for each step window the motion is measured twice and the max motion value used. Furthermore in some embodiment the map generator can be configured to generate the blackness map for each step window from the luma intensity values for a region.

The output of the map generator 1521 can be passed to the fine rectangle verifier 1523 which outputs fine edge rectangle verification to the output formatter 1525 for outputting the fine window value. The fine edge detection can therefore be carried out based on motion and blackness maps where the fine edge is detected when a row of motion is determined followed by three rows of no motion (in other words a motion edge is determined) or a blackness row is determined followed by a non-blackness row (in other words a blackness edge) is found.

The fine rectangle verifier 1523 can in some embodiments perform a step walking operation from inside to outside. Therefore in examples where the candidate coarse rectangle is a perfect rectangle the walking operation can be configured to stop after the motion edge, the next walking step is without any motion (i.e. last motion edge). Furthermore in examples where the candidate coarse rectangle is a cut rectangle the walking operation can be configured to stop on the determination of a first motion edge.

In such examples every time the edge is not found the step is moved by the step height and the overlap is maintained by storing some of the previous data.

Furthermore the fine edge verifier can store the Step start and Edge location once the edge is found in order that border checking can be performed.

It would be understood that the region generator 1501, fine component value determiner 1500, map generator 1521 and fine rectangle verifier 1523 can then perform the same actions determining a fine edge for the bottom, left and right edges of the candidate rectangle.

With respect to FIG. 13, a single side fine rectangle edge search operation flow diagram is shown with respect to the operation of the fine window determiner 205.

The fine region generator 1501 and the fine component value determiner 1500 can for example initialize the HRLB for pixel accumulation. A region/image block can have N pixels, and accumulation of Y(Luma) sample values of all N pixels.

The pixel accumulation operation is shown in FIG. 13A by step 1201.

A waiting operation whilst the accumulation operation completes is shown by step 1203 in FIG. 13A.

The fine component value determiner can then be configured to calculate the motion and blackness values for each region from the accumulated intensity value.

The operation of determining the motion and blackness values for each region is shown in FIG. 13A by step 1205.

Next, the operation determines whether or not it has performed the loop of generating pixel accumulation and motion and blackness levels for each reason three times for the motion determination for example a difference of accumulated values from two iterations is carried out. This loop permits the two iteration values to be determined. In some embodiments further loops can be used to get better motion determination.

The operation of checking the RunCount variable is shown in FIG. 13A by step 1207.

Where the RunCount variable does not equal 3 (RunCount< >3) then the fine component value determiner can then be configured to initialize the counter accumulation for a single step. In other words, the operation passes back to step 1201.

Where the RunCount variable equals 3 (RunCount==3), the motion value determiner can determine the motion of the row (or column for the left or right edge determination).

The determination of the motion of the row (or column) is shown in FIG. 13A by step 1209.

Then the map generator 1521 can be configured to attempt to find whether for the current step there is an edge based on determining motion followed by three no motion regions and/or a blackness region followed by a non-blackness region.

The edge detection operation can be shown in FIG. 13A by step 1211.

The rectangle verifier 1523 can then check to determine whether a motion edge has been found.

The operation of checking for a motion edge is shown in FIG. 13B by step 1213.

Where the motion edge has been found the fine window determiner can perform a further check to determine whether the complete search area has been covered.

The complete search area check is show in FIG. 13B by step 1215.

Where the complete area has been checked then an EDGEFOUND(motionedge) indicator can be generated.

The generation of an EDGEFOUND(motion) indicator is shown in FIG. 13B by step 1218.

Where the complete area has not been checked then the fine window determiner can set the WALKONEMORESTEP flag to 1 to check for further steps and possibly determine a black/no black edge. Furthermore the fine window determiner can pass the operation back to initialize the pixel accumulation values for the next step.

The setting of the WALKONEMORESTEP flag to 1 is shown in FIG. 13A by step 1216.

Furthermore where the motion edge has been found, the rectangle verifier 1523 can be configured to check whether the candidate rectangle is a cut rectangle.

The operation of checking whether the candidate rectangle is cut following the motion edge has been found is shown in FIG. 13B by step 1217.

Where the candidate rectangle is a cut rectangle then the fine window determiner generates an indication that the found motion edge is a first motion edge.

The operation of indicating the motion edge is a first motion edge is shown in FIG. 13B by step 1220.

Where the candidate rectangle is determined to not be a cut rectangle following the motion edge being found then the fine window determiner is configured to generate an indication that the found motion edge is a last motion edge.

The operation of indicating the motion edge is a last motion edge is shown in FIG. 13B by step 1219.

Where no motion edge is found (following step 1213), then the rectangle verifier 1523 can then check to determine whether a blackness region has been found.

The operation of checking for a blackness region is shown in FIG. 13B by step 1221.

Where a blackness region is found then the rectangle verifier can be configured to perform a further check to determine whether there is blackness to non-blackness edge found.

The operation of checking for a blackness to non-blackness edge is shown in FIG. 13B by step 1223.

Where there is a blackness to non-blackness edge found then the rectangle verifier can be configured to generate an EDGEFOUND(BlackEdge) indicator.

The generation of an EDGEFOUND(BlackEdge) indicator is shown in FIG. 13B by step 1227.

Where the blackness to non-blackness edge has not been found then the fine window determiner can perform a further check to determine whether the complete search area has been covered.

The complete search area check is shown in FIG. 13B by step 1229.

Where the complete area has been checked, then an EDGENOTFOUND indicator can be generated.

The generation of an EDGENOTFOUND indicator is shown in FIG. 13B by step 1231.

Where the complete area has not been checked, then the fine window determiner can set the RunCount flag to 1 and return to initializing the pixel accumulation values to check for further blackness regions.

The operation of setting the RunCount flag to 1 and returning to the initialization of pixel accumulation values is shown in FIG. 13A by step 1233.

Where no blackness region was found in the check step 1221 then the fine window determiner can perform a further check to determine whether the complete search area has been covered.

The complete search area check is show in FIG. 13A by step 1225.

Where the complete area has been checked then an EDGENOTFOUND indicator can be generated.

The generation of an EDGENOTFOUND indicator is shown in FIG. 13A by step 1235.

Where the complete area has not been checked then the fine window determiner can further check the WALKONEMORESTEP flag at step 1237.

Where the WALKONEMORESTEP flag is 1 (WALKONEMORESTEP==1) then an EDGEFOUND(motion) indicator can be generated based on the previous step motion edge detection.

The generation of an EDGEFOUND(motionedge) indicator is shown in FIG. 13A by step 1239.

Where the WALKONEMORESTEP flag is 0 (WALKONEMORESTEP< >1), then fine window determiner can move the start step to the next outermost step and return to the initialization of pixel accumulation values.

The moving step and reinitializing the operation is shown in FIG. 13A by step 1241.

After determining the fine edge values, these values can be passeD as discussed herein to the border checker.

Figure 14:
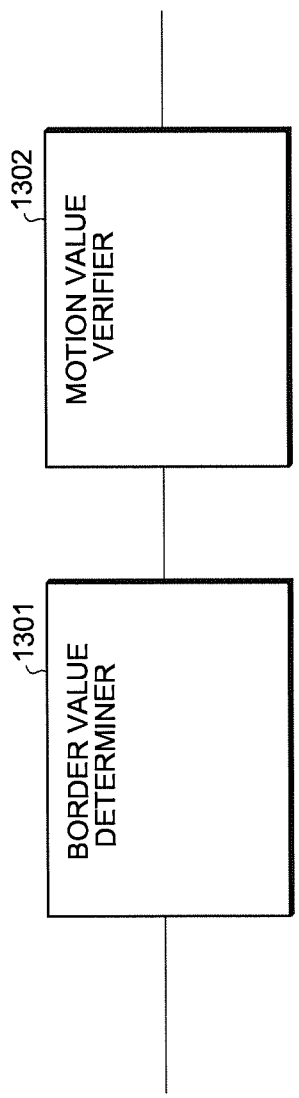
FIG. 14 shows schematically the border verifier as shown in FIG. 3 according to some embodiments of the application.

With respect to FIG. 14 the border verifier/checker is shown in further detail. Furthermore with respect to FIGS. 15A and 15B the operation of the border verifier/checker according to some embodiments is further described. In some embodiments the border verifier/checker comprises a border value determiner 1301 and a motion value verifier 1302.

The border value determiner 1301 is configured to determine border values for a small consistent data strip surrounding the detected candidate rectangle. The motion value verifier 1302 can then check the consistency of these border values. Where the data changes across the frames then it is not consistent and the border check fails.

The check can for example be based on pixel accumulation of a region and a border step configuration can be the same as the fine window determiner.

In other words, the border check can be summarized for each border as a first step where the pixel accumulation values are stored for a region for row (or column) where the fine edge is found a second step where the stored pixel accumulated value is compared against the new current pixel accumulated value. Where a number of regions differ (for example three or more regions are found to differ) then the side border is said to fail.

Furthermore, a motion check inside the video window can be implemented in some embodiments (for example, when handling borderless cases or when an outside border check fails). This can be also based on pixel accumulation of a region, wherein the border value determiner 1301 is configured to divide the video window into 8×16 regions after allowing a margin on all sides. This defines an area inside the video window leaving some area along the inside periphery of the border and then divides the remaining center area into 8×16 regions. The pixel accumulated values can be stored for each of the 8×16 regions. The motion value verifier can then compare the stored pixel accumulated values against later field/frame pixel accumulated values.

The motion value verifier can therefore verify the borders where motion is determined inside all sides on the periphery. For example for the 8×16 regions there should be some difference or the complete row (or column) should be black and overall some minimum regions should be different (for example more than 8 regions).

Furthermore in some embodiments, the border check can determine a window lock. Before a window lock can be determined, all of the side border windows and inside window motion checks can be passed for consecutive fields/frames.

Furthermore, while the border check is not locked and where any one side fails and inside window motion is present, then the fine window determination operations described herein can be re-performed in an attempt to improve the window determination. Furthermore in some embodiments, after a specific number of retries and where there is still no lock, then the coarse window determiner operations can be re-performed.

Where a window lock is established and more than one side border fails (for example due to a scrolling bar and/or fading text) or all the side fails border checks in all eight regions (for example, when the window is highlighted, or de-highlighted) and (or but) the inside windows show motion is present then the lock status is removed and a border check can be carried out again. Where lock is not re-achieved within a certain number of trials then the coarse window determiner operations can be re-performed.

Furthermore if after lock any failure other than the above example then the lock status is removed and the coarse window determination operations can be re-performed.

Furthermore in some embodiments where a borderless window is monitored in the lock state the inside window motion can be also checked to allow the candidate window to remain in a locked state. The video window border is usually a static demarker between active video region and the background graphics region. A borderless situation is the case where video window does not have any border (no static demarcation present). In other words, a border case has a border around the video area and a borderless case has no border. Where there is no motion detected the coarse window determination operations can be re-performed.

Figure 15A:
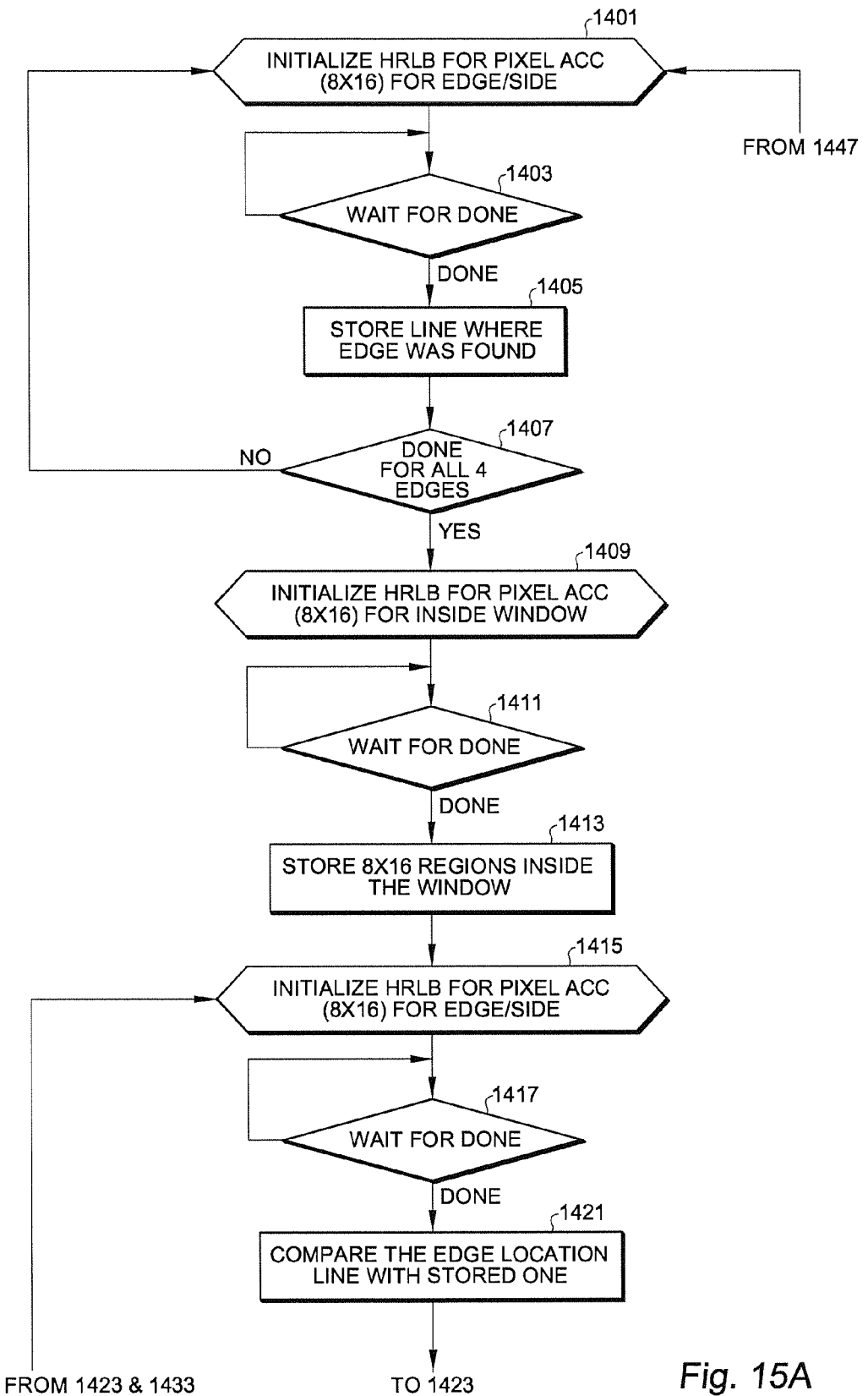
FIGS. 15A and 15B show the border verifier in operation according to some embodiments of the application.
Figure 15B:
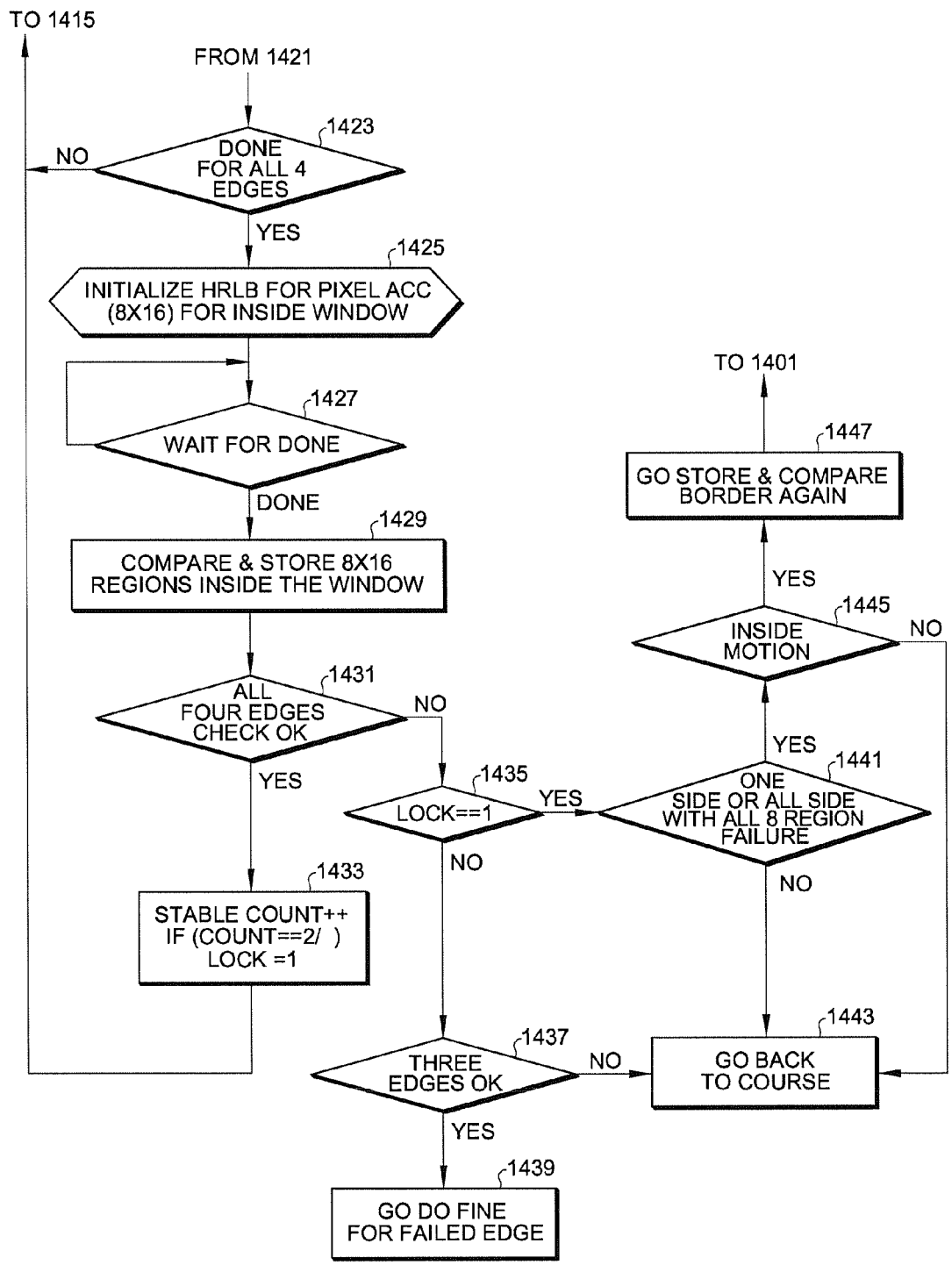

For example with respect to FIGS. 15A and 15B, the operation of the border checker is shown as a flow diagram in further detail.

The border value determiner can be configured to initialize the pixel accumulation values for the 8×16 pixel blocks or regions for the edges or sides.

The pixel accumulation operation is shown in FIG. 15A by step 1401.

Furthermore a wait operation is shown in FIG. 15A by step 1403 while the accumulation operation completes for the side/edge being determined.

The border value determiner 1301 can then store the determined values for the line where the edge was found.

The storage of values operation is shown in FIG. 15A by step 1405.

The border value determiner 1301 can then check if all four edges have been analyzed.

The operation of checking whether all four edges have been analyzed is shown in FIG. 15A by step 1407.

Where a further edge is to be analyzed then the operation passes back to step 1401 to perform a further edge loop. Where all of the edges have been analyzed then the inside window pixel accumulation determination is performed.

The pixel accumulation operation for the inside window is shown in FIG. 15A by step 1409.

Furthermore, a wait operation is shown in FIG. 15A by step 1411 while the accumulation operation completes for the inside window region being determined.

The border value determiner 1301 can then store the inside window determined values.

The storage of inside window values is shown in FIG. 15A by step 1413.

For the next step/run the border value determiner 1301 can be configured to initialize the pixel accumulation values for the 8×16 pixel blocks or regions for the edges or sides.

The further frame pixel accumulation operation is shown in FIG. 15A by step 1415.

Furthermore a wait operation is shown in FIG. 15A by step 1417 while the further frame accumulation operation completes for the side/edge being determined.

The motion value verifier can then compare the further frame determined values for the line where the edge was found against the stored frame determined values.

The comparison operation is shown in FIG. 15A by step 1421.

The border value determiner can then check is all four edges have been compared.

The operation of checking whether all four edges have been compared is shown in FIG. 15B by step 1423.

Where a further edge is to be compared then the operation passes back to step 1415 to perform a further frame edge loop. Where all of the edges have been compared then a further frame inside window pixel accumulation determination is performed.

The further frame pixel accumulation operation for the inside window is shown in FIG. 15B by step 1425.

Furthermore a wait operation is shown in FIG. 15B by step 1427 while the accumulation operation completes for the further frame inside window region being determined.

The motion value verifier 1302 can then compare the further frame inside window determined values against the stored inside window determined values.

The comparison between inside window values is shown in FIG. 15B by step 1429.

The motion value verifier 1302 can then perform a check to determine whether all four edges are consistent and the inside window motions is also consistent.

The operation of performing the consistency check is shown in FIG. 15B by step 1431.

Where the check is passed ok, then the stable count counter is incremented (Stable count++) and furthermore the lock enabled where the stable count variable reaches a determined value (for example, 2). Therefore, for each edge or side the comparison is done with original stored value. For each, inside window motion comparison is against a new current value. Furthermore, the operation can be passed back to step 1415 where the next frame is analyzed to determine is window lock can be maintained.

The operation of maintaining the stability counter and lock variables is shown in FIG. 15B by step 1433.

Where check step is not passed, then a check of the status of the lock flag is performed.

The lock flag check is shown in FIG. 15B by step 1435.

Where the lock flag is not active (Lock<>1), then a further check to determine whether at least three edges were consistent in the comparison.

The three edge check operation is shown in FIG. 15B by step 1437.

Where three edges pass the check, then the fine window determiner can be configured to perform the fine video window operation on the failed edge side.

This fine video window failed edge operation is shown in FIG. 15B by step 1439.

Where less than three edges are ok, in other words the two or more edge check operation fails, then the coarse video window detector is configured to carry out a coarse video window detection.

The coarse video window operation is shown in FIG. 15B by step 1443.

Where the lock flag is enabled (Lock==1), then a further check determines whether there is a failure on one side or all sides with 8 regions.

The one side or all sides with 8 region failure check operation is shown in FIG. 15B by step 1441.

Where the result of the one side or all sides with 8 region failure check operation fails, then the coarse video window detector is configured to carry out a coarse video window detection.

The coarse video window operation is shown in FIG. 15B by step 1443.

Where at least one side or all sides of 8 region failure has occurred then a further check is carried out whether there is inside motion.

The operation of inside motion checking is shown in FIG. 15B by step 1445.

Where the result of the inside motion check operation fails, then the coarse video window detector is configured to carry out a coarse video window detection.

The coarse video window operation is shown in FIG. 15B by step 1443.

Where there has been inside motion of the video then the current values are stored and the border check operation is re-initialized so that the pixel accumulation operation is re-performed (the operation passes back to step 1401).

The operation of storing the values and comparing the border again is shown in FIG. 15B by step 1447.

A further embodiment of the invention is to enhance only the video content (for better contrast, colors, sharpness, noise reduction) overlay on graphic content, for better visual impact/experience and to do this without effecting the graphic content. The video content covers video from internet (YouTube, etc.), and video played through a local media player. This calls for finding a rectangle non-overlapping/overlapping video window/windows within a PC monitor Display region, then applying enhancement only within that window. Multiple video window detection is supported. This embodiment of the invention is thus related to detection of a video window region, within a PC monitor display region.

Existing video window detection does not support the case where a video window is too close or an overlapping video window.

Figure 20:
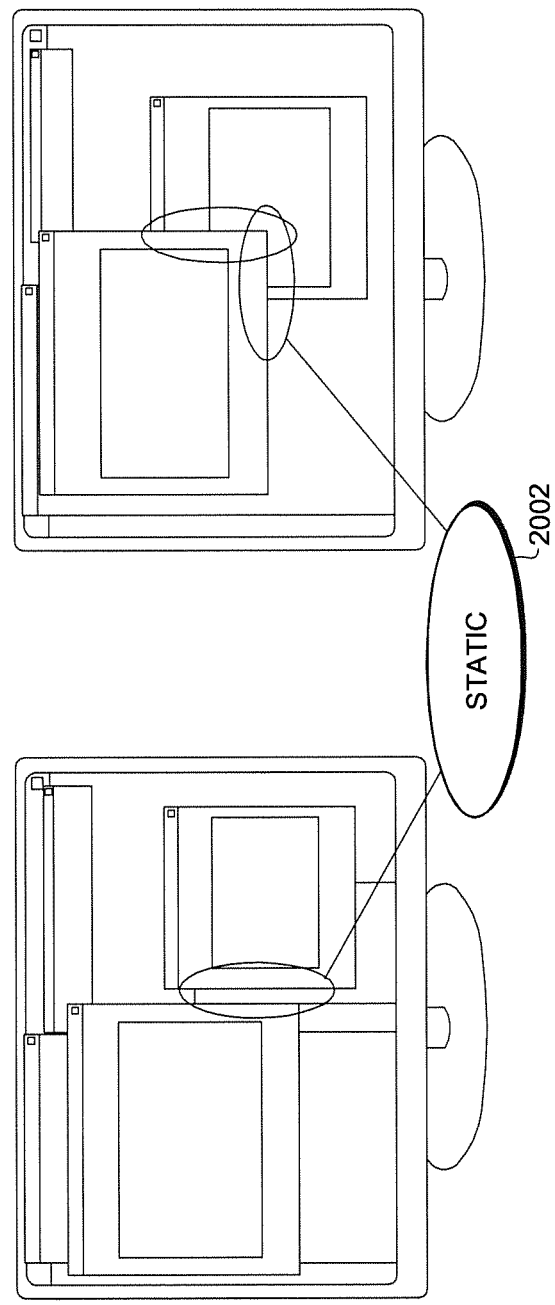
FIG. 20 shows two cases of a multiple video window, one where the two video windows are too close and other where the two video windows are overlapping but separated by static area.

The problem with existing solutions is shown in FIG. 20. In coarse mode the input is divided into 32×30 regions. If boundaries of two video windows do not have a separation/gap of one region, it is impossible to distinguish the two video windows. Static regions 2002 are shown in two possible scenarios of this problem.

According to an embodiment of the present invention this problem is solved by using the horizontal and vertical continuous Static region within a region that can be used to create separations.

Figure 21:
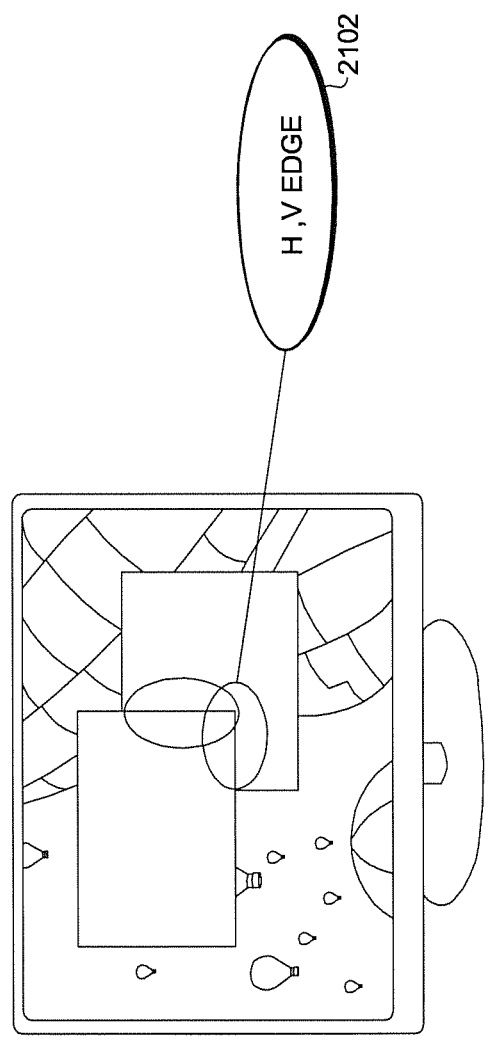
FIG. 21 shows the case of two video windows overlapping without any static area, with the only way to distinguish the two video windows is to find an overlapping continuous edge.

The problem with existing solutions is also shown in FIG. 21. In the case of two video windows that have an overlapping region, it is impossible to distinguish the two video windows and detect the top video window.

Again, according to an embodiment of the present invention, horizontal and vertical continuous edges 2102 within a region can be used to create separations.

Figure 22:
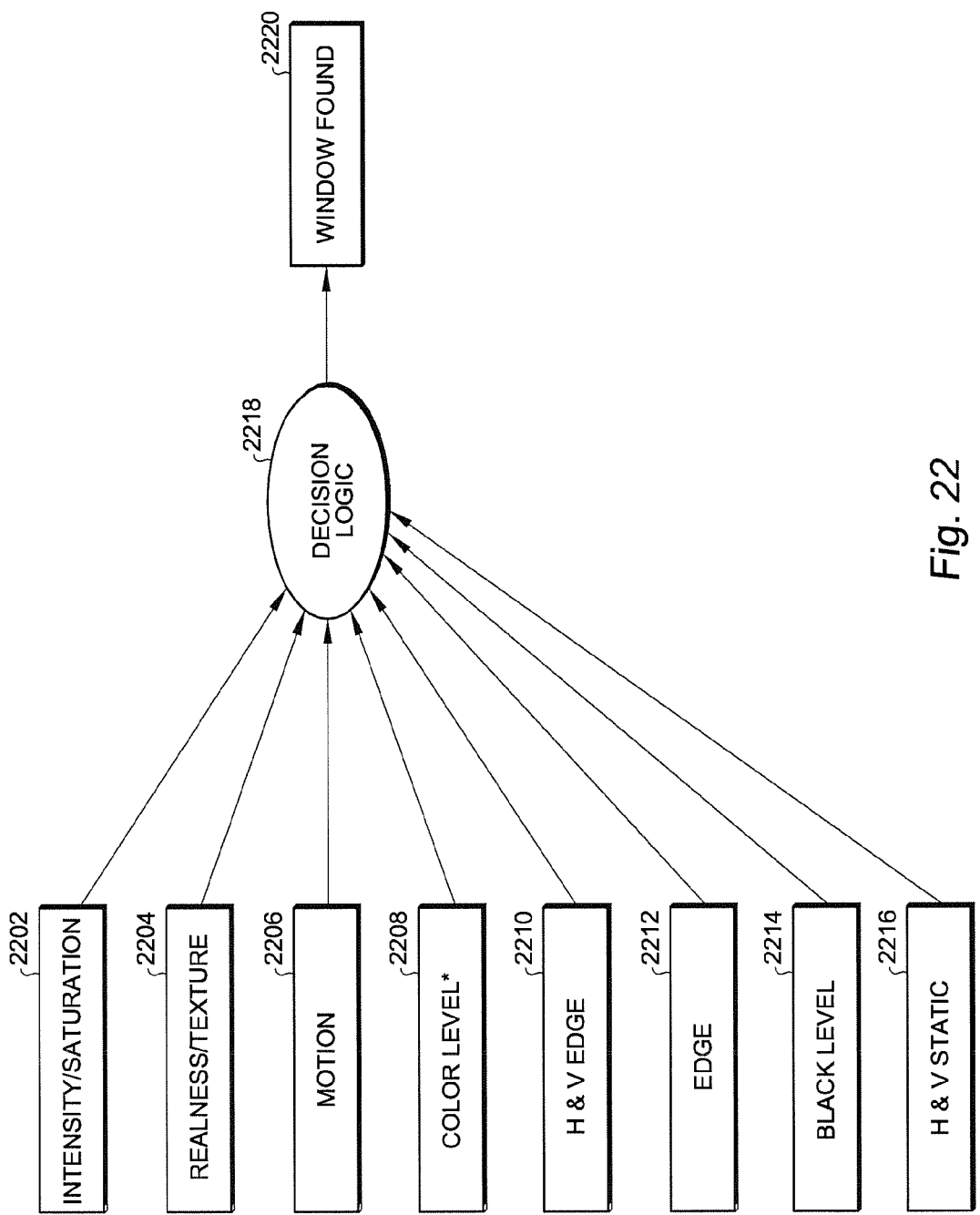
FIG. 22 shows schematically a video window detector concept which includes the horizontal and vertical continuous static area and the horizontal and vertical continuous edge according to some embodiments of the application.

The overlapping video windows detection of the present invention is shown in a high-level block diagram in FIG. 22. Various inputs include intensity/saturation 2202, realness/texture 2204, motion 2206, color level 2208, horizontal and vertical edge 2210, edge 2212, black level 2214, and horizontal and vertical static information 2216. These various inputs are received by decision logic 2218, which in turn detects a window 2220.

Figure 23:
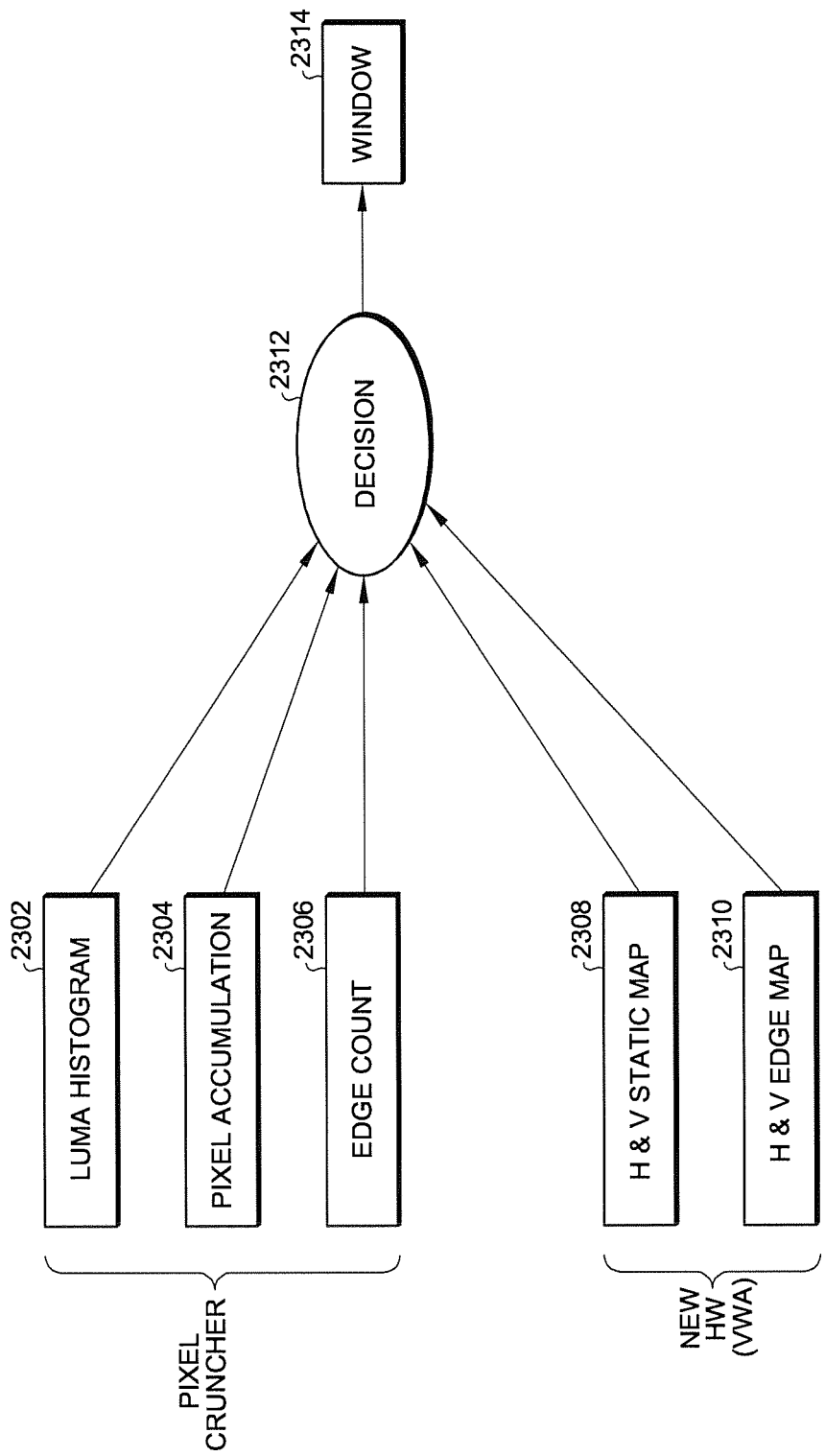
FIG. 23 shows the addition of the new components horizontal and vertical continuous static area and horizontal and continuous edge.

Components derived using a hardware block (pixel cruncher) and hardware blocks (VWA) according to an embodiment of the present invention are shown in FIG. 23. Both pixel cruncher and VWA are hardware modules to generate basic components mentioned with respect to FIG. 22. VWA stands for Video Window Accelerator, which is the internal name given to the new hardware. The pixel cruncher includes a luma histogram 2302, pixel accumulation block 2304, and edge count block 2306. Hardware blocks (VWA) includes the horizontal and vertical static map block 2308, and the horizontal and vertical edge map 2310. The outputs from the pixel cruncher and the VWA blocks are received by a decision logic 2312, which can be built in firmware. The output of the decision logic 2312 in turn detects a window 2314.

Figure 24:
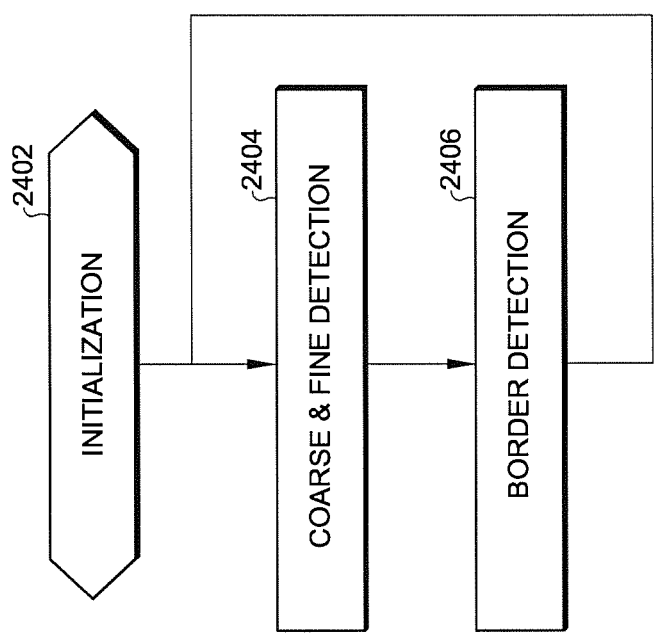
FIG. 24 shows a flow diagram of the overlapping simultaneous multiple video window detectors in operation.

The top level flow chart for the method of the present invention is shown in FIG. 24. An initialization step 2402 is followed by a coarse and fine detection step 2404, which in turn is followed by a border detection step 2406. Steps 2404 and 2406 are repeated always. Step 2404 is done to locate new windows. Step 2406 is done to track the presence of windows which are detected by step 2404. If no window is detected by step 2404, step 2406 does nothing. This is done to support and track multiple windows.

Figure 25:
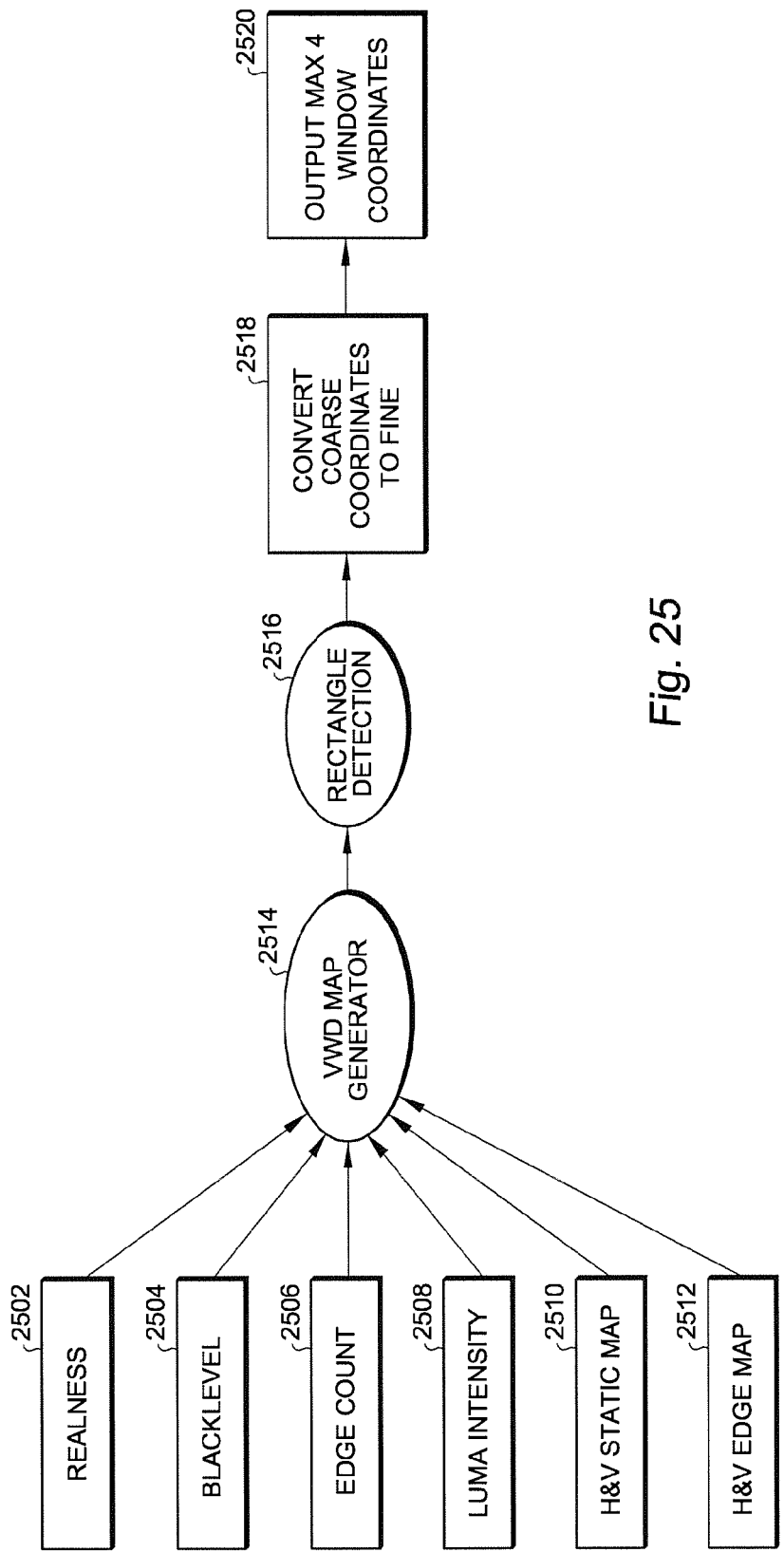
FIG. 25 shows a coarse and fine video window detector as shown in FIG. 22 according to some embodiments of the application.

The coarse and fine detection step is shown in further detail in FIG. 25. In coarse detection, the input frame is divided into 32 X-regions and 30 Y-regions for all components. Realness 2502, blacklevel 2504, edge count 2506, luma intensity 2508, horizontal and vertical static map 2510, and horizontal and vertical edge map 2512 information for each region is received by the VWD map generator 2514. The output of the VWD map generator is received by the rectangle detection block 2516. FIGS. 6 and 12 and associated application text explain the VWD map generator. Rectangle detection is the same as the rectangle verifier explained above. The output of the rectangle detection block 2516 is received by the coarse-to-fine conversion block 2518. Coarse detection is aligned to the region boundary. This block 2518 does the fine detection of the video border as is explained in further detail below with respect to FIG. 34 on all four sides of the video window. The rectangle verifier/detector gives a coarse co-ordinate aligned with region boundaries. Since there is data of motion (see FIG. 32) and edge (see FIG. 30) within the region, using this data the coarse to fine/final co-ordinates can be aligned to the video boundary. The output of the conversion block 2518 is received by the output co-ordinate block 2520. Block 2520 is an array that stores the co-ordinates of the video rectangle found, consisting of XStart, YStart, XEnd, YEnd coarse and fine for each of the rectangles. The rectangles are stored as they appear in the order they appear on the display or input. These co-ordinates are then used by border detection to track the presence of video windows. If full screen is detected border detection is not done.

Figure 26:
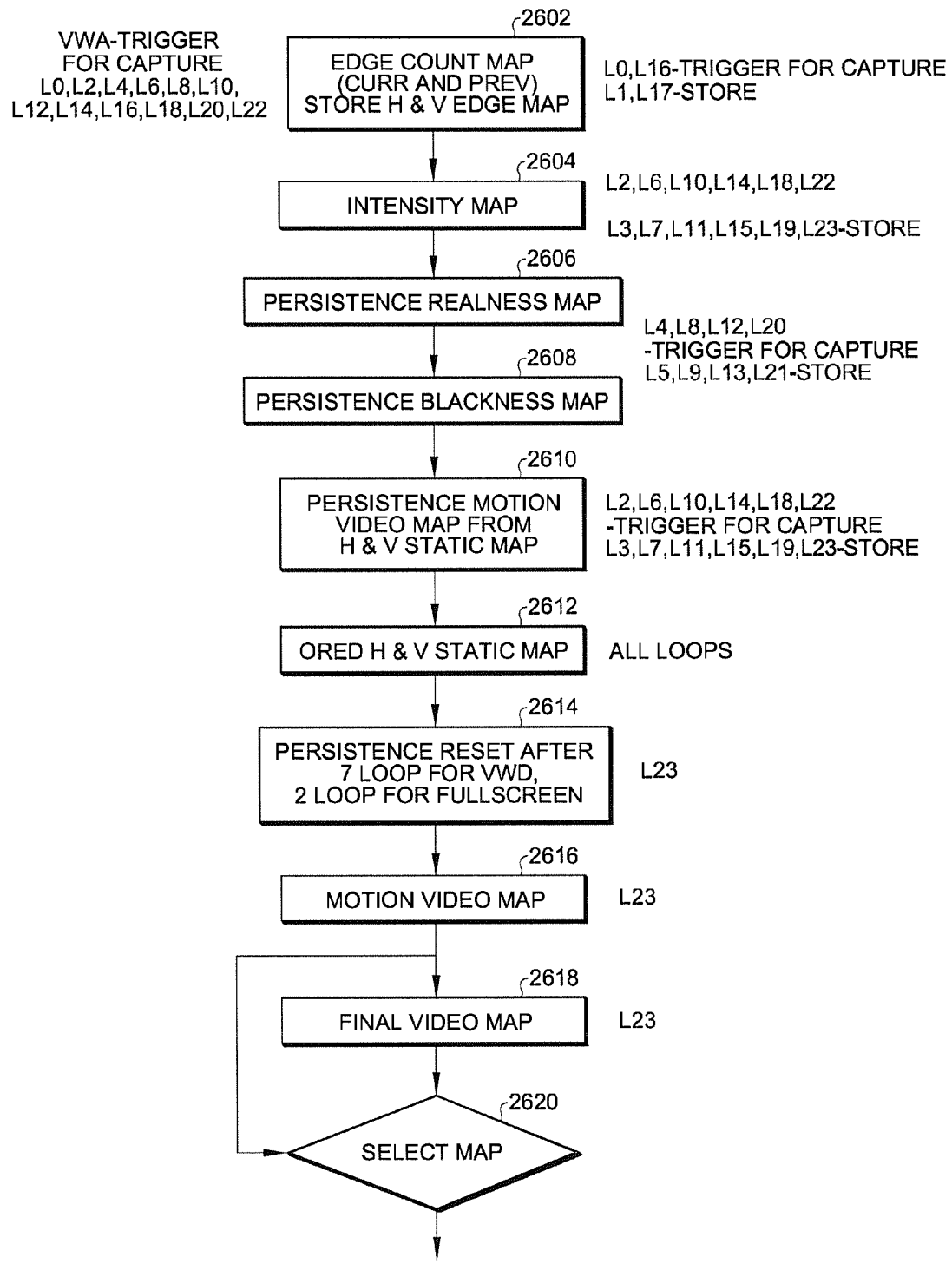
FIGS. 26 and 27 shows a flow diagram of the coarse and fine window detector in operation according to some embodiments of the application.
Figure 27:
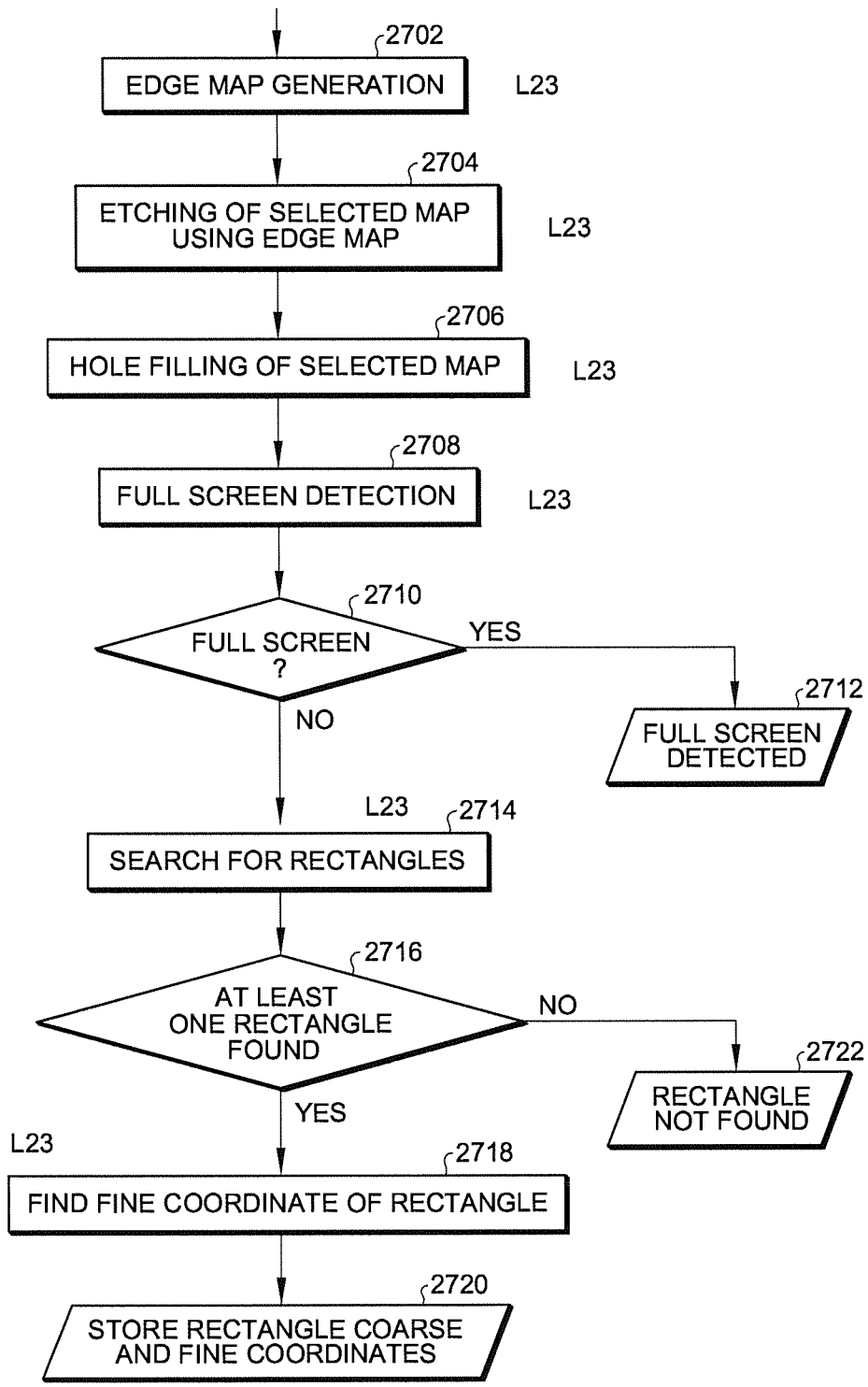

The coarse and fine detection method of the present invention is shown in further detail of the flow charts in FIG. 26 and FIG. 27. "L" refers to loop number. Since this is a hardware and software design, and to save storage and hardware, the function/components are collected in sequences and to save time the functions are done in parts. They can be done in parallel and together if there is no restriction of hardware/storage space and time. Hardware is used to capture the data for each component and software is used to analyze and store the data in a compressed form to save storage space. An edge count map (current and previous) is captured and the horizontal and vertical edge map is stored at step 2602. An intensity map is captured and stored at step 2604. A persistence realness map is captured and stored at step 2606. A persistence blackness map is captured and stored at step 2608. A persistence motion video map generated from a horizontal and vertical static map is captured and stored at step 2610. Multiple captures of the horizontal static map and multiple captures of the vertical static map are ORed with the horizontal and vertical static map at step 2612. A persistence reset after 7 loop for VWD, 2 loop for full screen is performed at step 2614. Persistence maps of motion, ORed horizontal and vertical static map, realness, and blackness are cleared after the coarse detection is run 7 times without finding any rectangle. In case of full screen detected case the persistence maps are cleared after the coarse detection is run 2 times. A motion video map is generated at step 2616. The motion video map is loaded with a value 2 when motion map AND (ORed H and V static map of a region having full value and region is not a corner) has passed impulse test. The motion video map region values are slowly brought to zero when motion persistence map goes to zero. A final video map is generated at step 2618. The final video region map is generated based on motion AND (ORed H and V static map of a region having full value and region is not a corner) AND (real OR black) AND (no edge in current run OR no edge in previous run) AND luma intensity. This re-gating is required to avoid instantaneous graphics motion occurrence, after the persistence map are built. The final video map region once set is cleared slowly when motion map region is cleared. The final video map is reset completely once coarse rectangle is found. Either the motion video map or the final video map is selected at decision step 2620 as taught below with respect to FIG. 17.

The coarse and fine detection method of the present invention continues in FIG. 27. An edge map is generated at step 2702. An etching of the selected map using the edge map is accomplished at step 2704. FIGS. 33A, 33B, 33C, and 33D correspond to the sub figures of edge map generation for the regions where persistence static maps are not zero. Hole filling of the selected map is accomplished at step 2706. The etched selected map may also include holes and they are filled before giving it to the Full screen detection/rectangle check. Full screen detection is accomplished at step 2708 details shown in FIGS. 43-45. At decision step 2710 if full screen is detected then the method stops at step 2712. In the case of full screen detection the present invention does not need to detect the rectangle verifier and border detection. If full screen is not detected, then the method continues and a search for rectangles is performed at step 2714. Logic step 2716 inquires whether or not at least one rectangle is found. If a rectangle is found, then the fine co-ordinates of the rectangle are found at step 2718, and the coarse and fine co-ordinates of the rectangle are stored at step 2720. Fine co-ordinates are derived as shown in FIG. 34 for all sides. If no rectangle is found, then the method stops at step 2722.

Figure 28:
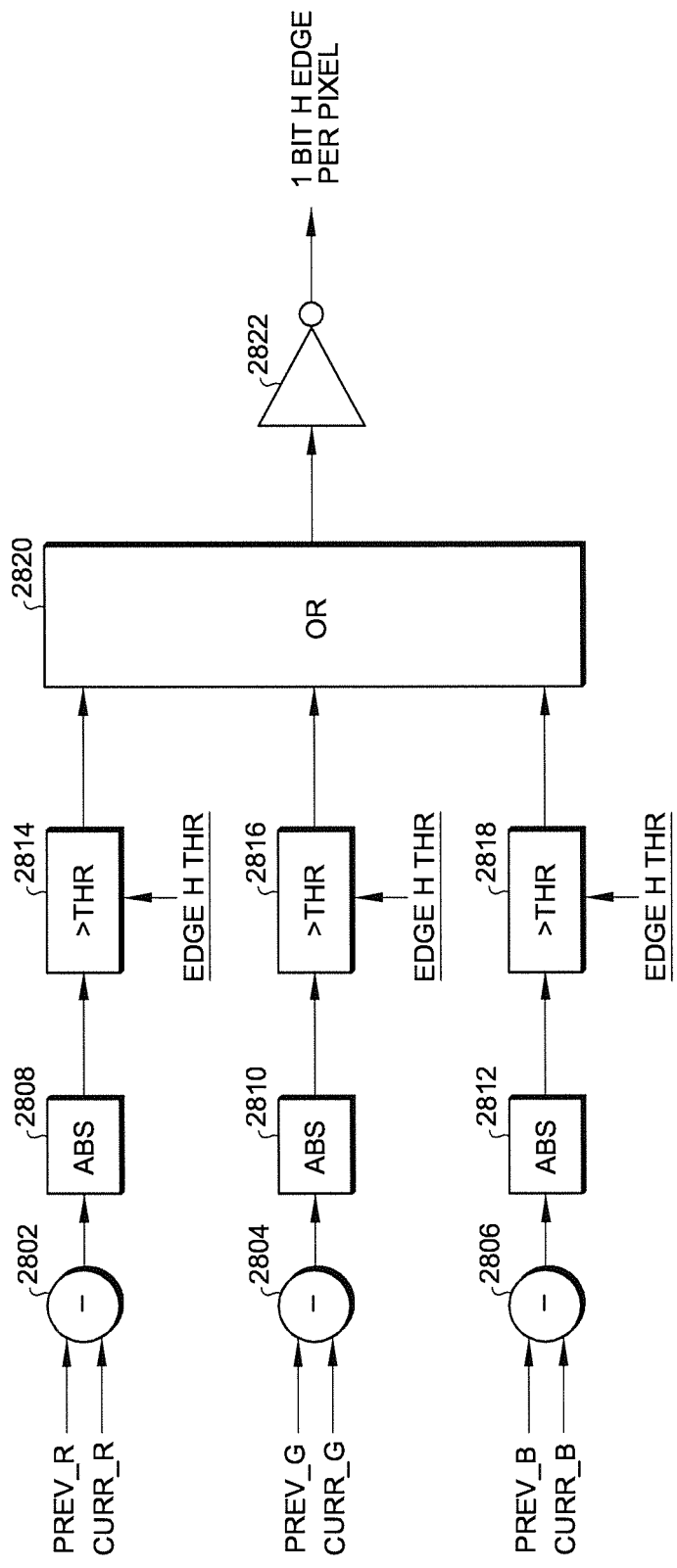
FIG. 28 shows the micro architecture of the horizontal edge according to some embodiments of the invention.

A horizontal edge detector according to the present invention is shown in FIG. 28. The horizontal edge detector includes subtractor 2802 for subtracting the previous red pixel value. Prev_R from the current red pixel value Curr_R. The output is received by an absolute value functional block 2808. The output of block 2808 is received by a comparator block 2814, which compares the absolute value to the horizontal edge threshold EDGE_H_thr (a programmed threshold value). The horizontal edge detector includes subtractor 2804 for subtracting the previous green pixel value Prev_G from the current green pixel value Curr_G. The output is received by an absolute value functional block 2810. The output of block 2810 is received by a comparator block 2816, which compares the absolute value to the horizontal edge threshold EDGE_H_thr. The horizontal edge detector includes subtractor 2806 for subtracting the previous blue pixel value Prev_B from the current blue pixel value Curr_B. The output is received by an absolute value functional block 2812. The output of block 2812 is received by a comparator block 2818, which compares the absolute value to the horizontal edge threshold EDGE_H_thr. The output of blocks 2814, 2816, and 2818 is received by OR gate 2820, and inverted by inverter 2822 to provide a one bit horizontal edge per pixel.

Figure 29:
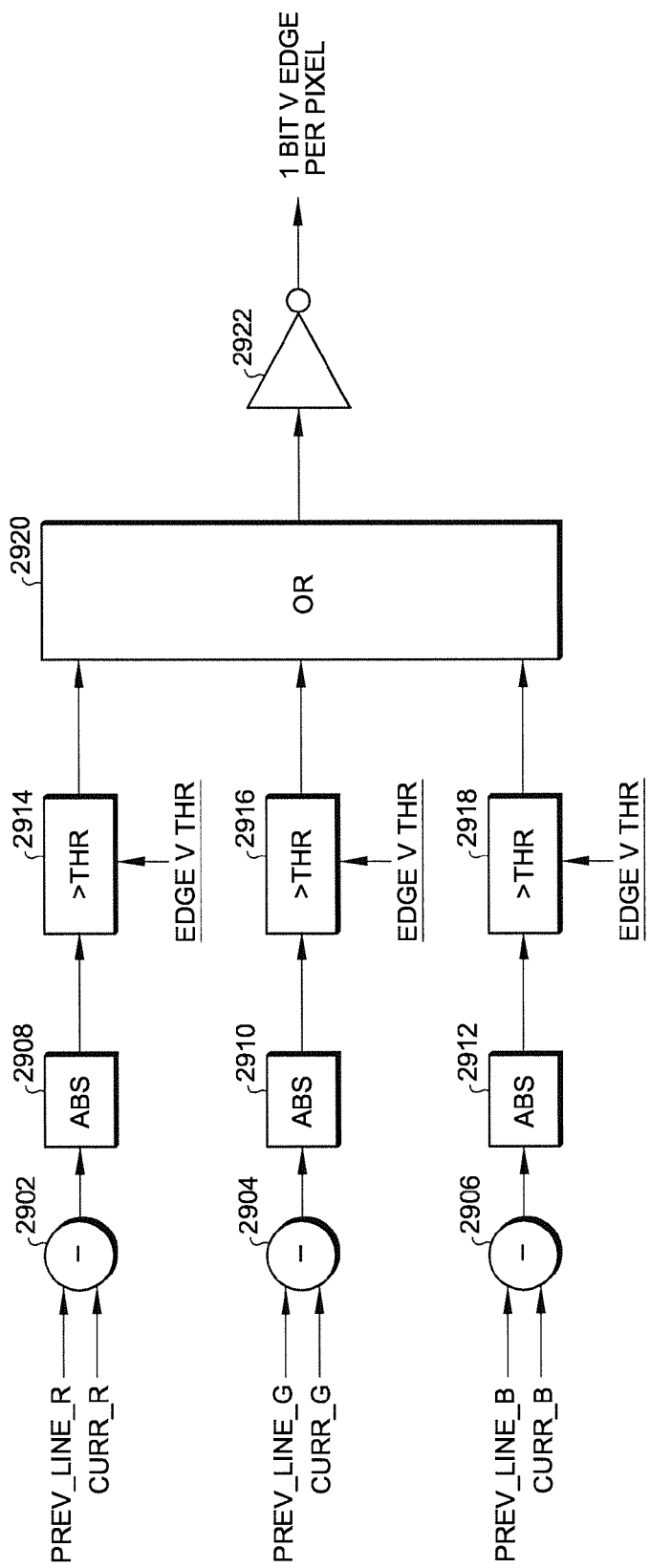
FIG. 29 shows the micro architecture of vertical edge according to some embodiments of the invention.

A vertical edge detector according to the present invention is shown in FIG. 29. The horizontal edge detector includes subtractor 2902 for subtracting the previous line red pixel value Prev_line_R from the current red pixel value Curr_R. The output is received by an absolute value functional block 2908. The output of block 2908 is received by a comparator block 2914, which compares the absolute value to the vertical edge threshold EDGE_V_thr (a programmed threshold value). The vertical edge detector includes subtractor 2904 for subtracting the previous line green pixel value Prev_line_G from the current green pixel value Curr_G. The output is received by an absolute value functional block 2910. The output of block 2910 is received by a comparator block 2916, which compares the absolute value to the vertical edge threshold EDGE_V_thr. The vertical edge detector includes subtractor 2906 for subtracting the previous line blue pixel value Prev_line_B from the current blue pixel value Curr_B. The output is received by an absolute value functional block 2912. The output of block 2912 is received by a comparator block 2918, which compares the absolute value to the vertical edge threshold EDGE_V_thr. The output of blocks 2914, 2916, and 2918 is received by OR gate 2920, and inverted by inverter 2922 to provide a one bit vertical edge per pixel.

Figure 30:
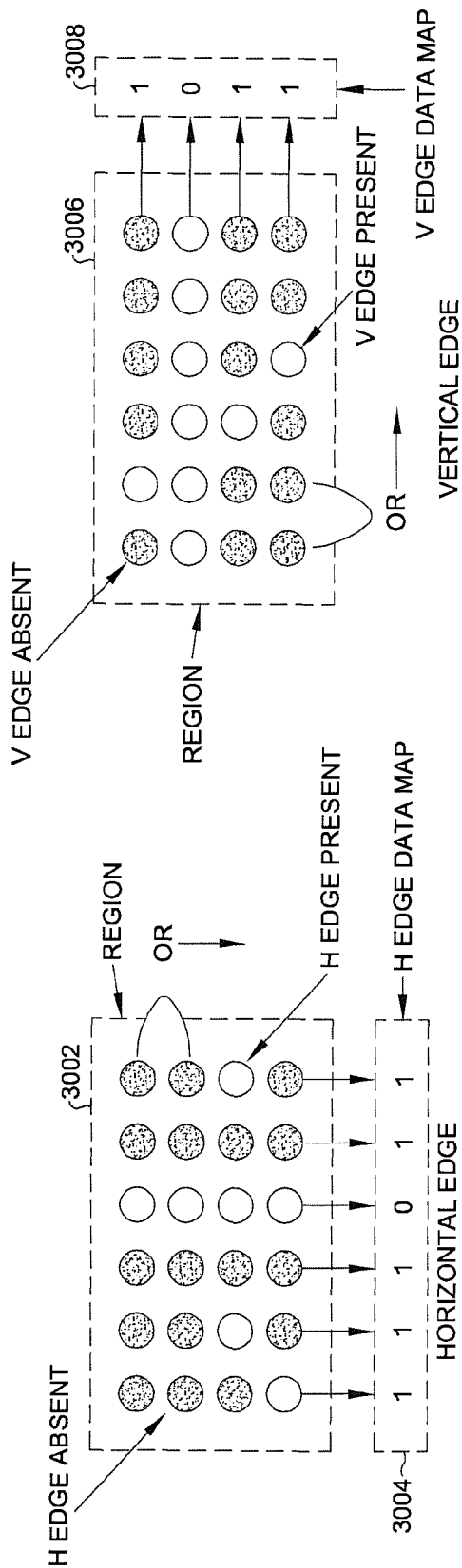
FIG. 30 shows the method of generating a horizontal and vertical edge map of a region according to some embodiments of the invention.

Further details of the coarse window detection of the present invention, including the horizontal and vertical edge map is shown in FIG. 30. The VWA horizontal edge map for 32×30 regions is shown in FIG. 30. FIG. 30 shows two examples of regions with a region size of 6 by 4 pixels 3002 and 3006. In the left figure, the dark circle is where the output of a horizontal edge (FIG. 28) is one, i.e. horizontal edge is absent, and the white circle is where the output of the horizontal edge (FIG. 28) is zero, i.e. horizontal edge is present. Temporal merging of the data is done once by ORing the first capture of an edge with a last capture of the edge within the coarse loop. The ORed HN edge map modifies the coarse video map and used to locate the fine co-ordinates. Item 3004 is the data per region which is used to determine continuous horizontal edge. Presence of zero indicates a continuous horizontal edge present in the region. Combining multiple regions continuous horizontal edges indicating the video window boundary can be found. In the Right figure, the dark circle is where the output of a vertical edge (FIG. 29) is one, i.e. vertical edge is absent, and the white circle is where the output of the vertical edge (FIG. 29) is zero, i.e. vertical edge is present. Temporal merging of the data is done once by ORing the first capture of an edge with a last capture of the edge within the coarse loop. The ORed HN edge map modifies the coarse video map and used to locate the fine co-ordinates. Item 3008 is the data per region which is used to determine continuous vertical edge. Presence of a zero indicates continuous vertical edge present in the region. Combining multiple regions a continuous vertical edge indicating the video window boundary can be found.

Figure 31:
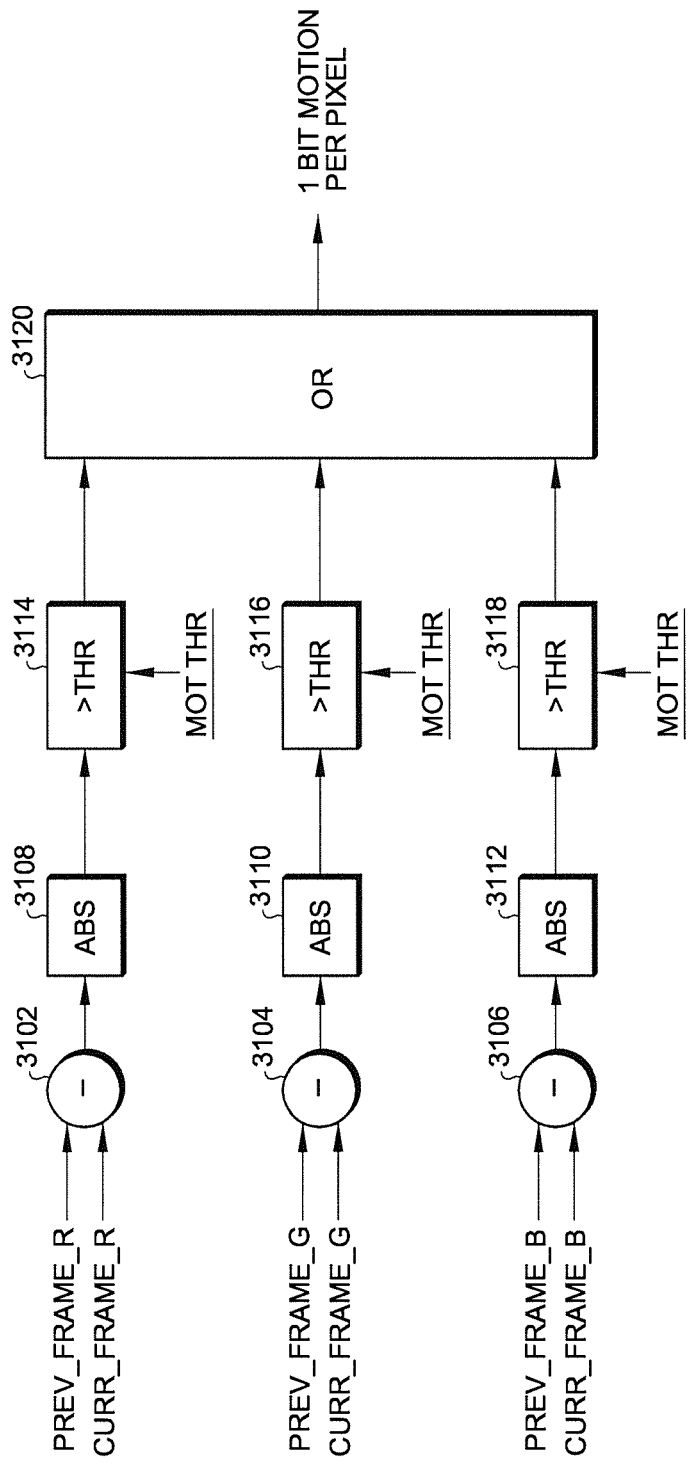
FIG. 31 shows the micro architecture of motion according to some embodiments of the application.

A motion detector is shown in FIG. 31 according to an embodiment of the present invention. In FIG. 31 Mot_thr (a programmed threshold) is programmed as zero. The horizontal edge detector includes subtractor 3102 for subtracting the previous frame red pixel value Prev_frame_R from the current frame red pixel value Curr_frame_R. The output is received by an absolute value functional block 3108. The output of block 3108 is received by a comparator block 3114, which compares the absolute value to the motion threshold Mot_thr. The motion detector includes subtractor 3104 for subtracting the previous frame green pixel value Prev_frame_G from the current frame green pixel value Curr_frame_G. The output is received by an absolute value functional block 3110. The output of block 3110 is received by a comparator block 3116, which compares the absolute value to the vertical edge threshold Mot_thr. The motion detector includes subtractor 3106 for subtracting the previous frame blue pixel value Prev_frame_B from the current frame blue pixel value Curr_frame_B. The output is received by an absolute value functional block 3112. The output of block 3112 is received by a comparator block 3118, which compares the absolute value to the motion threshold Mot_thr. The output of blocks 3114, 3116, and 3118 is received by OR gate 3120, which in turn provides one motion bit per pixel.

Figure 32:
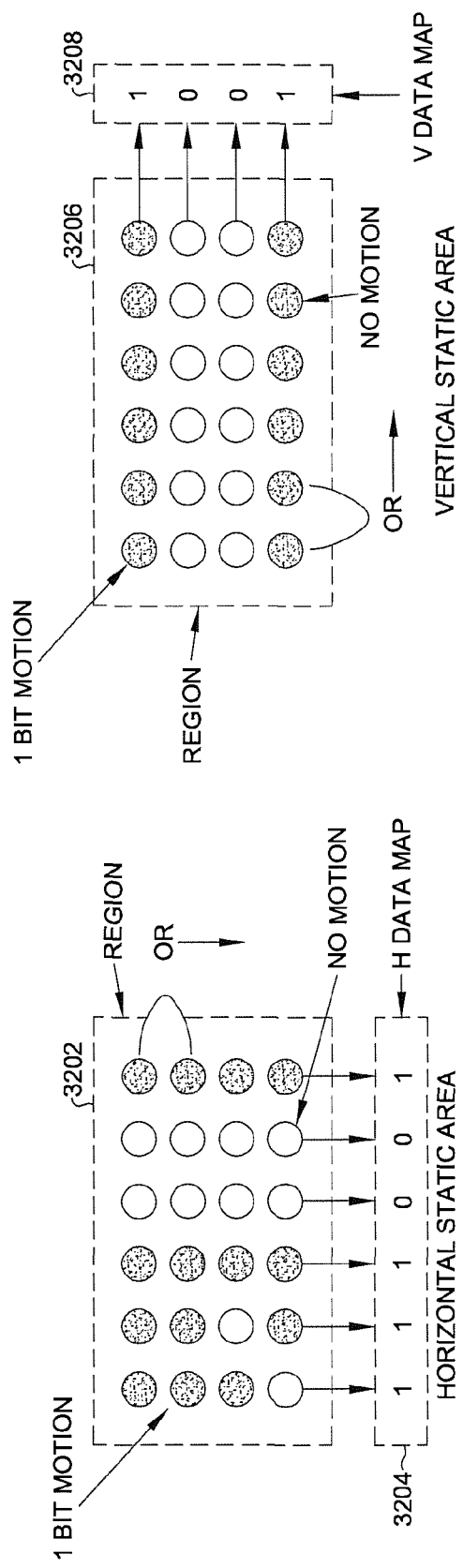
FIG. 32 shows the method of generating a horizontal and vertical static map of a region according to some embodiments of the invention.

Further details of the coarse window detection including a horizontal and static map is shown in FIG. 32. Total storage needed per frame is 32×30×4=4 k for a single HN map. FIG. 32 shows an example of a region with region size of 6 by 4 pixels. The left figure shows the horizontal static area. The dark circle is where the output of motion per pixel (FIG. 31) is one, i.e. motion is present. The white circles are where output motion per pixel (FIG. 31) is zero, i.e. motion is absent. Similarly, the right side figure is for the vertical static area. Item 3204 is the data per region which is used to determine continuous horizontal static area. Presence of a zero indicates a continuous horizontal static is present in the region. Combining multiple regions continuous a horizontal static area indicating the video window boundary can be found. Item 3208 is the data per region which is used to determine continuous vertical static area. Presence of a zero indicates a continuous vertical static area is present in the region. Combining multiple regions a continuous vertical static area indicating the video window boundary can be found.

Figure 33:
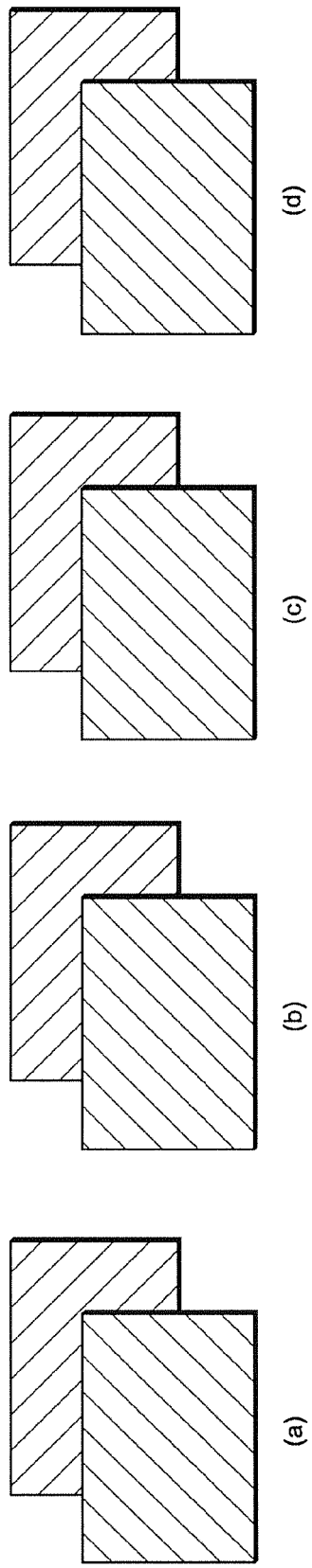
FIG. 33 shows the steps in generation of edge map used for etching selected map according to some embodiments of the invention.
Figure 34:
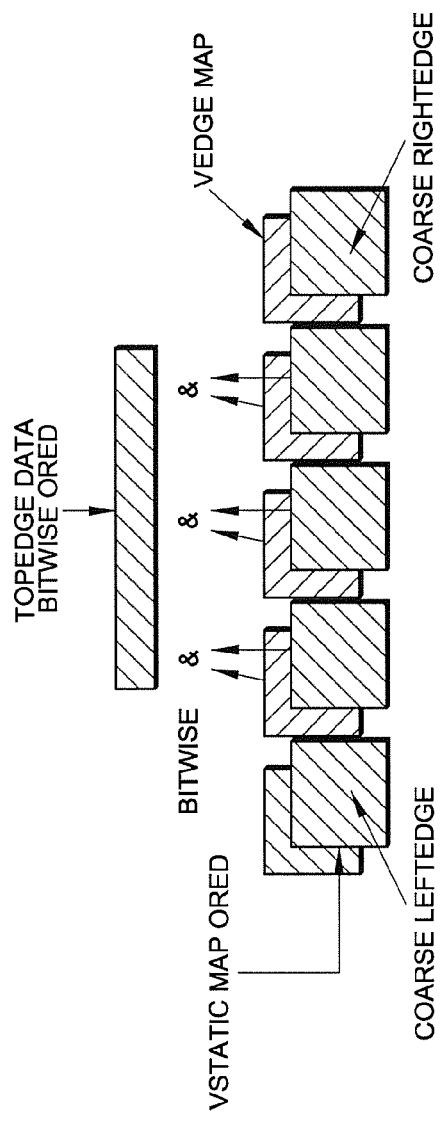
FIG. 34 shows the fine edge detection according to some embodiments of the invention.

The edge map for etching a selected video map is described with respect to FIGS. 33A-33D. FIGS. 28, 29, and 30 generate horizontal and vertical edge maps the basic components per region. The edge map is done for the regions where the persistence static maps are not zero (Hstatic_map_ORed, Vstatic_map_ORed). Since the method of the present invention is seeking a continuous horizontal/vertical edge, ORed Hedge_map/Vedge_map is bitwise ORed over three regions (one before, one after) to see whether an edge is still present. FIG. 33A shows two overlapping video windows (selected video maps) with two different colors on which etching is done to create a demarcation so as to detect the top video window. For the regions where the persistence static maps are not zero (Hstatic_map_ORed, Vstatic_map_ORed) an edge map is generated. Since the present invention is looking for a big continuous horizontal/vertical edge, ORed Hedge_map/Vedge_map is bitwise ORed over three regions (one before, one after) to see whether edge is still present. If edge is still present Edge_map is set in that region FIG. 33B. OR If a T junction is located that region of edge_map is also set as shown in FIG. 33C. Next, the corners are located and set based on edge_map data as shown in FIG. 33D. The selected video map region is forced to zero where ever the edge_map region is set. This etched selected video map is then given for post processing. The etching is adaptively controlled using EDGE MAP ON/OFF.

The fine co-ordinate generation according to an embodiment of the present invention is discussed below with reference to FIG. 34. As discussed above, the coarse co-ordinate gives the video boundary aligned with region boundaries. Since now the method of the present invention has data of motion and edge within the region, using it the method can directly convert coarse to fine/final co-ordinate alignment to the video boundary. A top edge example (left and right edge use Hstatic_map_Ored, Hedge_map). The method starts walking up from the row where coarse topedge is found. The width of the row starts from coarse leftedge+1 column and ends in coarse rightedge-1. The column top edge data is generated by ORing (Vstatic_map_ORed region data "&" with Vedge_map region data) for all the regions within the width, having static or edge region, also counting number of such region. One bit overlap is maintained with the bottom row. Top edge data is then walked from bottom, searching for first occurrence of zero which is the location of static/edge, if static/edge is not found or count is not 50% of width the method of the present invention moves one row up and repeat last two steps again. Other side edges are similarly found using (Hstatic_map_ORed region data & Hedge_map region data) or (Vstatic_map_ORed region data "&" with Vedge_map region data) based on the side.

Final fine detection is shown in FIG. 35. Note that in the left image of FIG. 35 that that the top video window with static border is marked with a red color, and in the right image of FIG. 35, that the top video window without any border is marked with a red color.

Figure 36:
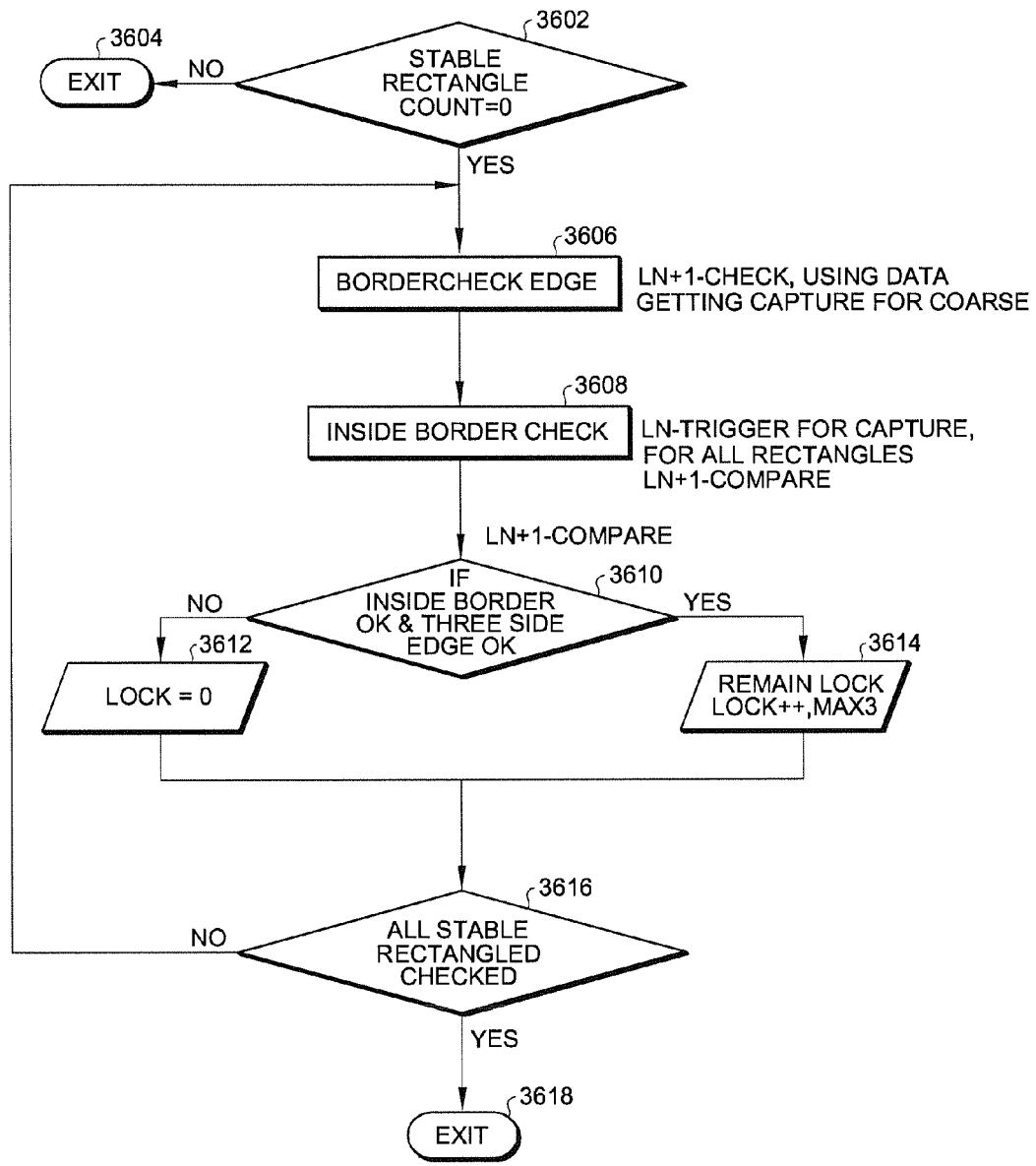
FIG. 36 shows the flow diagram of border detection/verifier in operation according to some embodiments of the invention.

The border detection top flow is shown in a flow chart in FIG. 36. The border detection top flow starts at logic step 3602 and determines whether or not the stable rectangle count is equal to zero or not. For stability (except for full screen, stability is part of full screen detection block) the complete coarse detection is run again with all the persistence maps (realness, black, motion ORed H & V static map and final video map) and loop counter cleared after any rectangle is detected. If a rectangle is not found remain in coarse detection with persistence maps getting cleared after persistence map reset loop time is reached. Border check is started for those rectangles for which fine co-ordinates are found two times the same, indicating that they are stable. If no stable rectangle is found, the border detection is exited at step 3604. Border detection is not done since there is no video window or it is full screen case. If yes, then the method proceeds to the border check edge step 3606. Border check is based on checking for a consistent edge/no motion on a fine edge. Once the border check edge step 3606 has been performed, the method performs the inside border check step 3608. That is, checks Inside Motion of the Video Window or whether the video is paused. The method then continues to logic steps 3610 and 3612. Before lock (3610): if all the side border and inside window motion is passed thrice than border check goes to lock state for a particular rectangle. After lock (3612): if after lock any two sides fails or Inside border check fails lock is removed from a particular rectangle at step 3614. The method continues until all stable rectangles are checked at step 3616. If no, the method is repeated back at step 3606. In yes, then the method exits at step 3618.

Figure 37:
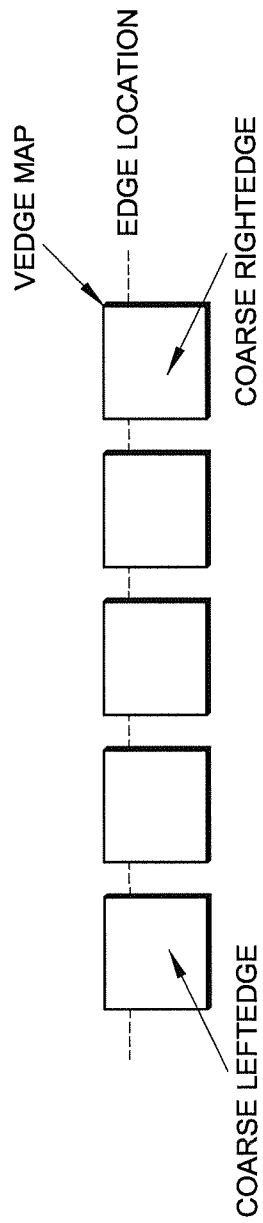
FIG. 37 shows the peripheral border check using a continuous edge according to some embodiments of the invention.

Further details of the border check edge are shown in FIG. 37. For the border check edge found in coarse and fine is check for present still, which indicate the video window is not moved or still present for a particular rectangle, the method of the present invention checks in the hedge_map/vedge_map depending on the side, whether at least one edge is present in one of the region, at the same location as the fine co-ordinate. Peripheral Border check is based on checking for a small consistent data strip on Fine edge. For Border Edge to be OK for a particular rectangle, hedge_map/vedge_map is checked depending on the side of rectangle, whether at least edge is present in one of the region, at the same location as fine co-ordinate. The dotted line is the fine co-ordinate location being checked for whether or not a continuous edge is present at that location.

Figure 38:
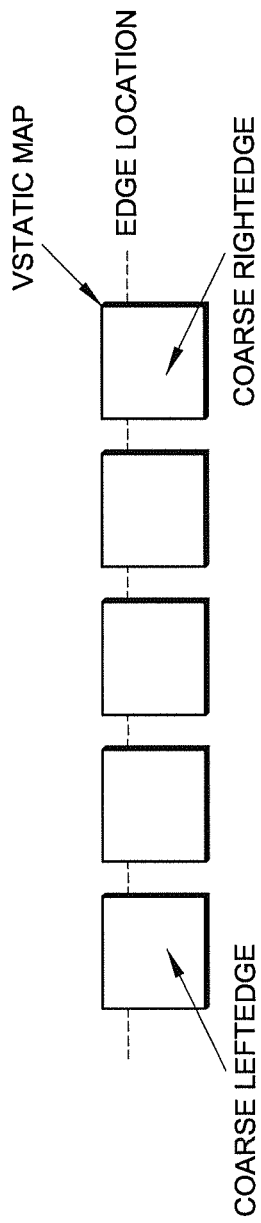
FIG. 38 shows the peripheral border check using a continuous static area according to some embodiments of the invention.

FIG. 38 shows the peripheral border check using a continuous static area according to some embodiments of the invention For the case where an edge is missing, the method of the present invention checks whether all the regions in the hstatic_map/vstatic_map based on a side, are static at the location of the fine co-ordinate. For the case where edge is missing, the method of the present invention checks whether all the regions in hstatic_map/vstatic_map based on a side, are static at the location of fine co-ordinate. The dotted line is the fine co-ordinate location is checked whether continuous static area is present at that location.

Pause support for a borderless video window is shown in FIG. 39. Current VWD (video window detection) without the benefit of the additional embodiments of the present invention loses detection when video is paused in the borderless mode. Borderless mode uses inside motion to remain locked to the video window. To support pause, the inside video can be tracked to remain locked. Intensity/Color difference at the border can also be used to remain locked.

Further details of the borderless pause and video track are shown in FIG. 40. FIG. 40A shows an intensity histogram (paused/before paused), and FIG. 40B shows the cumulative transfer function (paused/before paused). On every inside border check with motion detection, an intensity histogram of 16 bins from 8×16 regions of previous accumulated data is generated and stored to know the intensity variation within the video window. On non-detection of inside motion, an intensity histogram of 16 bins from 8×16 regions of current data is generated to know how the intensity variation is when video is either pause or not present. A cumulative transfer function of the stored and the current histogram is generated and compared to see the change in intensity variation within the video window. If there is big change it indicates the video window is removed. The absolute maximum difference in the transfer function is checked against a threshold to remain locked. Based on the difference it can be determined whether the current video data is co-related with the pervious stored data when the last motion was seen. If the video data is co-related which means video is pause else video window is removed.

Figure 41:
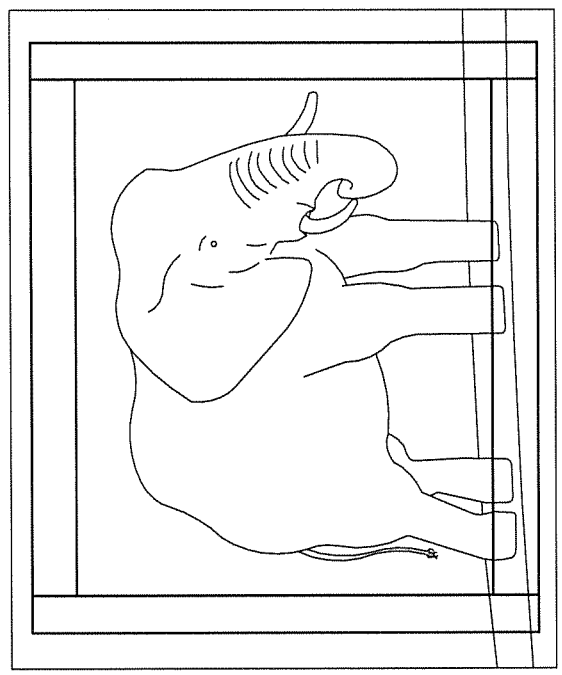
FIG. 41 shows the five distinct areas used for the inside border check according to some embodiments of the invention.

The inside border check is described with respect to FIG. 41. A motion check inside the video window is used in handling the borderless and pause case based on pixel accumulation of a region. The method of the present invention divides the video window into 8×16 regions after some margins on all the sides.

Step 1—stores the pixel accumulated values of 8×16 regions.

Step 2—compare the store pixel acc value with new current pixel acc value. To declare motion is present inside, all side on the periphery of 8×16 regions should have some difference and overall some minimum regions should be different (>4 region). Store the new current pixel acc value for next comparison. Once border locked it stores the cumulative transfer function of an 8×16 region. The inside border check is done to track the presence of video and to decide whether to remain in border detection for a particular rectangle by capture the border edges again when any one side border fails or all the side border fails. The inside border check is split into five parts, four on the periphery and one in the middle.

Figure 42A:
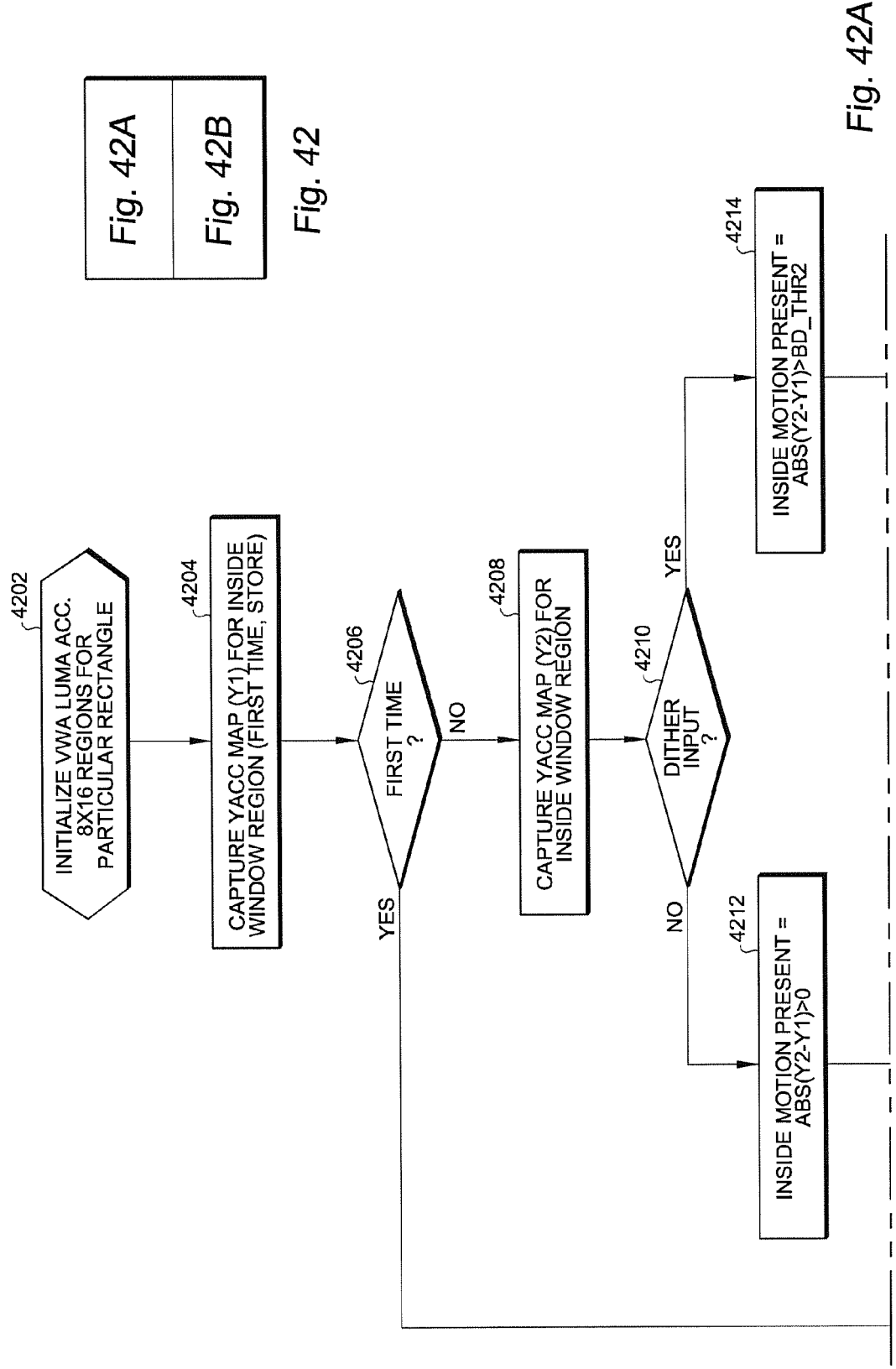
FIGS. 42A and 42B show the flow diagram of the inside border check according to some embodiments of the invention.
Figure 42B:
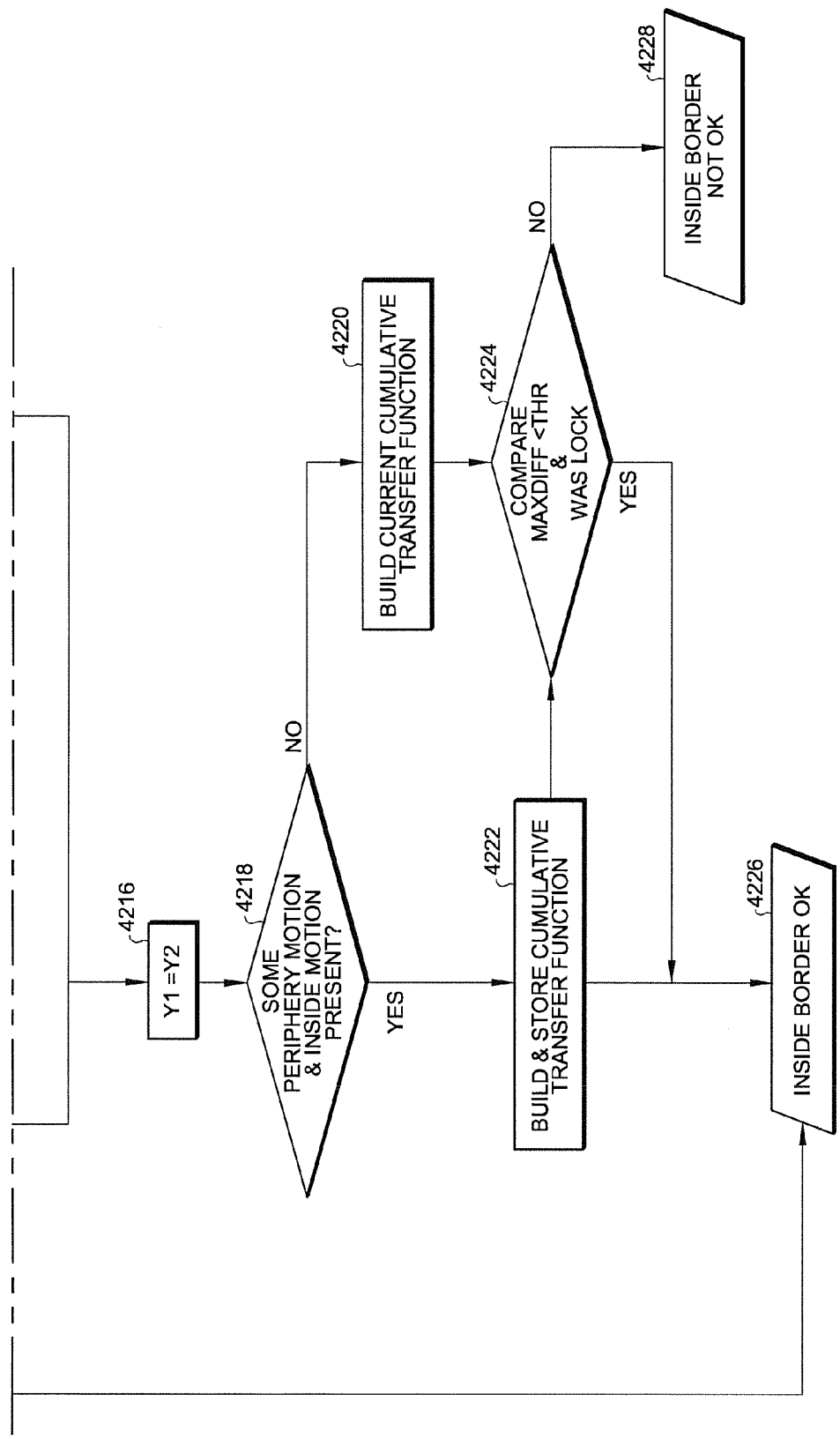

FIGS. 42A and 42B show the flow diagram of the inside border check according to some embodiments of the invention. At step 4202 the method initializes the VWA luma acc in 8×16 regions a separate block specifically for border detection (based on the number of multiple video window to be track, that many separate luma acc hardware blocks are present) for a particular rectangle generating Yacc map. At step 4204 the method captures the Yacc map (Y1) for the inside window region (first time, store). At decision 4206 if this is the first time through the method, then the method proceeds to step 4226 and the inside border still finds video to be active. If not, the method continues to step 4208, which capture the Yacc map (Y2) for the inside window region. At decision 4210, the method asks whether a dither input is present. If no, then inside motion is present and equal to abs(Y2−Y1) and greater than zero at step 4212. If yes, then inside motion is present and equal to abs(Y2−Y1) and great than bd_thr2 at step 4214. That is, if yes the inside motion is present. The programmable threshold changes based on input is dithered or not. At step 4216 Y1 is set to Y2. Y1 is array of accumulated value of region stored and Y2 is the array of accumulated value of region for current capture. Y1=Y2 means the current capture value are getting store for future comparison. At decision 4218 the method asks whether or not some periphery motion and inside motion is present. If yes, then the method continues to step 4222 which builds and stores a cumulative transfer function, and the method ends at step 4226. If no, then the cumulative transfer function is built at step 4220, and the method continues to decision 4224, which compares maxdiff<thr. Maxdiff is the absolute maximum difference in the two cumulative transfer function one stored and one current, and "thr" is a programmable threshold.

The condition is checked only when the video window was already locked (peripheral border and inside border check where found OK/fine thrice). If yes, then the method ends at step 4226. If no, then the inside border checked failed which indicates the video window has moved/closed/changed at step 4228.

Figure 43:
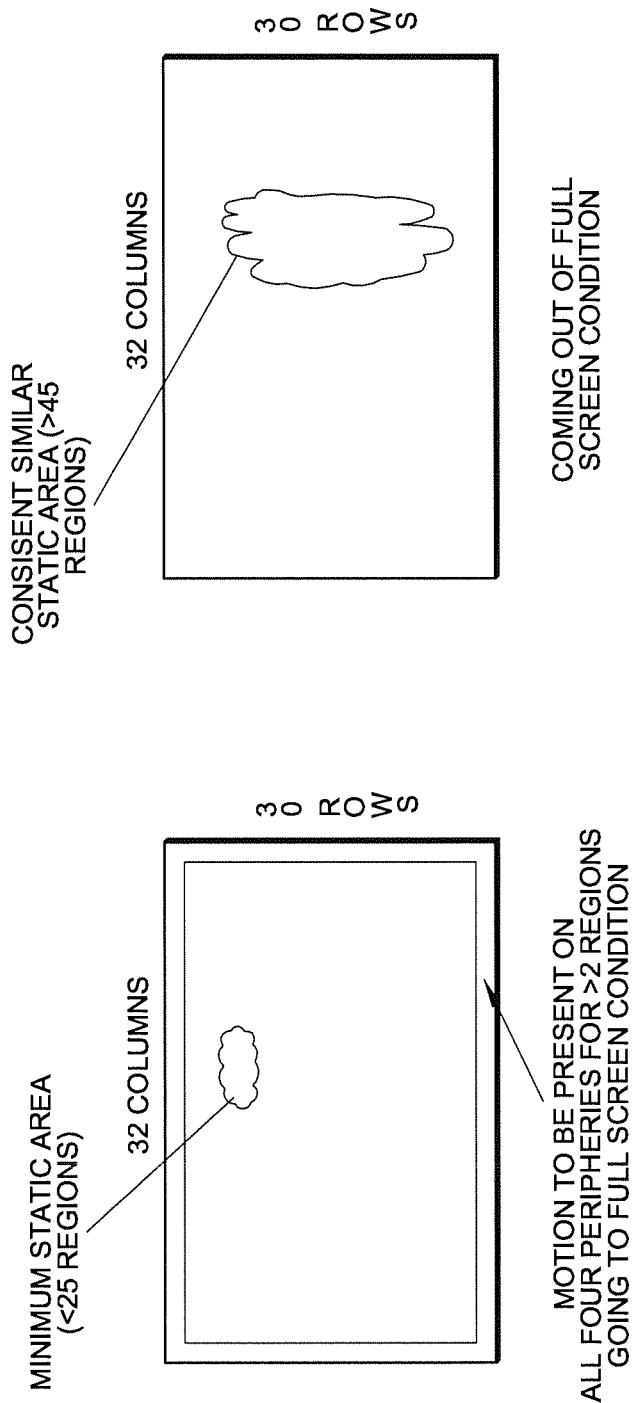
FIG. 43 shows going in and coming out of Full Screen detection according to an embodiment of the present invention.
Figure 45:
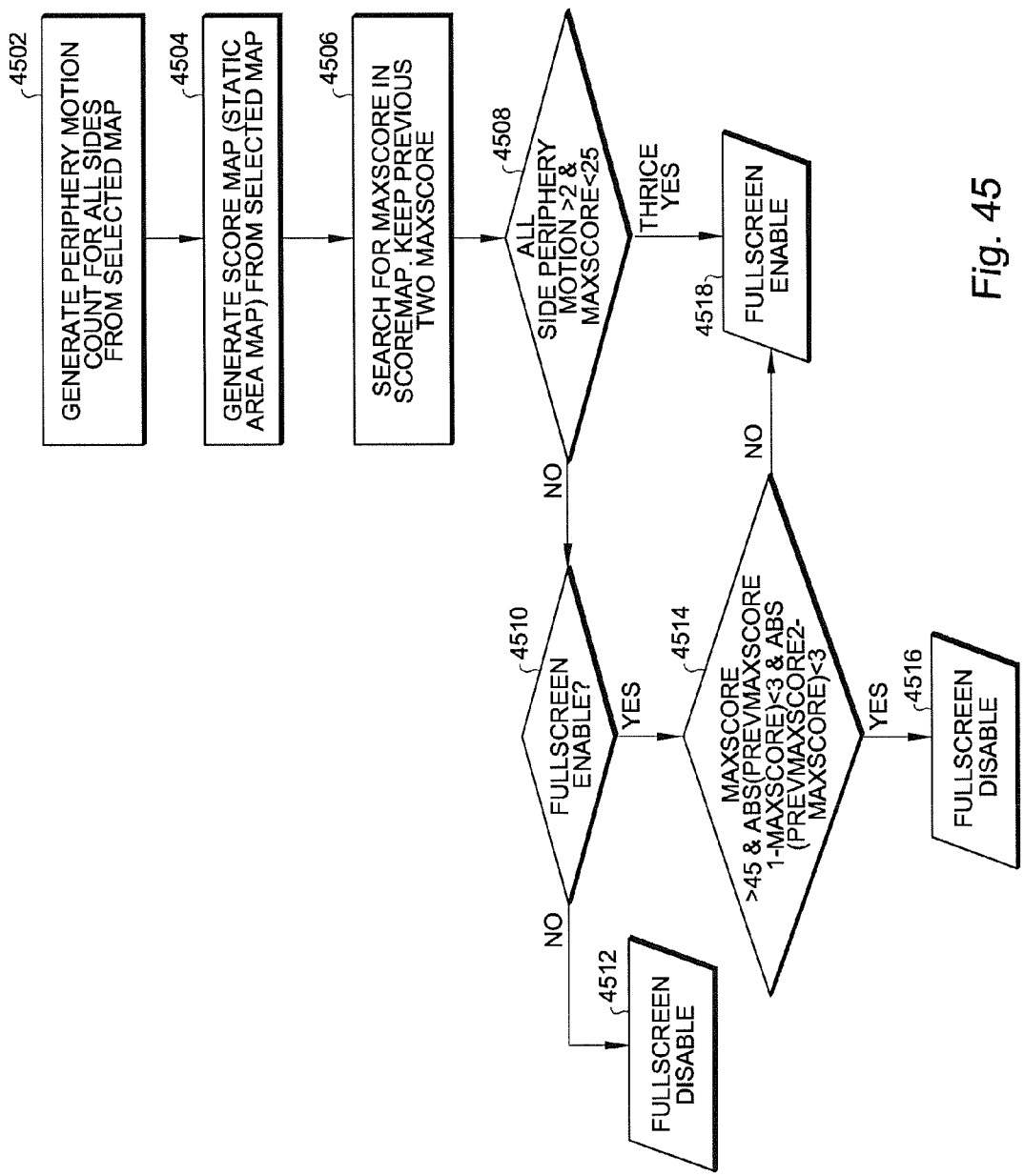
FIG. 45 shows the flow diagram for the full screen detection flow according to some embodiments of the invention.

Full screen detection is described in further detail below with respect to FIGS. 43-45. The pre-process selected map (hole-filled selected map or output of 2706) is used by full screen detection to determine whether to go into or out of full screen. The condition to go in/out of full screen is shown below in FIG. 43. Going into full screen is based on periphery motion on all sides and the static area within the complete 32×30 region is much less. Coming out of full screen is based on consistent similar large static area found thrice.

Referring now to FIG. 44, a static area map is generated using a score map, which uses no motion region to generate a score to check maximum area of input has video content (checking here how much area is non-video.) Wherever there is continuity in no motion, the score increases. The static Score Map is generated as follows:

IF (Selected Map Region x,y has zero value (no Motion)).
    Score(Y,X)=Score(Y,X−1)+Score(Y−1,X)−Score(Y−1, X−1)+1
ELSE
    Score(Y,X)=0.

The score map array is bigger in size by one row in the left and one column on the top, which is assigned a value zero. (An example for 10×8 regions is shown below in FIG. 44). Note that in FIG. 44 the selected map has a zero value cells since the selected map is built based on video components and the current invention checking non-video area (selected map has a zero value) is checked. Once the score map is generated, a max score (which gives static area) is searched in complete 32×30 regions. This max score is used to decide to go IN or OUT of full screen.

The flow chart below in FIG. 45 outlines the steps for full screen detection. If the condition to go into full screen is found true for three times consecutively, then the full screen flag is set, which keeps the coarse in full screen. Only when the full screen come out condition is detected thrice consecutively (based on maxscore, prevmaxscore1, prevmaxscore2), then the full screen flag is reset. Once in full screen condition true is detected, then the rest of the coarse detection algorithm is bypassed (i.e., bypass of rectangle check, etc). The persistence reset count is changed from seven to two, based on first full screen detection condition. Once the full screen is detected, the main state machine only does coarse detection.

The exact steps are generating a periphery motion count for all side from the selected map at step 4502, generating a score map (static area map) from the selected map at step 4504, and searching for a maxscore in the scoremap, keeping the previous two maxscore values at step 4506. At decision 4508 the method asks if all side periphery motion is greater than two and the maxscore is less than 25. If no, then the method proceeds to decision 4510, which asks if FullScreen has already been enabled. If no, then fullscreen is disabled at step 4512. If yes, then the method proceeds to decision 4514, which asks if maxscore is greater than 45 and abs(prevmaxscore1−maxscore) is less than three and abs(prevmaxscore2−maxscore) is less than three. This is done for checking whether the non-video area found is large and consistent. If yes, then fullscreen is disabled at step 4516. If no, fullscreen is enabled at step 4518. Returning to decision 4508, if the answer is yes for three times, then fullscreen is also enabled at step 4518.

As compared to existing solutions, in the method of the present invention there is no restriction on spacing between two video windows and a top overlapped video window can be detected. This is made possible by using H & V static maps and H & V edge maps. The solution provided by the present invention also saves time in fine detection and supports multiple video windows. By the method of the present invention, a faster and better video window/boundary detection method is provided without any of the significant limitations found in the prior art.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A video detection method comprising:
providing first and second video windows that overlap, the first and second video windows each playing a video therein;
using at least one of horizontal and vertical continuous edges within an overlap video region of the first and second video windows to create separations between the first and second video windows;
differentiating the first video window from the second video window based upon the separations created by at least one of the horizontal and vertical continuous edges;
determining whether the first video window overlaps the second video window or whether the second video window overlaps the first video window;
if the first video window overlaps the second video window, enhancing the video playing in the first video window and not the video playing in the second video window in the overlap video region based upon the differentiation of the first video window from the second video window, the enhancing being performance of noise reduction on the video playing in the first video window; and
if the second video window overlaps the first video window, enhancing the video playing in the second video window and not the video playing in the first video window in the overlap video region based upon the differentiation of the first video window from the second video window, the enhancing being performance of noise reduction on the video playing in the second video window.

2. The method as claimed in claim 1 wherein a horizontal continuous edge value of the overlap video region is determined.

3. The method as claimed in claim 2 wherein the horizontal continuous edge is derived by combining horizontal continuous edge values from an individual region.

4. The method as claimed in claim 1 wherein a motion value of the overlap video region is determined.

5. The method as claimed in claim 1 wherein a vertical continuous edge value of the overlap video region is determined.

6. The method as claimed in claim 5 wherein the vertical continuous edge value is derived by combining vertical continuous edge values from an individual region.

7. The method as claimed in claim 1 wherein both the horizontal continuous edge and the vertical continuous edge are used in combination to create separation between the first and second video windows.

8. The method as claimed in claim 1 wherein differentiating the first video window from the second video window includes a fine edge detection.

9. The method as claimed in claim 1 wherein differentiating the first video window from the second video window includes a pause detection.

10. The method as claimed in claim 1 wherein differentiating the first video window from the second video window includes a full screen detection.

11. The method as claimed in claim 1 wherein enhancing comprises adjusting at least one of contrast, colors, and sharpness.

12. A video detection method comprising:
providing first and second video windows, wherein the first video window overlaps the second video window, the first and second video windows each playing a video therein;
using at least one of horizontal and vertical continuous static areas within an overlap video region of the first and second video windows to create separations between the first and second video windows;
differentiating the first video window from the second video window based upon the separations created by at least one of the horizontal and vertical continuous static areas;
determining whether the first video window overlaps the second video window or whether the second video window overlaps the first video window;
if the first video window overlaps the second video window, enhancing the video playing in the first video window and not the video playing in the second video window in the overlap video region based upon the differentiation of the first video window from the second video window, the enhancing being performance of noise reduction on the video playing in the first video window; and
if the second video window overlaps the first video window, enhancing the video playing in the second video window and not the video playing in the first video window in the overlap video region based upon the differentiation of the first video window from the second video window, the enhancing being performance of noise reduction on the video playing in the first video window.

13. The method as claimed in claim 12 wherein a motion value of the overlap video region is determined.

14. The method as claimed in claim 12 wherein a horizontal continuous static value of the overlap video region is determined.

15. The method as claimed in claim 14 wherein the horizontal continuous static area is derived by combining horizontal continuous static area values from an individual region.

16. The method as claimed in claim 12 wherein a vertical continuous static value of the overlap video region is determined.

17. The method as claimed in claim 16 wherein the vertical continuous static area is derived by combining vertical continuous static area values from an individual region.

18. The method as claimed in claim 12 wherein both the horizontal continuous static area and the vertical continuous static area are used in combination to create separation between the first and second video windows.

19. The method as claimed in claim 12 wherein differentiating the first video window from the second video window includes a fine edge detection.

20. The method as claimed in claim 12 wherein differentiating the first video window from the second video window includes a pause detection.

21. The method as claimed in claim 12 wherein differentiating the first video window from the second video window includes a full screen detection.

* * * * *